US011495784B2

(12) United States Patent
Rust, III et al.

(10) Patent No.: US 11,495,784 B2
(45) Date of Patent: Nov. 8, 2022

(54) APPARATUS, SYSTEMS AND METHODS FOR THE PRODUCTION OF ELECTRODES FOR USE IN BATTERIES

(71) Applicant: Enovix Corporations Inc., Fremont, CA (US)

(72) Inventors: Harrold J. Rust, III, Alamo, CA (US); Murali Ramasubramanian, Fremont, CA (US); Ashok Lahiri, Cupertino, CA (US); Bruno A. Valdes, Sunnyvale, CA (US); Jeffrey Glenn Buck, Salinas, CA (US); Kim Lester Fortunati, Pleasanton, CA (US); Robert S. Busacca, San Francisco, CA (US); John F. Varni, Campbell, CA (US); Joshua David Winans, Mountain View, CO (US); Neal Sarswat, Pleasanton, CA (US); Gunther A. Koblmiller, Sparks, NV (US); Miles E. Beaven, San Jose, CA (US); Jeffery A. Moss, San Jose, CA (US); Michael E. Andres, Milpitas, CA (US)

(73) Assignee: Enovix Operations Inc., Fremont, CA (US)

( * ) Notice: Subject to any disclaimer, the term of this patent is extended or adjusted under 35 U.S.C. 154(b) by 0 days.

(21) Appl. No.: 17/481,697

(22) Filed: Sep. 22, 2021

(65) Prior Publication Data
US 2022/0093903 A1     Mar. 24, 2022

Related U.S. Application Data

(63) Continuation of application No. PCT/US2021/050208, filed on Sep. 14, 2021.
(Continued)

(51) Int. Cl.
*H01M 4/139*     (2010.01)
*H01M 4/04*     (2006.01)

(52) U.S. Cl.
CPC ......... *H01M 4/0469* (2013.01); *H01M 4/139* (2013.01)

(58) Field of Classification Search
CPC .......................... H01M 4/0469; H01M 4/139
See application file for complete search history.

(56) References Cited

U.S. PATENT DOCUMENTS

| 4,539,275 A | 9/1985 | Plasse |
| 4,587,182 A | 5/1986 | Stiles et al. |

(Continued)

FOREIGN PATENT DOCUMENTS

| CA | 2388711 A1 | 5/2021 |
| CN | 1286811 A | 3/2001 |

(Continued)

OTHER PUBLICATIONS

EPO machine generated English translation of DE-10-2018-203033-A1 (Year: 2018).*

(Continued)

*Primary Examiner* — Christopher P Domone
*Assistant Examiner* — Kimberly Wyluda
(74) *Attorney, Agent, or Firm* — Armstrong Teasdale LLP

(57) ABSTRACT

A process for delineating a population of electrode structures in a web is disclosed. The web has a down-web direction, a cross-web direction, an electrochemically active layer, and an electrically conductive layer. The process includes laser machining the web in at least the cross-web direction to delineate members of the electrode structure population in the web without releasing the delineated members from the web and forming an alignment feature in the web that is adapted for locating each delineated member of the electrode structure population in the web.

27 Claims, 20 Drawing Sheets

Related U.S. Application Data

(60) Provisional application No. 63/081,686, filed on Sep. 22, 2020, provisional application No. 63/080,345, filed on Sep. 18, 2020.

(56) References Cited

U.S. PATENT DOCUMENTS

| | | |
|---|---|---|
| 4,614,026 A | 9/1986 | Plasse |
| 5,238,759 A | 8/1993 | Plichta et al. |
| 5,294,504 A | 3/1994 | Otagawa et al. |
| 5,709,962 A | 1/1998 | Bailey |
| 6,083,640 A | 7/2000 | Lee et al. |
| 6,090,505 A | 7/2000 | Shimamura et al. |
| 6,235,427 B1 | 5/2001 | Idota et al. |
| 6,287,371 B1 | 9/2001 | Ota et al. |
| 6,355,369 B1 | 3/2002 | Iarochenko et al. |
| 6,383,234 B1 | 5/2002 | Noh |
| 6,432,579 B1 | 8/2002 | Tsuji et al. |
| 6,432,585 B1 | 8/2002 | Kawakami et al. |
| 6,525,391 B1 | 2/2003 | Bertrand et al. |
| 6,679,925 B1 | 1/2004 | Tanizaki et al. |
| 6,726,733 B2 | 4/2004 | Lee et al. |
| 6,791,737 B2 | 9/2004 | Giron |
| 6,855,378 B1 | 2/2005 | Narang |
| 7,066,971 B1 | 6/2006 | Carlson |
| 7,309,548 B2 | 12/2007 | Ota et al. |
| 7,402,829 B2 | 7/2008 | Green |
| 7,722,984 B2 | 5/2010 | Kim et al. |
| 7,824,806 B2 | 11/2010 | Visco et al. |
| 8,101,298 B2 | 1/2012 | Green et al. |
| 8,129,048 B2 | 3/2012 | Hirakawa et al. |
| 8,133,613 B2 | 3/2012 | Ramasubramanian et al. |
| 8,192,788 B1 | 6/2012 | Shah et al. |
| 8,367,244 B2 | 2/2013 | Ramasubramanian et al. |
| 8,475,957 B2 | 7/2013 | Ramasubramanian et al. |
| 8,524,395 B2 | 9/2013 | Ramasubramanian et al. |
| 8,527,395 B2 | 9/2013 | Pylant |
| 8,580,439 B1 | 11/2013 | Kaiser et al. |
| 8,722,226 B2 | 5/2014 | Carter et al. |
| 8,841,030 B2 | 9/2014 | Lahiri et al. |
| 8,865,345 B1 | 10/2014 | Ramasubramanian et al. |
| 8,993,159 B2 | 3/2015 | Chiang et al. |
| 9,105,905 B2 | 8/2015 | Ramasubramanian et al. |
| 9,153,833 B2 | 10/2015 | Chiang et al. |
| 9,343,772 B2 | 5/2016 | Byung |
| 9,356,271 B2 | 5/2016 | Ramasubramanian et al. |
| 9,362,553 B2 | 6/2016 | Lahiri et al. |
| 9,660,292 B2 | 5/2017 | Rust, III et al. |
| 9,692,044 B2 | 6/2017 | Delpuech et al. |
| 9,806,331 B2 | 10/2017 | Lahiri et al. |
| 9,991,490 B2 | 6/2018 | Ramasubramanian et al. |
| 10,020,514 B2 | 7/2018 | Ramasubramanian et al. |
| 10,038,214 B2 | 7/2018 | Rust, III et al. |
| 10,177,400 B2 | 1/2019 | Busacca et al. |
| 10,256,507 B1 | 4/2019 | Busacca et al. |
| 10,283,807 B2 | 5/2019 | Busacca et al. |
| 10,784,477 B2 | 9/2020 | Fischer et al. |
| 11,063,299 B2 | 7/2021 | Busacca et al. |
| 11,081,718 B2 | 8/2021 | Busacca et al. |
| 11,128,020 B2 | 9/2021 | Busacca et al. |
| 2002/0013986 A1 | 2/2002 | Ahn et al. |
| 2003/0082446 A1 | 5/2003 | Chiang et al. |
| 2003/0175589 A1 | 9/2003 | Kaminaka et al. |
| 2004/0048151 A1 | 3/2004 | Hayashi et al. |
| 2004/0185336 A1 | 9/2004 | Ito et al. |
| 2004/0214085 A1 | 10/2004 | Sheem et al. |
| 2004/0234861 A1 | 11/2004 | Kawase et al. |
| 2004/0241540 A1 | 12/2004 | Tsutsumi et al. |
| 2004/0253512 A1 | 12/2004 | Watanabe et al. |
| 2005/0008939 A1 | 1/2005 | Ota et al. |
| 2005/0095503 A1 | 5/2005 | Adachi et al. |
| 2005/0130383 A1 | 6/2005 | Divakaruni et al. |
| 2005/0208379 A1 | 9/2005 | Musha et al. |
| 2006/0093871 A1 | 5/2006 | Howard et al. |
| 2007/0002523 A1 | 1/2007 | Ando et al. |
| 2007/0031733 A1 | 2/2007 | Kogetsu et al. |
| 2007/0097481 A1 | 5/2007 | Burdis et al. |
| 2007/0172732 A1 | 7/2007 | Jung et al. |
| 2007/0285051 A1 | 12/2007 | Jeon et al. |
| 2008/0003490 A1 | 1/2008 | Christensen et al. |
| 2008/0081256 A1 | 4/2008 | Madou et al. |
| 2008/0081257 A1 | 4/2008 | Yoshida et al. |
| 2008/0233455 A1 | 9/2008 | Deimede et al. |
| 2008/0316582 A1* | 12/2008 | Danner ............... G02B 26/026 359/296 |
| 2009/0023073 A1 | 1/2009 | Okada et al. |
| 2009/0035664 A1 | 2/2009 | Chiang et al. |
| 2009/0068567 A1 | 3/2009 | Konishike et al. |
| 2009/0123847 A1 | 5/2009 | Okada et al. |
| 2009/0142656 A1 | 6/2009 | Nathan et al. |
| 2009/0159311 A1 | 6/2009 | Zheng et al. |
| 2009/0263716 A1 | 10/2009 | Ramasubramanian et al. |
| 2009/0303660 A1 | 12/2009 | Nair et al. |
| 2010/0040951 A1 | 2/2010 | Yamamoto et al. |
| 2010/0051856 A1 | 3/2010 | Kim et al. |
| 2010/0209775 A1 | 8/2010 | Kim et al. |
| 2010/0266907 A1 | 10/2010 | Yazami |
| 2010/0285368 A1 | 11/2010 | Yamamoto et al. |
| 2011/0008656 A1 | 1/2011 | Tanahashi et al. |
| 2011/0014522 A1 | 1/2011 | Visco et al. |
| 2011/0020701 A1 | 1/2011 | Park et al. |
| 2011/0020713 A1 | 1/2011 | Cui et al. |
| 2011/0020719 A1 | 1/2011 | Manabe et al. |
| 2011/0067228 A1 | 3/2011 | Green |
| 2011/0111283 A1 | 5/2011 | Rust, III et al. |
| 2011/0129732 A1 | 6/2011 | Bachrach et al. |
| 2011/0159328 A1 | 6/2011 | Yeo |
| 2011/0171518 A1 | 7/2011 | Dunn et al. |
| 2011/0200862 A1 | 8/2011 | Kurosawa |
| 2011/0294015 A1 | 12/2011 | Pirk et al. |
| 2012/0052341 A1 | 3/2012 | Kim et al. |
| 2012/0100438 A1 | 4/2012 | Fasching et al. |
| 2012/0176093 A1 | 7/2012 | Ramasubramanian et al. |
| 2012/0202113 A1 | 8/2012 | Hodge et al. |
| 2012/0288742 A1 | 11/2012 | Tanaka et al. |
| 2013/0078493 A1 | 3/2013 | Chen |
| 2013/0136963 A1 | 5/2013 | Chiba |
| 2013/0143120 A1 | 6/2013 | Ramasubramanian et al. |
| 2013/0189602 A1 | 7/2013 | Lahiri et al. |
| 2013/0202942 A1 | 8/2013 | Sakai et al. |
| 2013/0230751 A1 | 9/2013 | Shaw |
| 2014/0050969 A1 | 2/2014 | Rust, III et al. |
| 2014/0072850 A1 | 3/2014 | Kwon et al. |
| 2014/0272547 A1 | 9/2014 | Ramasubramanian et al. |
| 2014/0335395 A1 | 11/2014 | Ramasubramanian et al. |
| 2015/0007952 A1 | 1/2015 | Moederl et al. |
| 2015/0024253 A1 | 1/2015 | Noh |
| 2015/0033547 A1 | 2/2015 | Yang et al. |
| 2015/0079452 A1 | 3/2015 | Park et al. |
| 2015/0104686 A1 | 4/2015 | Brommer et al. |
| 2015/0135522 A1 | 5/2015 | Seto et al. |
| 2015/0162575 A1 | 6/2015 | Son et al. |
| 2018/0040876 A1 | 2/2018 | Lahiri et al. |
| 2018/0079035 A1 | 3/2018 | Watanabe |
| 2018/0145367 A1 | 5/2018 | Busacca et al. |
| 2018/0166735 A1 | 6/2018 | Busacca et al. |
| 2019/0207264 A1 | 7/2019 | Busacca et al. |
| 2019/0221878 A1 | 7/2019 | Busacca et al. |
| 2019/0319294 A1 | 10/2019 | Busacca et al. |
| 2019/0350633 A1 | 11/2019 | Ramadhyani et al. |
| 2019/0372150 A1 | 12/2019 | Busacca et al. |
| 2020/0212493 A1 | 7/2020 | Busacca et al. |
| 2020/0313146 A1 | 10/2020 | Busacca et al. |
| 2020/0350633 A1 | 11/2020 | Busacca et al. |

FOREIGN PATENT DOCUMENTS

| | | |
|---|---|---|
| CN | 1555588 A | 12/2004 |
| CN | 101960643 A | 1/2011 |
| CN | 102007625 A | 4/2011 |
| CN | 102569758 A | 7/2012 |
| CN | 104347856 A | 2/2015 |

(56) References Cited

FOREIGN PATENT DOCUMENTS

| | | | |
|---|---|---|---|
| CN | 105518904 A | 4/2016 | |
| DE | 102018203033 A1 * | 9/2019 | ........ H01M 10/0404 |
| EP | 0883199 A1 | 12/1998 | |
| EP | 1028476 A1 | 8/2000 | |
| EP | 1100134 A1 | 5/2001 | |
| EP | 1102340 A2 | 5/2001 | |
| EP | 1270765 A1 | 1/2003 | |
| EP | 1465268 A2 | 10/2004 | |
| EP | 2048262 A1 | 4/2009 | |
| EP | 2248207 B1 | 6/2012 | |
| EP | 2858162 A1 | 4/2015 | |
| EP | 2223367 B1 | 6/2015 | |
| EP | 2277214 B1 | 10/2015 | |
| EP | 3051606 A1 | 8/2016 | |
| EP | 3455898 A1 | 3/2019 | |
| EP | 3295507 B1 | 8/2020 | |
| JP | H01132064 A | 5/1989 | |
| JP | H06236768 A | 8/1994 | |
| JP | 2001185224 A | 7/2001 | |
| JP | 2003323882 A | 11/2003 | |
| JP | 2004351500 A * | 12/2004 | |
| JP | 2005149891 A | 6/2005 | |
| JP | 2006100280 A | 4/2006 | |
| JP | 2006173001 A | 6/2006 | |
| JP | 2006236768 A | 9/2006 | |
| JP | 2006286427 A | 10/2006 | |
| JP | 2007258160 A | 10/2007 | |
| JP | 2008171732 A | 7/2008 | |
| JP | 2009170258 A | 7/2009 | |
| JP | 2010146732 A | 7/2010 | |
| JP | 2010225552 A | 10/2010 | |
| JP | 2010262752 A | 11/2010 | |
| JP | 2011171029 A | 9/2011 | |
| JP | 2012516941 A | 7/2012 | |
| JP | 2012160352 A | 8/2012 | |
| JP | 2015505120 A | 2/2015 | |
| JP | 2015064959 A | 4/2015 | |
| JP | 2015172997 A | 10/2015 | |
| JP | 2015220218 A | 12/2015 | |
| JP | 2019169476 A | 10/2019 | |
| KR | 20030044508 A | 6/2003 | |
| KR | 20060050988 A | 5/2006 | |
| KR | 20070021192 A | 2/2007 | |
| KR | 20130105001 A * | 9/2013 | |
| KR | 20150010226 A | 1/2015 | |
| KR | 20150045456 A | 4/2015 | |
| KR | 20170114351 A | 10/2017 | |
| NL | 1015956 C2 | 2/2002 | |
| TW | 201225385 A | 6/2012 | |
| TW | 201414048 A | 4/2014 | |
| WO | 2002043168 A2 | 5/2002 | |
| WO | 2003105258 A1 | 12/2003 | |
| WO | 2005101973 A2 | 11/2005 | |
| WO | 2006064344 A2 | 6/2006 | |
| WO | 2008030215 A2 | 3/2008 | |
| WO | 2008089110 A1 | 7/2008 | |
| WO | 2009109834 A1 | 9/2009 | |
| WO | 2009129490 A1 | 10/2009 | |
| WO | 2009140300 A1 | 11/2009 | |
| WO | 2010090956 A2 | 8/2010 | |
| WO | 2010092059 A1 | 8/2010 | |
| WO | 2010138176 A1 | 12/2010 | |
| WO | 2011154862 A1 | 12/2011 | |
| WO | 2012081331 A1 | 6/2012 | |
| WO | 2013112135 A1 | 8/2013 | |
| WO | 2013112670 A1 | 8/2013 | |
| WO | 2014028230 A1 | 2/2014 | |
| WO | 2014151202 A1 | 9/2014 | |
| WO | 2014024424 A1 | 7/2016 | |
| WO | 20171197233 A1 | 11/2017 | |
| WO | 2019099642 A2 | 5/2019 | |
| WO | 2019099650 A1 | 5/2019 | |
| WO | 2021020480 A1 | 2/2021 | |

OTHER PUBLICATIONS

EPO machine generated English translation of KR-2013-0105001-A (Year: 2013).*
EPO machine generated English translation of JP-2004-351500-A (Year: 2004).*
Collins Dictionary—Definition of fiducial (Year: 2022).*
International Search Report issued for PCT/US2017/032355, dated Aug. 25, 2017 (4 pages).
U.S. Appl. No. 17/471,499, filed Sep. 10, 2021.
U.S. Appl. No. 17/562,228, filed Dec. 27, 2021.
U.S. Appl. No. 17/582,451, filed Jan. 24, 2022.
Alliance Rubber Company, Rubber Band Size Chart, retrieved from www.rubberband.com/public/userfiles/sales-collateral/RubberBandChart.pdf (2 pages).
Arora et al., "Battery Separators," Chem. Reviews, 104(10): 4419-4462 (2004).
Bourderau et al., "Amorphous Silicon as a Possible Anode Material for Li-Ion Batteries," Journal of Power Sources, 81-82: 233-236 (1999).
Broussely et al., "Li-Ion Batteries and Portable Power Source Prospects for the Next 5-10 Years," Journal of Power Sources, 136(2): 386-394 (2004).
Dierks, S., NickelSilicide (Ni2Si) (cas 12059-14-2) MSDS, GuideChem Material safety data sheet, retrieved from www.guidechem.com/cas-120/12059-14-2.html, Sep. 30, 1993, 2 pages.
Golodnitsky et al., "Advanced Materials for the 3D Microbattery," Journal of Power Sources, 153(2): 281-287 (2006).
Google Query Result Page for "Pressure a Rubber Band Can Apply" and "How much pressure does a rubber band have?", 1 page (2021).
Green et al., "Structured Silicon Anodes for Lithium Battery Applications," Electrochemical and Solid State Letters, 6(5): A75-A79 (2003).
Harraz et al., "Different Behavior in Immersion Plating of Nickel on Porous Silicon from Acidic and Alkaline Fluoride Media," J. Electrochemical Society, 150(5): C277-C284 (2003).
Harraz et al., "Immersion Plating of Nickel onto Porous Silicon Layer from Fluoride Solutions," Physica Status Solidi (a), 197(1): 51-56 (2013).
Iaboni et al., "$Li_{15}S_{14}$ Formation in Silicon Thin Film Negative Electrodes," Journal of the Electrochemical Society, 163(2): A255-A261 (2016).
Kasavajjula et al., "Nano- and Bulk-Silicon-Based Insertion Anodes for Lithium-Ion Secondary Cells," Journal of Power Sources, 163(2): 1003-1039 (2007).
Keener Rubber Bands Federal Specifications, retrieved from keener-rubber.com/Federal%2Specifications.html, 1 page (2021).
Li et al., "The Crystal Structural Evolution of Nano-Si Anode Caused by Lithium Insertion and Extraction at Room Temperature," Solid State Ionics, 135(1-4): 181-191 (2000).
Liu, C., Bulk Micromachining and Silicon Anisotropic Etching, Foundations of MEMS, Prentice Hall Inc. Chapter 10, pp. 326-370; Prentice Hall.
Long et al., "Three-Dimensional Battery Architectures" Chemical Reviews, 104(10): 4463-4492 (2004).
Maranchi et al., "High Capacity, Reversible Silicon Thin-Film Anodes for Lithium-Ion Batteries," Electrochemical and Solid-State Letters, 6(9): A198-A201 (2003).
Mu et al., "Silicon Nanotube Array/Gold Electrode for Direct Electrochemistry of Cytochrome C," J. Phys. Chem. B, 111(6): 1491-1495 (2007).
Obrovac et al., "Reversible Cycling of Crystalline Silicon Powder," Journal of The Electrochemical Society, 154(2): A103-A108 (2007).
Roberts et al., "3D Lithium Ion Batteries—From Fundamentals to Fabrication," Journal of Materials Chemistry, Royal Society of Chemistry, 2011, 21: 9876-9890 (2011).
Shin et al., "Porous Silicon Negative Electrodes for Rechargeable Lithium Batteries," Journal of Power Sources, 139(1-2): 314-320 (2005).
Su et al., "Silicon-Based Nanomaterials for Lithium-Ion Batteries: A Review," Advanced Energy Materials, 4(1): 1-23 (2013).
Vyatkin et al., "Random and Ordered Macropore Formation in p-Type Silicon," J. Electrochemical Society, 149(1): G70-G76 (2002).

(56) References Cited

OTHER PUBLICATIONS

Waidmann et al., "Tuning Nickel Silicide Properties Using a Lamp Based RTA, a Heat Conduction Based RTA or a Furnace Anneal," Microelectronic Engineering 83(11-12): 2282-2286 (2006).
Whitehead et al., "Current Collectors for Positive Electrodes of Lithium-Based Batteries," Journal of the Electrochemical Society, 152(11): A5105-A2113 (2005).
Xu et al., "Nickel Displacement Deposition of Porous Silicon with Ultrahigh Aspect Ratio," Journal of The Electrochemical Society, 154(3): 170-174 (2007).
Xu et al., "Theoretical Studies of Displacement Deposition of Nickel into Porous Silicon with Ultrahigh Aspect Ratio," Electrochimica Acta, 52(12): 3901-3909 (2007).
Zhang et al., "High Aspect Ratio Nickel Structures Fabricated by Electrochemical Replication of Hydrofluoric Acid Etched Silicon," Electrochemical and Solid-State Letters, 9(9): C150-C152 (2006).
European Extended Search Report for Application No. 12866772.2; EP2807698, dated Sep. 28, 2015 (3 pages).
European Extended Search Report for Application No. 13740825.8; EP2807694, dated Jul. 31, 2015 (9 pages).
European Extended Search Report for Application No. 13829954.0; EP2885830, dated Feb. 11, 2016 (2 pages).
European Extended Search Report for Application No. 14768734.7; EP2973785, dated Jul. 15, 2016 (10 pages).
European Extended Search Report for Application No. 167933590.7; EP3295507, dated Aug. 15, 2018 (7 pages).
European Extended Search Report for Application No. 17872332.6; EP3542410, dated Aug. 21, 2020 (7 pages).
European Extended Search Report for Application No. 20191612.9; EP3800730, dated Jan. 28, 2021 (7 pages).
European Extended Search Report for Application No. 17796914.4; EP3455898, dated Nov. 7, 2019 (10 pages).
European Search Report for Application No. 19197127.4; EP3641030, dated Jan. 10, 2020 (3 pages).
International Search Report/Written Opinion issued for PCT/US2021/059597, dated Feb. 28, 2022.
International Search Report issued for PCT/US2009/041012, dated Sep. 8, 2009 (4 pages).
International Search Report issued for PCT/US2013/053235, dated Jan. 28, 2014 (5 pages).
International Search Report issued for PCT/US2016/032255, dated Aug. 25, 2017 (4 pages).
International Search Report issued for PCT/US2016/032284, dated Aug. 26, 2016 (4 pages).
International Search Report issued for PCT/US2017/061892, dated Mar. 27, 2018 (6 pages).
International Search Report issued for PCT/US2018/061245, dated May 7, 2019 (10 pages).
International Search Report issued for PCT/US2018/061254, dated Mar. 7, 2019 (5 pages).
International Search Report issued for PCT/US2013/022868, dated May 15, 2013 (3 pages).
International Search Report issued for PCT/US2014/025200, dated Jul. 29, 2014 (4 pages).
International Search Report issued for PCT/US2012/022393, dated Oct. 10, 2012 (4 pages).
International Search Report and Written Opinion issued for PCT/US2021/050208, dated Mar. 3, 2022 (19 pages).
Great Britain Search Report issued for GB1215424.1, dated Dec. 17, 2012 (4 pages).
Taiwanese Search Report issued for Application No. 102129550, dated Sep. 9, 2016 (1 page).
International Search Report and Written Opinion issued for PCT/US2021/062175, dated Mar. 22, 2022 (15 pages).

* cited by examiner

APPARATUS, SYSTEMS AND METHODS FOR THE PRODUCTION OF ELECTRODES FOR USE IN BATTERIES

CROSS-REFERENCE TO RELATED APPLICATIONS

This application is a continuation of PCT/US2021/050208, filed Sep. 14, 2021, which claims priority to U.S. Provisional Patent Application No. 63/081,686, filed 22 Sep. 2020 and U.S. Provisional Patent Application No. 63/080,345, filed 18 Sep. 2020. Reference is made to U.S. patent application Ser. No. 16/533,082, filed on 6 Aug. 2019, U.S. patent application Ser. No. 16/763,078, filed 11 May 2020, U.S. Provisional Patent application No. 62/586,737, filed 15 Nov. 2017, and U.S. Provisional Patent Application No. 62/715,233, filed on 6 Aug. 2018. The contents of each of these applications are hereby incorporated by reference in their entireties.

FIELD

The field of this disclosure relates generally to energy storage technology, such as battery technology. More specifically, the field of this disclosure relates to systems and methods for the production of energy storage systems, such as electrodes for use in batteries, including lithium based batteries.

BACKGROUND

Lithium based secondary batteries have become desirable energy sources due to their comparatively high energy density, power and shelf life. Examples of lithium secondary batteries include non-aqueous batteries such as lithium-ion and lithium-polymer batteries.

Known energy storage devices, such as batteries, fuel cells and electrochemical capacitors, typically have two-dimensional laminar architectures, such as planar or spirally wound (i.e., jellyroll) laminate structures, where a surface area of each laminate is approximately equal to its geometric footprint (ignoring porosity and surface roughness).

FIG. 1 illustrates a cross-sectional view of a known laminar type secondary battery, indicated generally at 10. The battery 10 includes a positive electrode current collector 15 in contact with a positive electrode 20. A negative electrode 25 is separated from the positive electrode 20 by a separator layer 30. The negative electrode 25 is in contact with a negative electrode current collector 35. As shown in FIG. 1, the battery 10 is formed in a stack. The stack is sometimes covered with another separator layer (not shown) above the negative electrode current collector 35, and then rolled and placed into a can (not shown) to assemble the battery 10. During a charging process, a carrier ion (typically, lithium) leaves the positive electrode 20 and travels through the separator layer 30 into the negative electrode 25. Depending upon the anode material used, the carrier ion either intercalates (e.g., sits in a matrix of negative electrode 25 material without forming an alloy) or forms an alloy with the negative electrode 25 material. During a discharge process, the carrier ion leaves the negative electrode 25 and travels back through the separator layer 30 and back into the positive electrode 20.

Three-dimensional secondary batteries may provide increased capacity and longevity compared to laminar secondary batteries. The production of such three-dimensional secondary batteries, however, presents manufacturing and cost challenges. Precision manufacturing techniques used, to-date, can yield secondary batteries having improved cycle life but at the expense of productivity and cost of manufacturing. When known manufacturing techniques are sped up, however, an increased number of defects, loss of capacity and reduced longevity of the batteries can result.

In rocking-chair battery cells, both a positive electrode and a negative electrode of a secondary battery comprises materials into which carrier ions, such as lithium, inserts and extracts. As the battery is discharged, carrier ions are extracted from the negative electrode and inserted into the positive electrode. As the battery is charged, the carrier ions are extracted from the positive electrode and inserted into the negative electrode.

Silicon has become a promising candidate to replace carbonaceous materials as the anode because of its high specific capacity. For instance, graphite anodes formed from $LiC_6$ may have a specific capacity of about 370 milli-amp hours per gram (mAh/g), while crystalline silicon anodes formed from $Li_{15}Si_4$ may have a specific capacity of about 3600 mAh/g, a nearly 10 fold increase over graphite anodes. However, the use of silicon anodes has been limited, due to the large volumetric changes (e.g., 300%) in silicon when Li carrier ions are inserted into silicon anodes. This volumetric increase along with the cracking and pulverization associated with the charge and discharge cycles has limited the use of silicon anodes in practice. In addition, the use of silicon anodes has been limited due to its poor initial columbic efficiency (ICE), which leads to a capacity loss during the initial formation of secondary batteries that utilize silicon anodes.

It is therefore desirable to improve the performance of secondary batteries that utilize silicon-based anodes, and more specifically, to mitigate the issues that silicon anodes exhibit with respect to their poor ICE.

BRIEF DESCRIPTION

In one embodiment, a process for delineating a population of electrode structures in a web is disclosed. The web has a down-web direction, a cross-web direction, an electrochemically active layer, and an electrically conductive layer. The process includes laser machining the web in at least the cross-web direction to delineate members of the population of electrode structure in the web without releasing the delineated members from the web and forming an alignment feature in the web that is adapted for locating each delineated member of the electrode structure population in the web.

In another embodiment, another process for delineating a population of electrode structures in a web is disclosed. The web has a down-web direction, a cross-web direction, an electrochemically active layer, and an electrically conductive layer. The process includes feeding the web to a cutting station and cutting the web in at least the cross-web direction at the cutting station to delineate members of the electrode structure population in the web without releasing the delineated members from the web. The process also includes cutting alignment features in the web that are adapted for locating each delineated member of the electrode structure population in the web.

In another embodiment, another process for delineating a population of electrode structures in a web is disclosed. The web has a down-web direction, a cross-web direction, an electrochemically active layer, and an electrically conductive layer. The process includes feeding the web to a laser cutting system, cutting alignment features into the web using the laser cutting system and establishing a location of the web using at least one of the alignment features. The process further includes performing at least one of a cut action and an ablate action on the web based on the established location.

In another embodiment, a web comprising an electrochemically active layer and an electrically conductive layer is disclosed. The web has a delineated population of electrode structures, each electrode structure of the delineated population of electrode structures being spaced from an adjacent electrode structure by a cross-web cut in the web. The web further includes alignment features adapted for locating each delineated electrode structure of the electrode structure population in the web.

In another embodiment, a web has a delineated population of separator structures. Each separator of the delineated population of separators is spaced from an adjacent separator by a cross-web cut in the web. The web further includes alignment features adapted for locating each delineated separator of the separator population in the web.

DEFINITIONS

Figure 1:
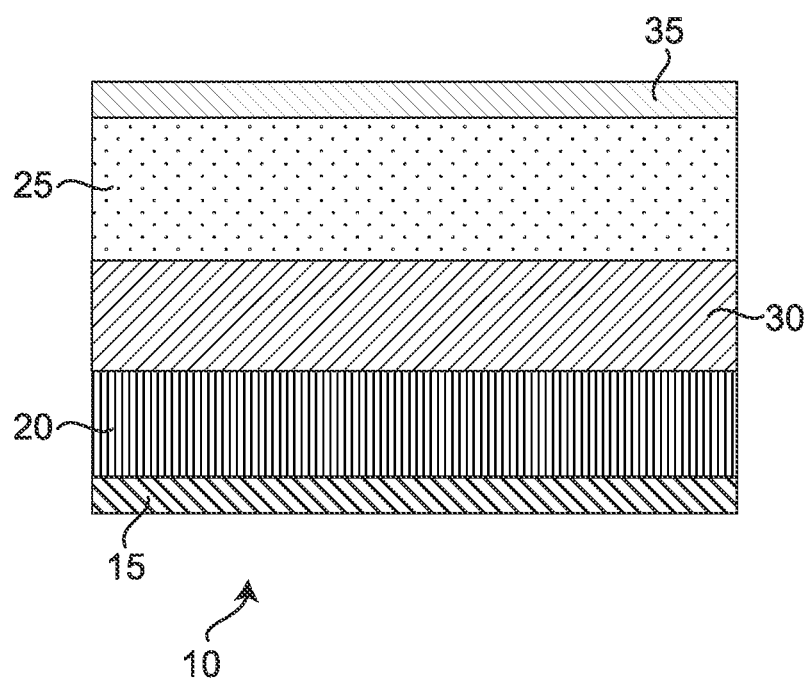
FIG. 1 is a cross-section of an existing laminar battery.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 µm would include 225 µm to 275 µm. By way of further example, in one instance, about 1,000 µm would include 900 µm to 1,100 µm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in the secondary battery.

"Anode material" or "Anodically active" as used herein means material suitable for use as the negative electrode of a secondary battery.

"Capacity" or "C" as used herein refers to an amount of electric charge that a battery (or a sub-portion of a battery comprising one or more pairs of electrode structures and counter-electrode structures that form a bilayer) can deliver at a pre-defined voltage unless the context clearly indicates otherwise.

"Cathode" as used herein in the context of a secondary battery refers to the positive electrode in the secondary battery.

"Cathode material" or "Cathodically active" as used herein means material suitable for use as the positive electrode of a secondary battery.

"Charged state" as used herein in the context of the state of a secondary battery refers to a state where the secondary battery is charged to at least 75% of its rated capacity unless the context clearly indicates otherwise. For example, the battery may be charged to at least 80% of its rated capacity, at least 90% of its rated capacity, and even at least 95% of its rated capacity, such as 100% of its rated capacity.

"Composite material" or "Composite" as used herein refers to a material which comprises two or more constituent materials unless the context clearly indicates otherwise.

"Conversion chemistry active material" or "Conversion chemistry material" refers to a material that undergoes a chemical reaction during the charging and discharging cycles of a secondary battery.

"Counter-electrode" as used herein may refer to the negative or positive electrode (anode or cathode), opposite of the Electrode, of a secondary battery unless the context clearly indicates otherwise.

"Counter-electrode current collector" as used herein may refer to the negative or positive (anode or cathode) current collector, opposite of the Electrode current connector, of a secondary battery unless the context clearly indicates otherwise.

"Cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Discharge capacity" as used herein in connection with a negative electrode means the quantity of carrier ions available for extraction from the negative electrode and insertion into the positive electrode during a discharge operation of the battery between a predetermined set of cell end of charge and end of discharge voltage limits unless the context clearly indicates otherwise.

"Discharged state" as used herein in the context of the state of a secondary battery refers to a state where the secondary battery is discharged to less than 25% of its rated capacity unless the context clearly indicates otherwise. For example, the battery may be discharged to less than 20% of its rated capacity, such as less than 10% of its rated capacity, and even less than 5% of its rated capacity, such as 0% of its rated capacity.

"Electrochemically active material" as used herein means anodically active or cathodically active material.

"Electrode" as used herein may refer to the negative or positive electrode of a secondary battery unless the context clearly indicates otherwise.

"Electrode current collector" as used herein may refer to an anode (e.g., negative) current collector or a cathode (e.g., positive) current collector.

"Electrode material" as used herein may refer to anode material or cathode material unless the context clearly indicates otherwise.

"Electrode structure" as used herein may refer to an anode structure (e.g., negative electrode structure) or a cathode structure (e.g., positive electrode structure) adapted for use in a battery unless the context clearly indicates otherwise.

"Electrolyte" as used herein refers to a non-metallic liquid, gel, or solid material in which current is carried by the movement of ions adapted for use in a battery unless the context clearly indicates otherwise.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter.

"Microstructure" as used herein may refer to the structure of a surface of a material revealed by an optical microscope above about 25× magnification unless the context clearly indicates otherwise.

"Microporous" as used herein may refer to a material containing pores with diameters less than about 2 nanometers unless the context clearly indicates otherwise.

"Macroporous" as used herein may refer to a material containing pores with diameters greater than about 50 nanometers unless the context clearly indicates otherwise.

"Nanoscale" or "Nanoscopic scale" as used herein may refer to structures with a length scale in the range of about 1 nanometer to about 100 nanometers.

"Polymer" as used herein may refer to a substance or material consisting of repeating subunits of macromolecules unless the context clearly indicates otherwise.

"Reversible coulombic capacity" as used herein in connection with an electrode (i.e., a positive electrode, a negative electrode or an auxiliary electrode) means the total capacity of the electrode for carrier ions available for reversible exchange with a counter electrode.

"Void fraction" or "Porosity" or "Void volume fraction" as used herein refers to a measurement of the voids (i.e., empty) spaces in a material, and is a fraction of the volume of voids over the total volume of the material, between 0 and 1, or as a percentage between 0% and 100%.

"Weakened region" refers to a portion of the web that has undergone a processing operation such as scoring, cutting, perforation or the like such that the local rupture strength of the weakened region is lower than the rupture strength of a non-weakened region.

DETAILED DESCRIPTION

Embodiments of the present disclosure relate to apparatuses, systems and methods for the production of electrode components for batteries, such as three-dimensional secondary batteries that improve the speed of manufacture of the electrode components, while retaining or improving battery capacity and battery longevity, and reducing the occurrences of defects during the manufacturing process.

An exemplary system for the production of electrode components, including electrodes and separators, for use in batteries will be described with reference to FIG. 2. The electrode production (or manufacturing) system, indicated generally at 100, includes a number of discrete stations, systems, components, or apparatuses that function to enable the efficient production of precision electrodes for use in batteries. The production system 100 is described first generally, with respect to FIG. 2, and subsequently additional detail of each component is then further described after the broader production system 100 is introduced.

In the illustrated exemplary embodiment, the production system 100 includes a base unwind roller 102 for holding and unwinding a web of base material 104. The web of base material 104 may be a web of electrode material (i.e., a web of anode material 502 or a web of cathode material 504), separator material or the like suitable for the production of an electrode assembly for a secondary battery. The web of base material 104 is a thin sheet of material that has been wound into the form of a roll, having a center through hole sized for placement on the base unwind roller 102. In some embodiments, the web of base material 104 is a multi-layer material including, for example, an electrode current collector layer (i.e., an anode current collector layer 506 or a cathode current collector layer 510), and an electrochemically active material layer (i.e., an anodically active material layer 508 or a cathodically active material layer 512) on at least one major surface thereof, and in other embodiments the web of base material 104 may be a single layer (e.g., a web of separator material). The base unwind roller 102 may be formed from metal, metal alloy, composite, plastic or any other material that allows the production system 100 to function as described herein. In one embodiment, the base unwind roller 102 is made of stainless steel and has a diameter of 3 inches (76.2 mm).

Figure 2:
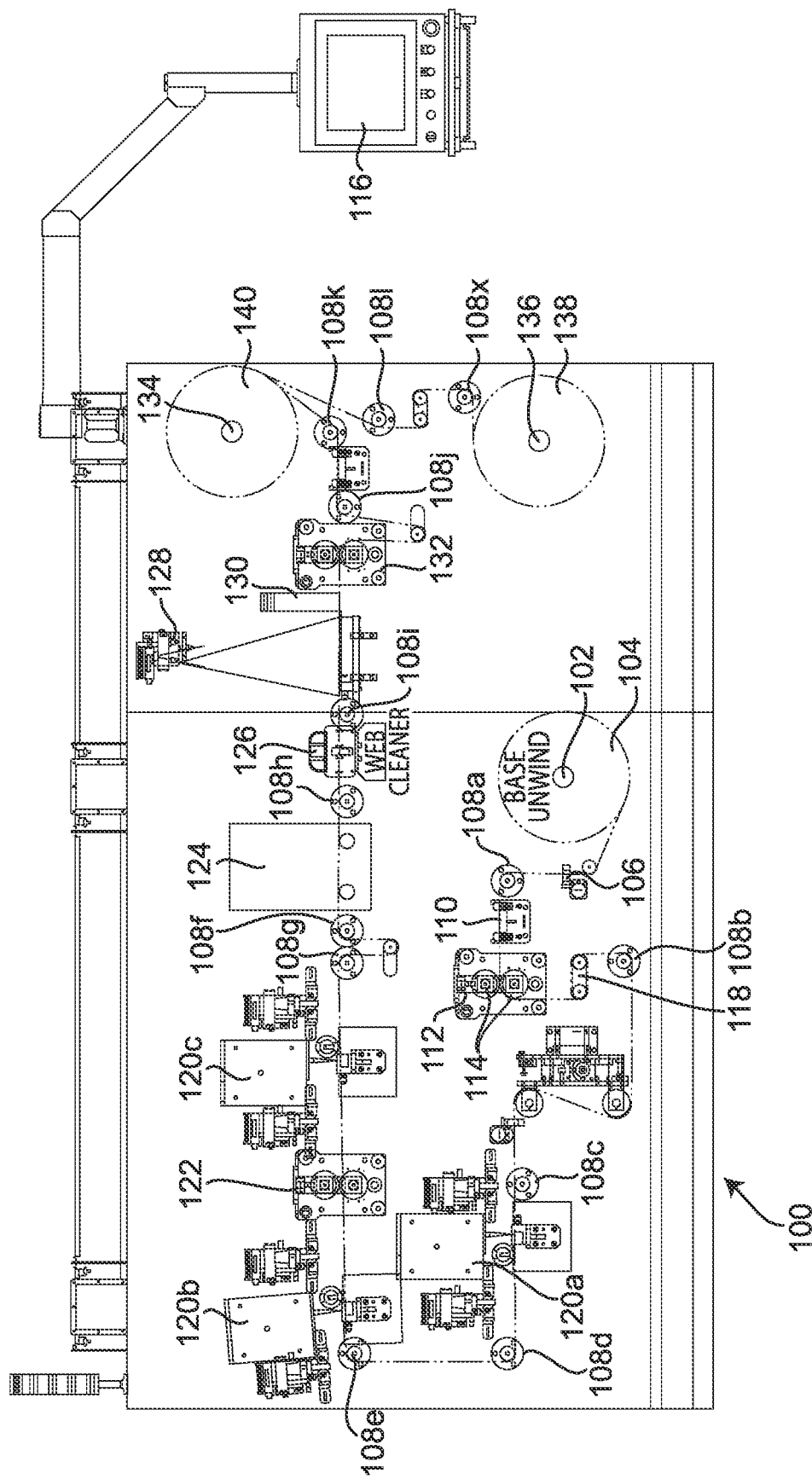
FIG. 2 is a schematic diagram of one suitable embodiment of an electrode manufacturing system according to the present disclosure.

As seen in the embodiment of FIG. 2, the web of base material 104 is passed across an edge guide 106, to facilitate unwinding of the web of base material 104. In one embodiment, the edge guide 106 uses a through-beam type optical sensor to the position of one edge of the web of base material 104 relative to a fixed reference point. Feedback is sent from the edge guide 106 to a "web steering" roller, generally the base unwind roller 102, which will move in a direction perpendicular to the direction of travel of the web of base material 104. In this embodiment, the web of base material 104 then passes around an idler 108a and into a splicing station 110. The idler 108a (also may be referred to as an idle roller) facilitates maintaining proper positioning and tension of the web of base material 104, as well as to change the direction of the web of base material 104. In the embodiment shown in FIG. 2, the idler 108a receives the web of base material 104 in a vertical direction, and is partially wrapped around the idler 108a such that the web of base material 104 leaves the idler 108a in an output direction substantially ninety degrees from the input direction. However, it should be appreciated that the input and output directions may vary without departing from the scope of this disclosure. In some embodiments, the production system 100 may use multiple idlers 108a-108x to change the direction of the web of base material 104 one or more times as it is conveyed through the production system 100. The idlers 108a-108x may be formed from metal, metal alloy, composite, plastic, rubber or any other material that allows the production system 100 to function as described herein. In one embodiment, the idlers 108a-108x are made of stainless steel and have dimensions of 1 inch (25.4 mm) diameter×18 inches (457.2 mm) length.

The splicing station 110 is configured to facilitate splicing (e.g., connecting) two separate webs together. In one suitable embodiment, as a first web of base material 104 is unwound, such that a trailing edge (not shown) of the web of base material 104 is stopped within the splicing station 110, a leading edge (not shown) of a second web of base material 104 is unwound into the splicing station 110 such that the trailing edge of the first web of base material 104 and the leading edge of the second web of base material 104 are adjacent one another. The user may then apply an adhesive, such as an adhesive tape, to join the leading edge of the second web of base material 104 to the trailing edge of the first web of base material 104 to form a seam between the two webs and create a continuous web of base material 104. Such process may be repeated for numerous webs of base material 104, as dictated by a user. Thus, the splicing station 110 allows for the possibility of having multiple webs of base material being spliced together to form one continuous web. It should be appreciated that in other embodiments, a user may splice webs of the same, or different, materials together if desired.

In one suitable embodiment, upon exiting the splicing station 110, the web of base material 104 is then conveyed in the down-web direction WD such that it may enter a nip roller 112. The nip roller 112 is configured to facilitate controlling the speed at which the web of base material 104 is conveyed through the production system 100. In one embodiment, the nip roller 112 includes at least two adjacent rollers 114 having a space therebetween defining a nip. The nip is sized such that the web of base material 104 is pressed against each of the two adjacent rollers 114, with enough pressure to allow friction of the rollers to move the web of base material 104, but a low enough pressure to avoid any significant deformation or damage to the web of base material 104. In some suitable embodiments, the pressure exerted against the web of base material 104 by the at least two adjacent rollers 114 is set between 0 to 210 pounds of force across the cross-web span of the web $S_W$ (i.e., the edge to edge distance of the web in the cross-web direction XWD) (FIGS. 6, 8A) of base material 104 in the cross-web direction XWD, such as 0 lb, 5 lb, 10 lb, 15 lb, 20 lb, 25 lb, 30 lb, 35 lb, 40 lb, 45 lb, 50 lb, 55 lb, 60 lb, 65 lb, 70 lb, 75 lb, 80 lb, 85 lb, 90 lb, 95 lb, 100 lb, 110 lb, 120 lb, 130 lb, 140 lb, 150 lb, 160 lb, 170 lb, 180 lb, 190 lb, 200 lb, or 210 lb of force.

In one suitable embodiment, at least one of the adjacent rollers 114 is a compliant roller which may be a high friction roller driven by an electric motor, and another of the adjacent rollers 114 is a low friction passive roller. The compliant roller may have at least an exterior surface made from rubber or polymer capable of providing sufficient grip on the web of base material 104 to provide a pushing or pulling force on the web of base material 104 to convey it through the production system 100. In one embodiment, at least one of the adjacent rollers 114 is a steel roller having a diameter of about 3.8 inches, such as 3.863 inches (98.12 mm). In another embodiment, at least one of the adjacent rollers 114 is a rubber roller having a diameter of about 2.5 inches, such as 2.54 inches (64.51 mm). In yet another embodiment, one or more of the adjacent rollers 114 include a rubber ring placed thereon which may be adjusted for placement at any location along the width of the roller, each ring having an outer diameter of about 3.90 inches (99.06 mm). It should be appreciated that the diameters of the rollers may be less than or greater than such amounts so long as the rollers function as described herein. In one embodiment, the rubber rings are placed on the rollers to contact the web of base material 104 at a continuous outer edge thereof to drive the web of base material 104 in the down-web direction WD. Accordingly, the speed of the web of base material 104 is controlled by controlling the rate of rotation of the high friction roller via user interface 116. In other embodiments, each of the adjacent rollers 114 may be made from any high friction or low friction material, that allows the production system 100 to function as described herein. It should be appreciated that one or a plurality of the adjacent rollers 114 may be connected to a motor (not shown) for controlling the speed of the web of base material 104 passing through the nip. The production system 100 may include one or more additional nip rollers 122, 132 to facilitate control of the speed of the web of base material 104 conveyed through the production system 100, which may be controlled via user interface 116. When multiple nip rollers 112, 122, and 132 are used, each of the nip rollers 112, 122, and 132 may be set via user interface 116 to the same speed such that the web of base material 104 is conveyed smoothly through production system 100.

The production system 100 may also include a dancer 118. As seen in FIG. 2, the illustrated dancer 118 includes a pair of rollers spaced apart from one another, but connected about a central axis between the pair of rollers of the dancer 118. The pair of rollers of the dancer 118 may rotate about the central axis, thereby passively adjusting the tension on the web of base material 104. For example, if the tension on the web of base material 104 exceeds a predetermined threshold, the pair of rollers of the dancer 118 rotate about the central axis to reduce the tension on the web. Accordingly, the dancer 118 may use the mass of the dancer 118 alone (e.g., the mass of one or more of the pair of rollers), a spring, torsion rod or other biasing/tensioning device which may be user adjustable or controllable via user interface 116, to ensure a proper tension is consistently maintained on the web of base material 104. In one embodiment, the mass of the dancer 118 and inertia of the dancer 118 are reduced or minimized to allow for web tension at or below 500 gram force, for example by using hollow rollers made of aluminum. In other embodiments, the rollers of the dancer 118 are made of other lightweight materials such as carbon fiber, aluminum alloys, magnesium, other lightweight metals and metal alloys, fiberglass or any other suitable material that allows for a mass low enough to provide a web tension at or below 500 gram force. In yet another embodiment, the rollers of the dancer 118 are counterbalanced to allow a tension in the web of base material 104 of 250 gram force or less.

Figure 13:
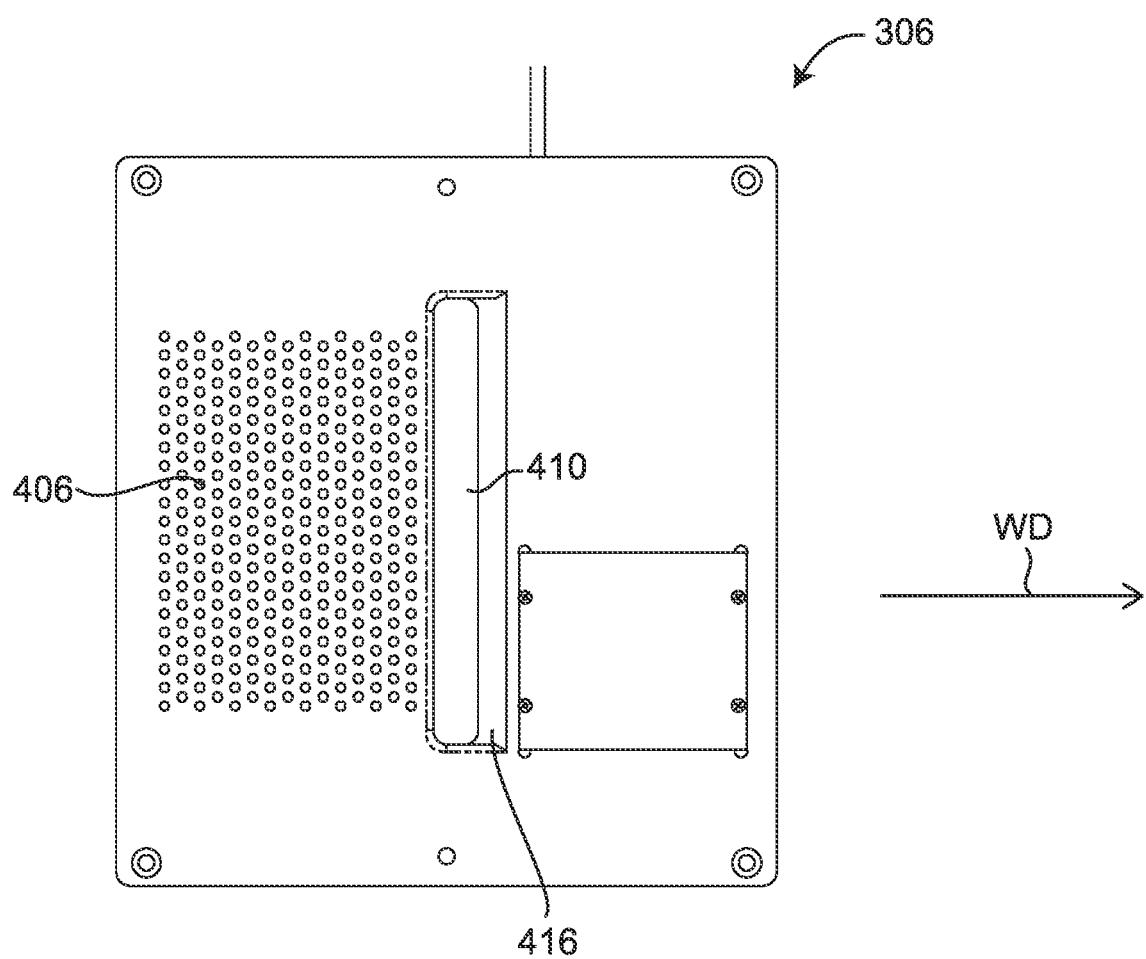
FIG. 13 is a top view of a chuck according to one suitable embodiment of the current disclosure.

The production system 100 includes one or more laser systems 120a, 120b, and 120c. The embodiment shown in FIG. 2 includes three laser systems 120a-c, but it should be appreciated that any number of laser systems 120 may be used to allow the production system 100 to function as described herein. Further description of the laser systems 120a-c is made with reference to FIG. 3. In one suitable embodiment, at least one of the laser systems 120a-c includes a laser device 300 configured to emit a laser beam 302 toward a cutting plenum 304. In the illustrated embodiment, the cutting plenum 304 includes a chuck 306 and a vacuum 308. Details of the chuck 306 are best shown in FIGS. 4 and 13, further described below. In one suitable embodiment, adjacent the laser system 120, are one or more inspection devices 310, 312, which may be visual inspection devices such as a camera or any other suitable inspection system which allows the production system 100 to function as further described herein.

The exemplary production system 100 illustrated in FIG. 2 includes one or more cleaning stations such as brushing station 124 and air knife 126. Each cleaning station is configured to remove or otherwise facilitate removal of debris (not shown) from the web of base material 104, as described further herein.

The production system 100 of FIG. 2 includes an inspection station 128 to identify defects and an associated defect marking system 130 to mark the web of base material 104 to identify locations of identified defects, as described further herein.

In one suitable embodiment, the web of base material 104 is rewound via a rewind roller 134 together with a web of interleaf material 138, which is unwound via interleaf roller 136 to create a roll of electrodes 140 with layers of the electrodes separated by a web of interleaf material 138. In some embodiments, the web of base material 104 can be rewound via the rewind roller 134 without the web of interleaf material 138.

It should be noted that the series of nip rollers 112, 122, and 132, idlers 108a-x, and dancers 118 may be together referred to as a conveying system for conveying the web of base material 104 through the production system 100. As used herein, a conveying system or conveying of the web of base material 104 refers to intended movement of the web of base material 104 through the production system 100 in the down-web direction WD.

Figure 5:
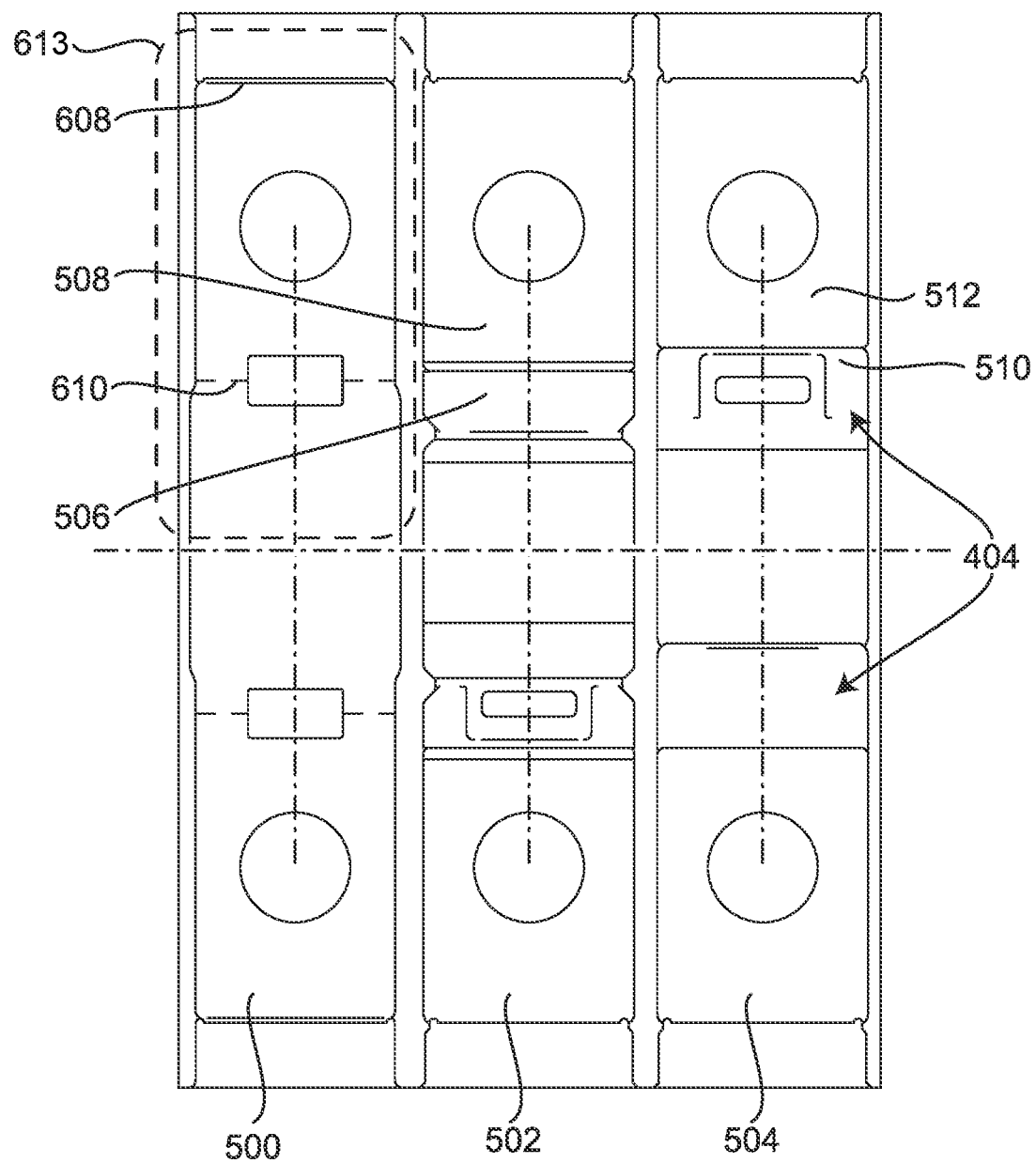
FIG. 5 is a truncated top view of exemplary webs of base material formed into electrodes after having been processed through the electrode manufacturing system of the current disclosure.

With reference to FIG. 5, the web of base material 104 may be any material suitable for the production of electrode components for use in batteries as described herein. For example, web of base material 104 may be an electrically insulating separator material 500, an anode material 502 or a cathode material 504. In one suitable embodiment, the web of base material 104 is an electrically insulating and ionically permeable polymeric woven material suitable for use as a separator in a secondary battery.

In another suitable embodiment, the web of base material 104 is a web of anode material 502, which may include an anode current collector layer 506 and an anodically active material layer 508. In one embodiment, the anode current collector layer 506 comprises a conductive metal such as copper, copper alloys or any other material suitable as an anode current collector layer. The anodically active material layer 508 may be formed as a first layer on a first surface of the anode current collector layer 506 and a second layer on a second opposing surface of the anode current collector layer 506. In another embodiment, the anode current collector layer 506 and anodically active material layer 508 may be intermixed. The first surface and the second opposing surface may be referred to as major surfaces, or front and back surfaces, of the web of base material 104. A major surface, as used herein, refers to the surfaces defined by the plane formed by the length of the web of base material 104 in the down-web direction WD and the span of the web of base material 104 in the cross web direction XWD.

In general, when the web of base material 104 is a web of anode material 502, the anodically active material layer(s) 508 thereof will (each) have a thickness of at least about 10 µm. For example, in one embodiment, the anodically active material layer(s) 508 will (each) have a thickness of at least about 40 µm. By way of further example, in one such embodiment the anodically active material layer(s) 508 will (each) have a thickness of at least about 80 µm. By way of further example, in one such embodiment the anodically active material layers 508 will (each) have a thickness of at least about 120 µm. Typically, however, the anodically active material layer(s) 508 will (each) have a thickness of less than about 60 µm or even less than about 30 µm.

Exemplary anodically active materials for use as the anodically active material layer(s) 508 include carbon materials such as graphite, soft or hard carbons, or graphene (e.g., single-walled or multi-walled carbon nanotubes), or any of a range of metals, semi-metals, alloys, oxides, nitrides and compounds capable of intercalating lithium or forming an alloy with lithium. Specific examples of the metals or semi-metals capable of constituting the anode material 502 include graphite, tin, lead, magnesium, aluminum, boron, gallium, silicon, Si/C composites, Si/graphite blends, silicon oxide ($SiO_x$), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material layer 508 comprises aluminum, tin, or silicon, or an oxide thereof, a nitride thereof, a fluoride thereof, or other alloy thereof. In another exemplary embodiment, the anodically active material layer 508 comprises silicon or an alloy or oxide thereof.

In one embodiment, the anodically active material layer 508 is microstructured to provide a significant void volume fraction to accommodate volume expansion and contraction as lithium ions (or other carrier ions) are incorporated into or leave the anodically active material layer 508 during charging and discharging processes. In general, the void volume fraction of (each of) the anodically active material layer(s) 508 is at least 0.1. Typically, however, the void volume fraction of (each of) the anodically active material layer(s) 508 is not greater than 0.8. For example, in one embodiment, the void volume fraction of (each of) the anodically active material layer(s) 508 is about 0.15 to about 0.75. By way of the further example, in one embodiment, the void volume fraction of (each of) the anodically active material layer(s) 508 is about 0.2 to about 0.7. By way of the further example, in one embodiment, the void volume fraction of (each of) the anodically active material layer(s) 508 is about 0.25 to about 0.6.

Depending upon the composition of the microstructured anodically active material layer 508 and the method of its formation, the microstructured anodically active material layer 508 may comprise macroporous, microporous, or mesoporous material layers or a combination thereof, such as a combination of microporous and mesoporous, or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth, and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched, or dendritic, and smooth or rough-walled. Additionally, the void volume may comprise open or closed voids, or a combination thereof. In one embodiment, the void volume comprises open voids, that is, the anodically active material layer 508 contains voids having openings at the lateral surface of the anodically active material layer 508 through which lithium ions (or other carrier ions) can enter or leave the anodically active material layer 508; for example, lithium ions may enter the anodically active material layer 508 through the void openings after leaving the cathodically active material layer 512. In another embodiment, the void volume comprises closed voids, that is, the anodically active material layer 508 contains voids that are enclosed within the anodically active material layer 508. In general, open voids can provide greater interfacial surface area for the carrier ions whereas closed voids tend to be less susceptible to solid electrolyte interface while each provides room for expansion of the anodically active material layer 508 upon the entry of carrier ions. In certain embodiments, therefore, it is preferred that the anodically active material layer 508 comprise a combination of open and closed voids.

In one embodiment, the anodically active material layer 508 comprises porous aluminum, tin or silicon or an alloy, an oxide, or a nitride thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anodically active material layer 508 will generally have a porosity fraction of at least about 0.1, but less than 0.8 and have a thickness of about 1 to about 100 micrometers. For example, in one embodiment, the anodically active material layer 508 comprises porous silicon, has a thickness of about 5 to about 100 micrometers, and has a porosity fraction of about 0.15 to about 0.75. By way of further example, in one embodiment, the anodically active material layer 508 comprises porous silicon, has a thickness of about 10 to about 80 micrometers, and has a porosity fraction of about 0.15 to about 0.7. By way of further example, in one such embodiment, the anodically active material layer 508 comprises porous silicon, has a thickness of about 20 to about 50 micrometers, and has a porosity fraction of about 0.25 to about 0.6. By way of further example, in one embodiment, the anodically active material layer 508 comprises a porous silicon alloy (such as nickel silicide), has a thickness of about 5 to about 100 micrometers, and has a porosity fraction of about 0.15 to about 0.75.

In another embodiment, the anodically active material layer 508 comprises fibers of aluminum, tin or silicon, or an alloy thereof. Individual fibers may have a diameter (thickness dimension) of about 5 nm to about 10,000 nm and a length generally corresponding to the thickness of the anodically active material layer 508. Fibers (nanowires) of silicon may be formed, for example, by chemical vapor deposition or other techniques known in the art such as vapor liquid solid (VLS) growth and solid liquid solid (SLS) growth. Additionally, the anodically active material layer 508 will generally have a porosity fraction of at least about 0.1, but less than 0.8 and have a thickness of about 1 to about 200 micrometers. For example, in one embodiment, the anodically active material layer 508 comprises silicon nanowires, has a thickness of about 5 to about 100 micrometers, and has a porosity fraction of about 0.15 to about 0.75. By way of further example, in one embodiment, the anodically active material layer 508 comprises silicon nanowires, has a thickness of about 10 to about 80 micrometers, and has a porosity fraction of about 0.15 to about 0.7. By way of further example, in one such embodiment, the anodically active material layer 508 comprises silicon nanowires, has a thickness of about 20 to about 50 micrometers, and has a porosity fraction of about 0.25 to about 0.6. By way of further example, in one embodiment, the anodically active material layer 508 comprises nanowires of a silicon alloy (such as nickel silicide), has a thickness of about 5 to about 100 micrometers, and has a porosity fraction of about 0.15 to about 0.75.

In general, the anode current collector layer 506 will have an electrical conductivity of at least about $10^3$ Siemens/cm. For example, in one such embodiment, the anode current collector layer 506 will have a conductivity of at least about $10^4$ Siemens/cm. By way of further example, in one such embodiment, the anode current collector layer 506 will have a conductivity of at least about $10^5$ Siemens/cm. Exemplary electrically conductive materials suitable for use as anode current collector layers 506 include metals, such as, copper, nickel, cobalt, titanium, and tungsten, and alloys thereof.

Referring again to FIG. 5, in another suitable embodiment, the web of base material 104 is a web of cathode material 504, which may include a cathode current collector layer 510 and a cathodically active material layer 512. The cathode current collector layer 510 of the cathode material 504 may comprise aluminum, an aluminum alloy, titanium or any other material suitable for use as a cathode current collector layer 510. The cathodically active material layer 512 may be formed as a first layer on a first surface of the cathode current collector layer 510 and a second layer on a second opposing surface of the cathode current collector layer 510. The cathodically active material layer 512 may be coated onto one or both sides of cathode current collector layer 510. Similarly, the cathodically active material layer 512 may be coated onto one or both major surfaces of cathode current collector layer 510. In another embodiment, the cathode current collector layer 510 may be intermixed with cathodically active material layer 512.

In general, when the web of base material 104 is a web of cathode material 504, the cathodically active material layer(s) 512 thereof will (each) have a thickness of at least about 20 μm. For example, in one embodiment, the cathodically active material layer(s) 512 will (each) have a thickness of at least about 40 μm. By way of further example, in one such embodiment the cathodically active material layer(s) 512 will (each) have a thickness of at least about 60 μm. By way of further example, in one such embodiment the cathodically active material layer(s) 512 will (each) have a thickness of at least about 100 μm. Typically, however, the cathodically active material layer(s) 512 will (each) have a thickness of less than about 90 μm or even less than about 70 μm.

Exemplary cathodically active materials include any of a wide range of cathodically active materials. For example, for a lithium-ion battery, the cathodically active material layer 512 may comprise a cathodically active material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathodically active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, and combinations thereof.

In general, the cathode current conductor layer 510 will have an electrical conductivity of at least about $10^3$ Siemens/cm. For example, in one such embodiment, the cathode current conductor layer 510 will have a conductivity of at least about $10^4$ Siemens/cm. By way of further example, in one such embodiment, the cathode current conductor layer 510 will have a conductivity of at least about $10^5$ Siemens/cm. Exemplary cathode current conductor layers 510 include metals, such as aluminum, nickel, cobalt, titanium, and tungsten, and alloys thereof.

Referring again to FIG. 5, in another suitable embodiment, the web of base material 104 is a web of electrically insulating but ionically permeable separator material. Electrically insulating separator materials 500 are adapted to electrically isolate each member of the anode population from each member of the cathode population of a secondary battery. Electrically insulating separator material 500 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%

In general, when the web of base material 104 is a web of electrically insulating separator material 500, the electrically insulating separator material 500 will have a thickness of at least about 4 μm. For example, in one embodiment, the electrically insulating separator material 500 will have a thickness of at least about 8 μm. By way of further example, in one such embodiment the electrically insulating separator material 500 will have a thickness of at least about 12 μm. By way of further example, in one such embodiment the electrically insulating separator material 500 will have a thickness of at least about 15 μm. Typically, however, the electrically insulating separator material 500 will have a thickness of less than about 12 μm or even less than about 10 μm.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75 vol %. In one embodiment, the microporous separator material has a porosity (void fraction) of at least about 25 vol %. In one embodiment, the microporous separator material will have a porosity of about 35-55 vol %.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1 \times 10^{-4}$ S/cm. By way of further example, in one embodiment, the particulate material has a conductivity for carrier ions of less than $1 \times 10^{-5}$ S/cm. By way of further example, in one embodiment, the particulate material has a conductivity for carrier ions of less than $1 \times 10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, BaO, ZnO, $ZrO_2$, BN, $Si_3N_4$, $Ge_3N_4$. See, for example, P. Arora and J. Zhang, "Battery Separators" Chemical Reviews 2004, 104, 4419-4462. In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

In an assembled energy storage device, the microporous separator material is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

In yet other embodiments, the web of base material 104 may be any material suitable for the production of electrode components for use in solid state secondary batteries, such as those described in U.S. Pat. No. 9,553,332, issued Jan. 24, 2017, which is hereby incorporated by reference in its entirety. For example, in some embodiments, the web of base material 104 may comprise an electrode current collector material, such as a negative electrode current collector or positive electrode current collector material. The electrode current collector material, in some embodiments, may comprise copper, nickel, nickel-coated copper, iron-coated copper, copper-coated aluminum, aluminum, titanium, stainless steel, or other materials known not to alloy with lithium and configured to function as an anode current collector. In another embodiment, the web of base material 104 is a positive electrode current collector material comprising aluminum, aluminum foil, carbon-coated aluminum foil. In such embodiments, the electrode current collector material may be a metal coating as opposed to being a foil, created with standard routes such as electroplating, electroless plating, PVD, metal nanoparticle sintering, and/or sol-gel with post-reduction.

In another embodiment, for example for solid state secondary batteries, the web of base material 104 may comprise a solid state electrolyte material, such as those described in such as those described in U.S. Pat. No. 9,553,332, referenced above. In this embodiment, the web of base material 104 may comprise a fast lithium ion conductor with a conductivity of greater than $10^{-5}$ S/cm, such as garnet, LiPON, antiperovskite, LISICON, thio-LISICON, sulfide, oxysulfide, polymer, composite polymer, ionic liquid, gel, or organic liquid. The electrolyte has a thickness ranging from about 0.1 μm to about 40 μm, but includes variations. In some examples, the electrolyte thickness is 25 μm, i.e., 25 microns. In some examples, the electrolyte thickness is 25 μm or less, i.e., 25 microns or less.

In another embodiment, for example for solid state secondary batteries, the web of base material 104 may comprise a catholyte material, such as those described in such as those described in U.S. Pat. No. 9,553,332, referenced above. In this embodiment, the web of base material 104 comprises a catholyte material comprising a lithium, germanium, phosphorous, and sulfur ("LGPS") containing material or a lithium, silicon, phosphorous, and sulfur ("LSPS") containing material, each of which is configured in a polycrystalline or amorphous state. In this embodiment, the catholyte material has an ion conductivity greater than $10^{-4}$ S/cm and preferably greater than $10^{-3}$ S/cm. In one embodiment, the catholyte material has a particle size that is smaller than an active region particle size. For example, the median catholyte particle in some embodiments has a diameter three times or more smaller than the median active particle size. The catholyte material may alternately be configured in a core-shell structure as a coating around the cathode active material. In a further variation, the catholyte material may be configured as nanorods or nanowires. In this embodiment, the web of base material 104 may also include a cathode electronically conducting species such as carbon, activated carbon, carbon black, carbon fibers, carbon nanotubes, graphite, graphene, fullerenes, metal nanowires, super P, and other materials known in the art. The cathode region further comprises a binder material to improve the adhesion of the cathode to the substrate and the cohesion of the cathode to itself during cycling. In an embodiment, the catholyte material has an oxygen species configured within the LGPS or LSPS containing material. In another embodiment, the oxygen species has a ratio to the sulfur species of 1:2 and less to form a LGPSO material or LSPSO material. In an example, the oxygen species is less than 20 percent of the LGPSO material.

In yet other embodiments, the web of base material 104 may be is suitable for the production of electrode components for use in solid state secondary batteries, such as those described in U.S. Pat. No. 955,333, referenced above wherein the catholyte material is characterized as a solid. In this embodiment, the catholyte material has a substantially fixed compound structure, which behaves like a solid rather than a fluid. In one embodiment, the solid catholyte material is fabricated by physical vapor deposition (PVD), chemical vapor deposition (CVD), atomic layer deposition (ALD), and solid state reaction of powders, mechanical milling of powders, solution synthesis, evaporation, or any combination thereof. In another embodiment, the catholyte material is mixed with the active material in a mixer or mill or with different configurations of physical vapor deposition, optionally mixed with carbon, and coated onto a substrate by gravure, comma coating, meyer rod coating, doctor blading, slot die coating, or with a conventional technique. In another embodiment, the catholyte material is coated directly on cathode active material with a vapor phase growth, mechanofusion, liquid phase growth, deposition on particles in a fluidized bed or rotary reactor, or combinations thereof, or the like. In another embodiment, the web of base material 104 comprises a polymer material comprising a lithium species. The polymer material may be formed overlying the catholyte material. The polymer material in some embodiments is polyacrylonitrile, poly-ethylene oxide, PvDF, PvDF-HFP, rubbers like butadiene rubber and styrene butadiene rubber, among others.

In one embodiment, web of base material 104 may have an adhesive tape layer (not shown) adhered to one or both surfaces of the anodically active material layer 508, or cathodically active material layer 512, respectively. The adhesive layer may then later be removed subsequent to ablation and cutting (described below) to remove unwanted material or debris.

Embodiments of the laser systems 120a-c are further described with reference to FIGS. 2-6. The web of base material 104 enters the laser system 120 in the down-web direction WD. In one embodiment, the web of base material 104 enters the laser system 120a in a first condition 400, having not yet been ablated or cut. Accordingly, the web of base material 104 in the first condition 400 should have substantially no defects or alterations from an initial state. The web of base material 104 passes over chuck 306, which includes a plurality of vacuum holes 406. The vacuum holes 406 are in fluid connection with vacuum 308, to draw a vacuum pressure on the web of base material 104 passing over the vacuum holes 406. The vacuum holes 406 may be staggered and/or be chamfered to allow the web of base material 104 to more easily pass thereover without snagging. The cross-sectional area of the holes must be small enough to prevent the web of base material 104 from being drawn therein, but large enough to allow proper airflow from the vacuum therethrough. The vacuum pressure facilitates maintaining the web of base material 104 in a substantially flat/planar state as it is conveyed across chuck 306. In some suitable embodiments, the laser system 120 is sensitive to focus, and in such embodiments it is critical to keep the web of base material 104 at a substantially constant distance, for example from +/−100 microns of a predetermined position, from laser output 313, to ensure laser beam 302 is in focus when contacting the web of base material 104 during cutting or ablating processes. Accordingly, the vacuum pressure through vacuum holes 406 may be monitored and adjusted in real time, for example via user interface 116, to ensure that the web of base material 104 remains substantially flat across chuck 306 and does not lift or buckle while being processed. The cross-sectional shape of the vacuum holes 406 may be circular, square, rectangular, oval or any other shape that allows the chuck 306 to function as described herein.

As seen in FIG. 4, the chuck 306 (e.g., support surface) includes an opening 410 defined by an upstream edge 412 and the downstream edge 414. The illustrated chuck 306 includes a chamfer 416 on the downstream edge 414. In this embodiment, the chamfer 416 facilitates the web of base material 104 passing over downstream edge 414 without having the web of base material 104 catch or snag on the downstream edge 414. The angle α of the chamfer 416 may be between 1 degree and 90 degrees, such as 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees or any other angle that allows chamfer 416 to function as describes herein. It the illustrated embodiment, for example, the angle α is approximately 25 degrees. It has been found that performance is improved if the angle α of the chamfer 416 is greater than the deflection of the web of base material 104 passing over the chamfer 416. Upper edge 418 of chamfer 416 may be radiused to provide a smooth transition from the chamfer 416 to the surface of the chuck 306.

In one suitable embodiment, the chuck 306 is formed from aluminum. However, the chuck 306 may be formed from aluminum alloy, composites, metals or metal alloys or any other suitable material that allows chuck 306 to function as described herein. In one embodiment, the material of the chuck 306, such as aluminum, facilitates heat dissipation from the web during laser machining.

In one suitable embodiment, the web of base material 104 is first ablated by laser beam 302 (FIG. 3) to create the ablations 404 (FIG. 4) in the web of base material 104 such that it is in a second condition 402 after being ablated by laser beam 302. In one embodiment, the web of base material 104 is anode material 502, and the ablations 404 remove the anodically active material layer 508 to expose anode current collector layer 506 (FIG. 5). In another embodiment, the web of base material 104 is cathode material 504, and the ablations 404 remove the cathodically active material layer 512 to expose cathode current conductor layer 510. In one embodiment, the ablations 404 are configured as electrode tabs (adapted to electrically connect the cathode current collector layer 510 and the anode current collector layer 506 to the positive and negative terminals, respectively, of a secondary battery). When using the laser system 120a to make the ablations 404 in the web of base material 104, the power of the laser beam 302 is set to a level that is capable of substantially completely, or completely, removing the coating layer, but will not damage or cut through the current collector layer. In use, the laser beam 302 is controlled, for example via user interface 116, to create the ablations 404 while the web of base material 104 is in motion and being conveyed in down-web direction WD. The ablations 404 are created on each side of the web of base material 104, as best shown in FIG. 5. In one embodiment, after making the ablations 404, the laser system 120a forms fiducial features 602, as described further herein. In another embodiment, multiple laser systems 120a may be used to each ablate a portion of the web of base material 104 to each create one or more ablations 404 to increase the throughput of the production system 100.

Figure 3:
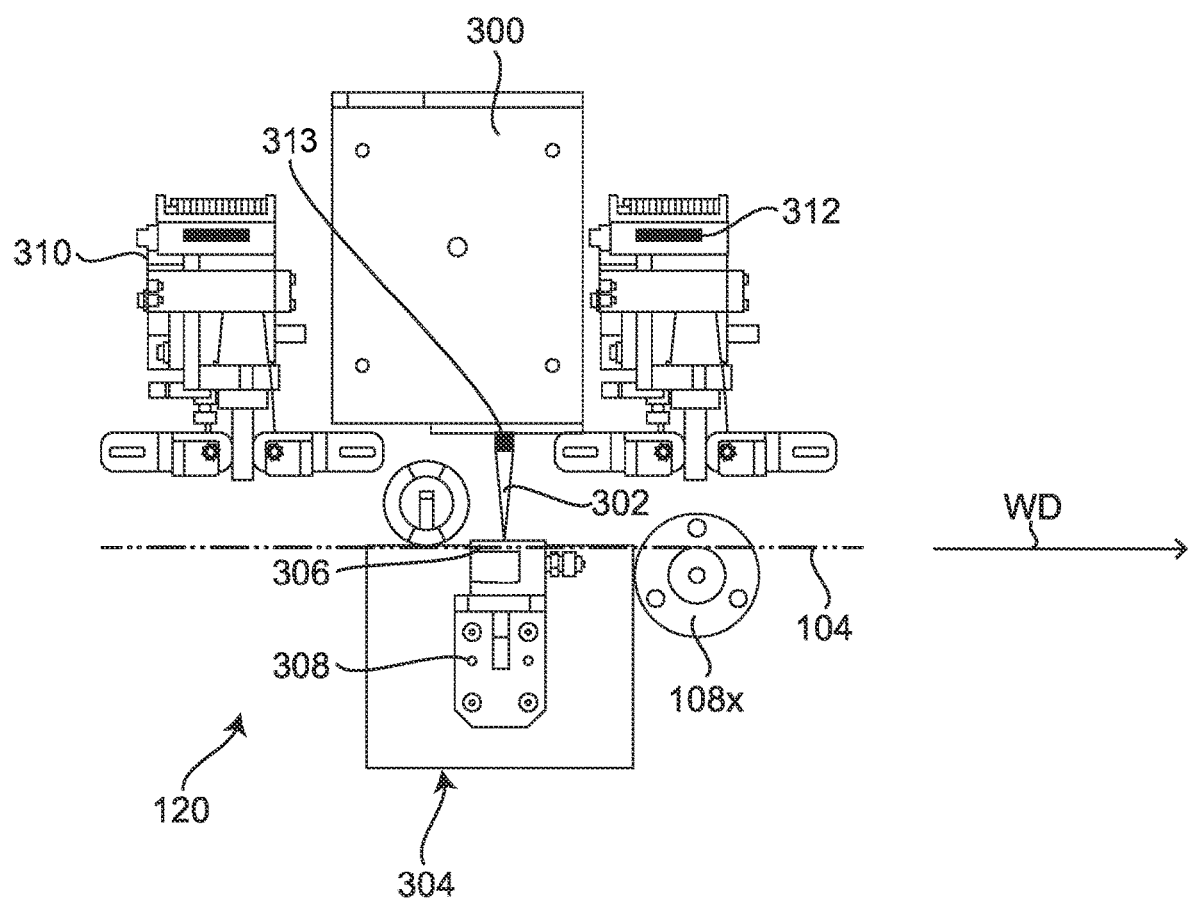
FIG. 3 is an enlarged schematic view of one suitable embodiment of a laser system according to the present disclosure.
Figure 4:
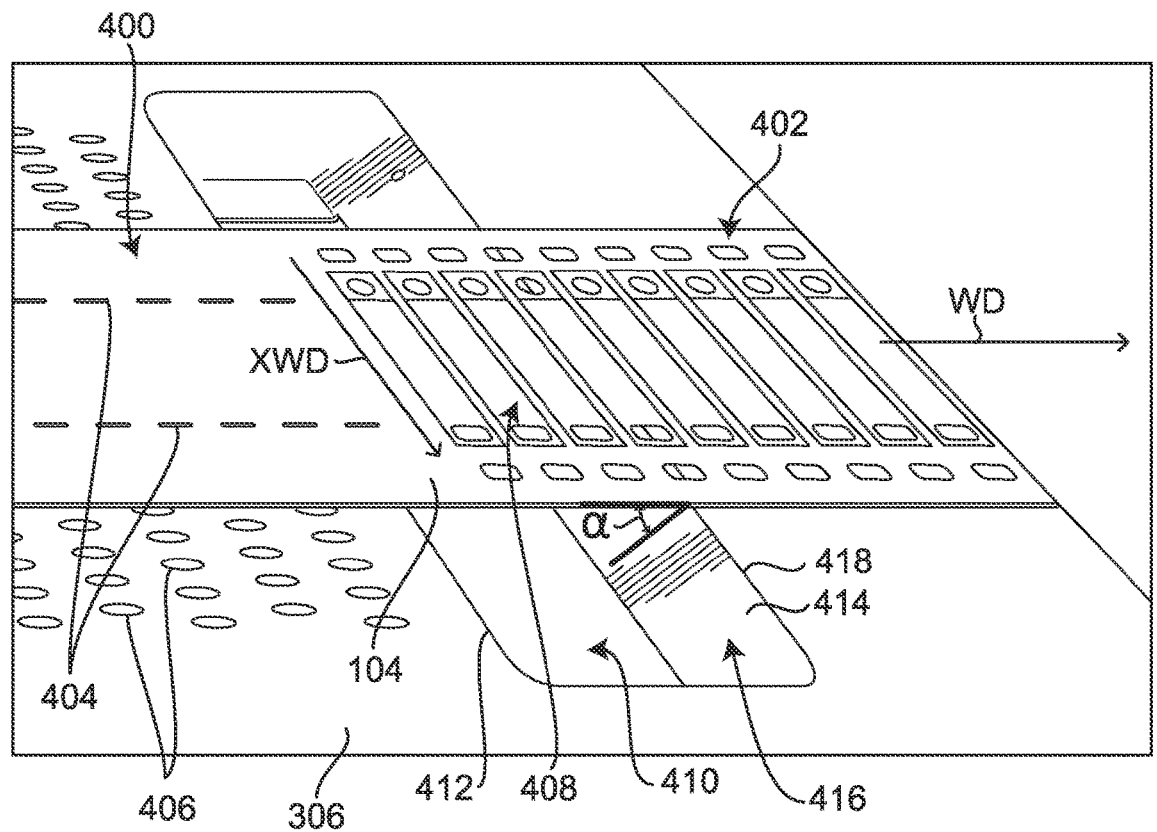
FIG. 4 is an isometric view of one suitable embodiment of a cutting plenum according to the present disclosure.

With further reference to FIGS. 2, 3 and 4, in another stage of the production system, the web of material 104 is conveyed in the down-web direction WD toward a cutting area 408 of the laser system 120a. The cutting area 408 includes the opening 410 of chuck 306. In one embodiment, the opening 410 is in fluid communication with the vacuum 308, to draw a vacuum pressure on the web of base material 104 passing over the opening 410. In one suitable embodiment, the opening 410 is wider in a cross-web direction XWD than the web of base material 104, such that an entire width of the web of base material 104 in the cross-web direction XWD is suspended over the opening 410. In one embodiment, there may be a second vacuum, configured to equalize the pressure on the web of base material 104 opposite the chuck 306. In this embodiment, the equalization in pressure facilitates maintaining the web of base material 104 in a substantially flat/planar state and at a consistent height when passing over the opening 410, which facilitates maintaining focus of laser beam 302 on the web of base material 104. In one embodiment, a carrier web may be used to support the web of base material 104. In some embodiments, the carrier web is removably attached to the web of base material 104 using a low tack adhesive or electrostatic pinning. In such embodiments, the attachment has sufficient adhesion to remain attached to the web of base material 104 during processing but is removable without causing damage to the web of base material 104. In one embodiment, the carrier web is a material that does not absorb the laser wavelength being used during processing of the web of base material 104, such that the carrier web will not be cut through, vaporized or ablated, and accordingly may be reused on other webs of base material 104.

The laser system 120a is configured to cut one or more patterns (such as individual electrode patterns 800 (FIG. 8), which may also be referred to as an electrode tear pattern or weakened tear pattern), to delineate each member of a population of electrode structures, in the web of base material 104 while the web of base material 104 is over the opening 410. In one embodiment, there may be a plurality of openings 410, for which one or more of the electrode patterns 800 are cut while the web of base material 104 is over the respective one o With reference to FIG. 6, the patterns may include one or more lengthwise edge cuts 600 that define lengthwise edges of an electrode in the cross-web direction XWD. The lengthwise edge cuts 600 are cut using laser beam 302 cutting the web of base material 104 in the cross-web direction XWD while the web of base material 104 is conveyed in the down-web direction WD. The cross-web direction XWD is orthogonal to the down-web direction WD. It should be noted that, in one embodiment, in order to create lengthwise edge cuts 600 that are substantially perpendicular to the down-web direction WD, the laser beam 302 must be controlled to travel at an angle with respect to the down-web direction WD, to account for the movement of the web of base material 104 in the down-web direction WD. For example, as the web of base material 104 moves in the down-web direction WD, the path of the laser beam 302 is projected onto the web of base material 104 at an initial cut location 604, and then is synchronized with the motion of the web of base material 104 in the web direction. Accordingly, the path of laser beam 302 is controlled to travel in both the cross-web direction XWD and the down-web direction WD until reaching end cut location 606 to create the lengthwise edge cuts 600. In this embodiment, a compensation factor is applied to the path of the laser beam 302 to allow cuts to be made in the cross-web direction XWD while the web of base material 104 is continuously traveling in the down-web direction WD. It should be appreciated that the angle at which the laser beam 302 travels varies based upon the speed of the web of base material 104 in the down-web direction WD. In another embodiment, the web of base material 104 is temporarily stopped during the laser processing operation, and as such, the path of the laser beam 302 does not need to account for the motion of the travel of the web of base material 104 in the down-web direction WD. Such embodiment may be referred to as a step process, or step and repeat process. During laser processing, one or more of the laser systems 120a-c use a repeating alignment feature, such as fiducial features 602 to adjust/align the laser beam 302 during the laser processing operations, for example to compensate for possible variations in positioning of the web of base material 104.

It should be appreciated that, although the laser processing operations as described herein such that the lengthwise edge cuts 600 are defined in the cross-web direction XWD, such that repeating patterns of individual electrode patterns 800 are aligned in the cross-web direction XWD, in other embodiments, the laser processing operations described herein can be controlled such that the lengthwise edge cuts 600, and all associated cuts, perforations and ablation operations are oriented respectively perpendicular. For example, lengthwise edge cuts 600 can be aligned in the down-web direction WD, such that populations of individual electrode patterns 800 are aligned in the down-web direction WD, rather than the cross-web direction XWD.

In one embodiment, laser system 120a cuts a tie bar 614 between one or more of the individual electrode patterns 800. The tie bar 614 may be used to delineate between groups of the individual electrode patterns 800. For example, in the embodiment shown in FIG. 6, a tie bar 614 is cut between groups of five individual electrode patterns 800. However, in other embodiments the tie bar 614 may be included after any number of individual electrode patterns 800, or not present at all. The tie bar 614 is defined by an upstream and downstream tie bar edge cut 616, 618 respectively. In some embodiments, the tie bar 614 is sized to provide additional structural stiffness to the web of base material 104 during processing.

Figure 8:
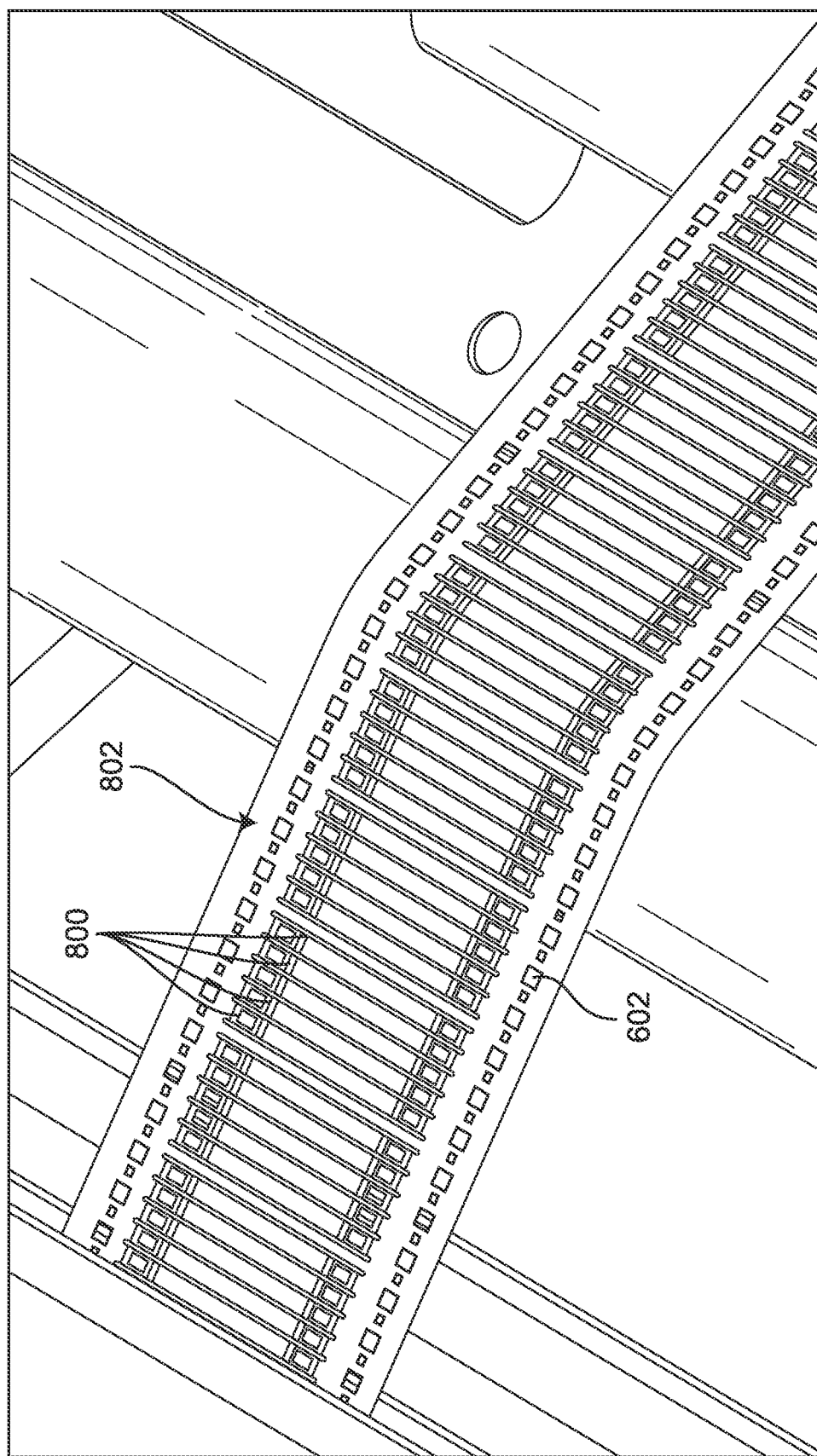
FIG. 8 is an isometric view of base material formed into a web of electrode material including electrode patterns after having been processed through the electrode manufacturing system of the current disclosure.

In addition, in one suitable embodiment, the laser system 120a cuts one or more of the repeating alignment features such as a plurality of the fiducial features 602 in the web of base material 104. In one embodiment, the fiducial features 602 are fiducial through-holes. The fiducial features 602 are cut at a known location on the web of base material 104. The fiducial features 602 are shown as circular in FIG. 6, but may be rectangular as shown in FIG. 8, or any size or shape that allows the production system 100 to function as described herein. The fiducial features 602 are tracked by one or more of visual inspection devices 310, 312 which measures the location and speed of travel of the fiducial features 602. The measurement of the fiducial features 602 is then used to accurately allow for front to back alignment of the patterns on the web of base material 104 in both the down-web direction WD and cross-web direction XWD. The laser system 120a may also cut a plurality of tractor holes 612 that may be used for alignment of the web of base material 104, or may be used as holes that engage with a gear wheel 1210 (FIG. 12) for positioning and tension control of the web of base material 104. Tractor holes 612 may be circular, square or any other shape that allows the production system 100 to function as described herein. In another suitable embodiments, the web of base material 104 has the plurality of tractor holes 612 and/or fiducial features 602 pre-cut therein prior to being unwound and conveyed through production system 100. In one embodiment, there is a one-to-one ratio of fiducial features 602 to individual electrode patterns 800. In other embodiments, there may be two or more fiducial features 602 per each individual electrode pattern 800.

Figure 6:
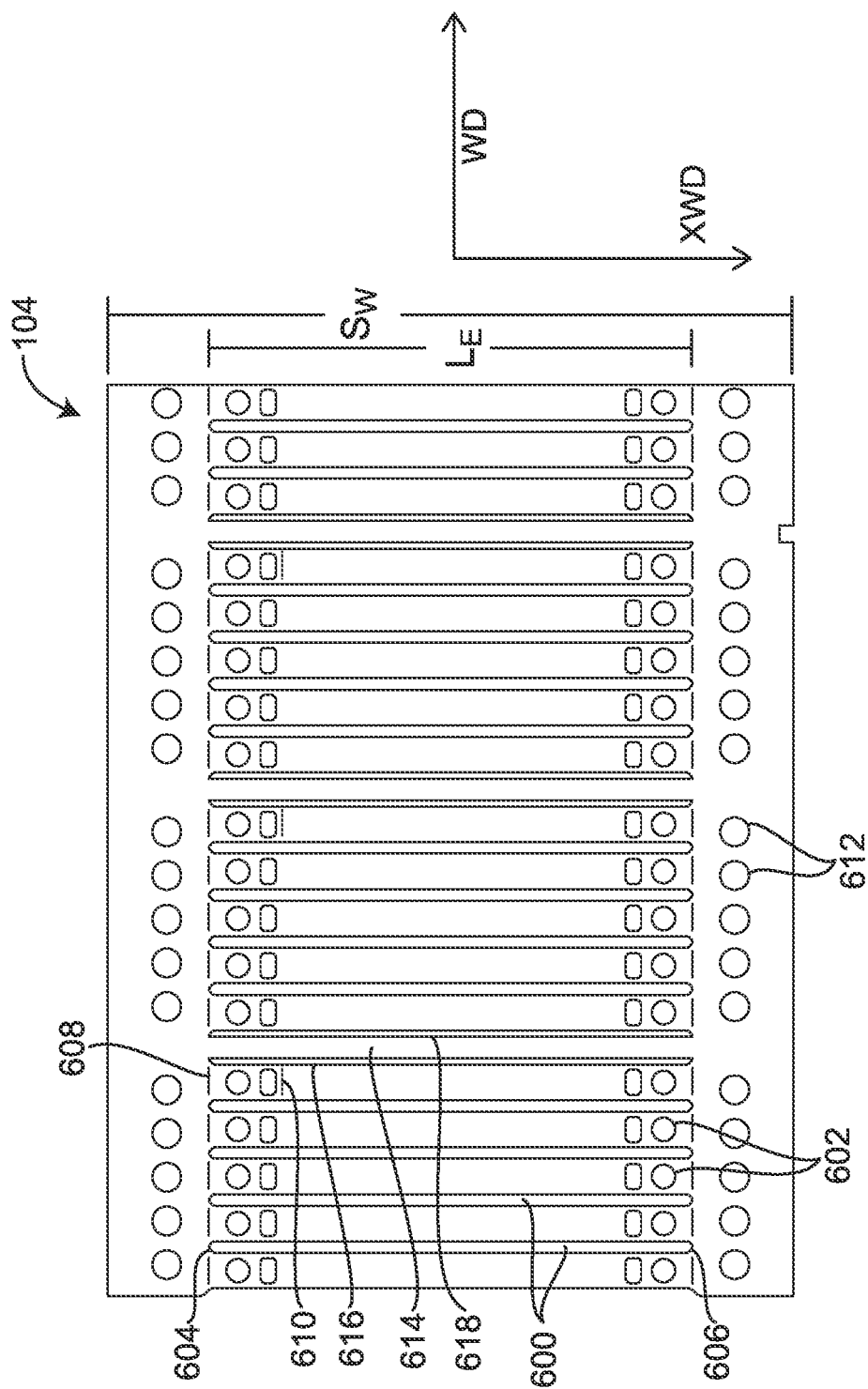
FIG. 6 is a top view of an exemplary web of base material having electrode patterns formed thereon.
Figure 7:
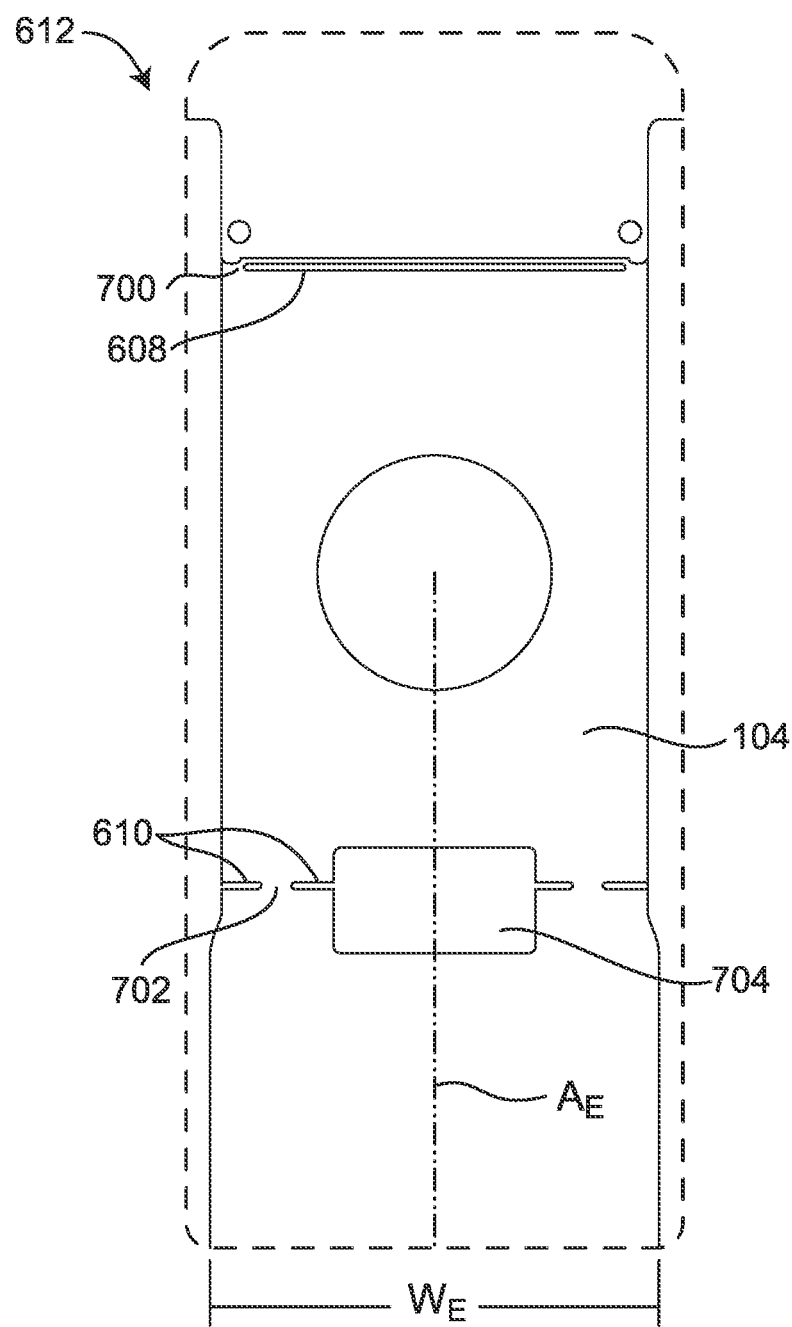
FIG. 7 is an enlarged top view of a portion of a web of base material having an exemplary electrode pattern formed thereon.

With reference to FIGS. 2 and 6, in one suitable embodiment, the laser system 120a cuts a first perforation 608 and a second perforation 610 in the web of base material 104 as part of the individual electrode pattern 800. The first perforation 608 may also be referred to as the "outer perforation" because it lies at the outside of the individual electrode pattern 800 in the cross-web direction XWD, and the second perforation 610 may also be referred to as the "inner perforation" because it lies inboard of the outer perforation 608 in the cross-web direction XWD. The perforations 608, 610 are best shown in FIG. 7, which is an enlarged view of the portion 613 (FIG. 5) of web of base material 104. First perforation 608 is formed by laser cutting using laser beam 302, while the web of base material 104 is positioned over the opening 410 in chuck 306. The first perforation 608 is formed as a linear slit (e.g., through-cut) in a direction aligned with the down-web direction WD. Importantly, the first perforation 608 does not extend across the entirety of the width of the electrode $W_e$. Instead, outer tear strips 700 remain on both the upstream and downstream edges of the first perforation 608, to ensure the individual electrode pattern 800 remains connected to the web of base material 104.

Similarly, with further reference to FIGS. 6 and 7, the second perforations 610 are formed inboard (in the cross-web direction XWD) from the first perforations 608. In one suitable embodiment, the second perforations 610 are formed as a line of slits in the down-web direction WD separated by inner tear strips 702. In the embodiment shown, the second perforations 610 intersect through holes 704. In the illustrated embodiment, the inner tear strips 702 are at least two times the length of outer tear strips 700, such that the rupture force required to separate the outer tear strips 700 is approximately half of the rupture force required to separate inner tear strips 702 from the web of base material 104. In other embodiments, the ratio of the rupture strength of the outer and inner tear strips 700 and 702, respectively, may vary, but is preferred that the outer tear strips 700 have a rupture strength lower than the inner tear strips 702, such that upon application of a tensile, or shear, force applied to the edges of the web of base material 104, that the outer tear strips 700 will rupture before inner tear strips 702.

With reference to FIGS. 3, 4 and 6, by performing the laser cuts for the lengthwise edge cuts 600, the fiducial features 602, and the first and second perforations 608, 610 over the opening 410 of the chuck 306, it allows debris to fall through the opening 410 and also allows the vacuum 308 to collect debris formed during the laser cutting process.

In one suitable embodiment, the laser system 120a is configured as a first ablation station. In this embodiment, the laser system 120a forms the ablations 404, as described above on a first surface of the web of base material 104. Upon exiting laser system 120a, the web of base material 104 passes over idler 108d which flips the web of base material 104 in a manner such that a second surface (opposing the first surface) of the web of base material 104 is positioned for processing by the laser system 120b, which is configured as a second ablation station in this embodiment. In this embodiment, the laser system 120b is configured to use the fiducial features 602 to ensure alignment in the down-web direction WD and cross-web direction XWD. Accordingly, the laser system 120b performs a second ablation process on the opposing surface of the web of base material 104, such that ablations 404 on each surface of the web of base material 104 are aligned in the down-web direction WD and the cross-web direction XWD. In one embodiment, the ablations 404 are configured as current collector tabs of the electrodes.

In one embodiment, the laser system 120c seen in FIG. 2 is configured as a laser cutting station. In this embodiment, the laser system 120c performs the laser cuts such as lengthwise edge cuts 600, and the first and second perforations 608 and 610.

In one suitable embodiment, one or more of the laser devices 300 of the laser systems 120a-c is a 20-watt fiber laser. In embodiments, suitable laser devices 300 of the laser systems 120a-c have a laser power within the range of from 10 watts to 5,000 watts, such as from 10 W to 100 W, 100 W to 250 W, 250 W to 1 kW, 1 kW to 2.5 kW, 2.5 kW to 5 kW. Suitable laser devices 300 will include a laser beam 302 having a wavelength of from 150 nm to 10.6 µm, for example such as from 150 nm to 375 nm, 375 nm to 750 nm, 750 nm to 1,500 nm, and 1,500 nm to 10.6 µm. In embodiments, the laser devices 300 will be capable of laser pulse width types of one or more of continuous wave (cw), microsecond (µs), nanosecond (ns), picosecond (ps) and femtosecond (fs) pulse types. Any of these types of lasers may be used alone or in combination as laser devices 300 of laser systems 120a-c. In other suitable embodiments, the laser device 300 is any other laser capable of allowing laser systems 120a-c to perform as described herein.

In some embodiments, the web of base material 104 may include fiducial features 602 that have been machine punched, or laser cut, prior to being loaded into production system 100. In another suitable embodiment, the fiducial features 602 may be mechanically machine punched subsequently to forming ablations 404 on a first surface of the web of base material 104. In other suitable embodiments, the production system 100 may include one or more additional mechanical punches which may be used to form one or more of the lengthwise edge cuts 600, and/or the first and second perforation 608, 610.

In one embodiment, one or more of the rollers of the conveyor system may not be perfectly round, such that the roller has an eccentricity. In such case, especially if the eccentric roller is a nip roller 112, 123, 132, the web of base material 104 may be conveyed in a manner such that a position of the web of base material 104 advances in a manner differently depending upon which portion of the eccentric roller is in contact with the web. For example, if the eccentric roller has a portion of the radius that exceeds the expected radius of the roller, the web may advance further in the down-web direction WD than expected, when the larger radius portion of the roller is pushing/pulling the web. Likewise, if the eccentric roller has a reduced radius portion, the web may advance a reduced distance in the down-web direction WD than expected. Accordingly, in one embodiment, the eccentric roller(s) may be mapped to determine the radius versus radial position. The laser system 120a-c may then be controlled to adjust the laser beam 302 position to account for the eccentricity based upon the mapping of the roller(s). In one embodiment, the mapping of the rollers may be stored in the memory of the user interface 116.

Upon having exited one or more of laser systems 120a-c, the web of base material 104 may be conveyed to one or more cleaning stations such as brushing station 124 and air knife 126. In one suitable embodiment, the brushing station 124 includes a brush 1000 (FIGS. 10 and 11) that travels in the cross-web direction XWD. The brush 1000 includes a set of bristles 1002 that are held by bristle holder 1004. The brush 1000 is configured to allow bristles 1002 to delicately contact a surface of the web of base material 104 and remove or dislodge any debris therefrom. The contact pressure of the bristles 1002 on the surface of the web of base material 104 must be low enough that it does not break, rupture or otherwise cause defects in the individual electrode patterns 800, and maintains the individual electrode patterns 800 as attached to the web of base material 104. In one embodiment, the normal force between the bristles 1002 and the surface of the web of base material 104 is from 0 to 2 lbs, such as 0.1 lbs, 0.2 lbs, 0.3 lbs, 0.4 lbs, 0.5 lbs, 0.6 lbs, 0.7 lbs, 0.8 lbs, 0.9 lbs, 1.0 lbs, 1.1 lbs, 1.2 lbs, 1.3 lbs, 1.4 lbs, 1.5 lbs, 1.6 lbs, 1.7 lbs, 1.8 lbs, 1.9 lbs or 2.0 lbs. In other embodiments, the normal force may be greater than 2.0 lbs.

In one embodiment, the length of the bristles 1002 is ¾ inch (19.05 mm). In one embodiment, the bristles 1002 are inserted or clamped within bristle holder 1004 by approximately ⅛ inch. The diameter of the bristles 1002 may be from 0.003 inch (0.076 mm) to 0.010 inch (0.254 mm), such as 0.003 inch (0.076), 0.004 inch (0.101 mm), 0.005 inch (0.127 mm), 0.006 inch (0.152 mm), 0.007 inch (0.177 mm), 0.008 inch (0.203 mm), 0.009 inch (0.228 mm) and 0.010 inch (0.254 mm). In one suitable embodiment, the bristles 1002 are nylon bristles. However, in other embodiments the bristles 1002 may be any other natural or synthetic material that allows the brush 1000 to function as described herein.

Figure 10:
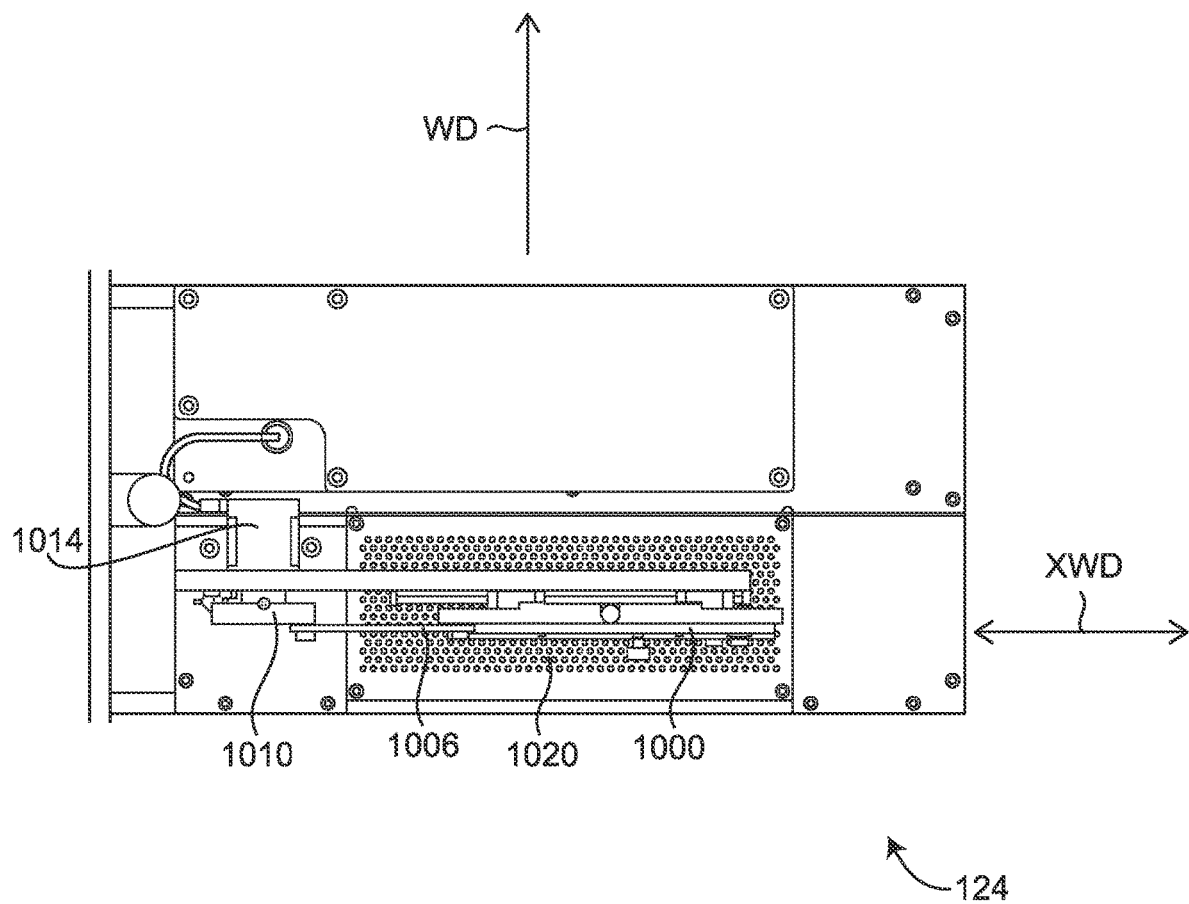
FIG. 10 is a top view of one suitable embodiment of a brushing station of the current disclosure.
Figure 11:
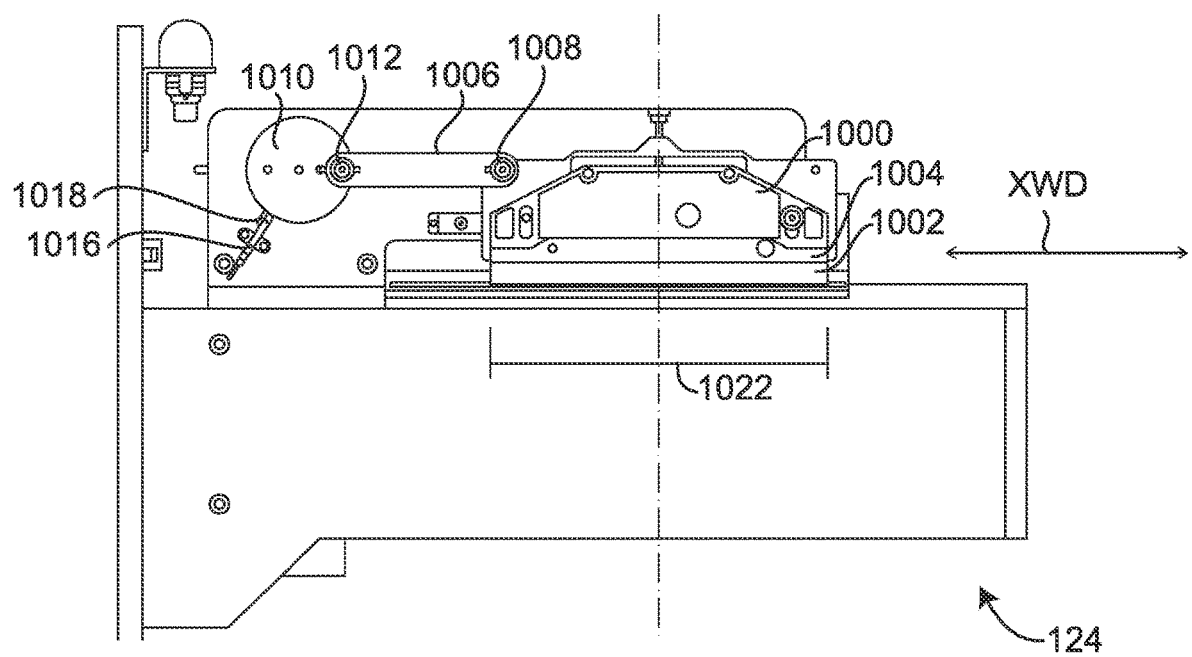
FIG. 11 is a side view of the exemplary brushing station shown in FIG. 10.

With further reference to FIGS. 10 and 11, in one suitable embodiment, to effect movement of the brush 1000 in the cross-web direction XWD, the brush 1000 is connected to crank arm 1006 via a rotatable coupling 1008, such as a bearing, bushing or the like. The crank arm 1006 is rotatably coupled to drive wheel 1010 via a second rotatable coupling 1012. The second rotatable coupling 1012 is coupled to a position off center of the drive wheel 1010, such that the crank arm 1006 oscillates the brush 1000 in a back-and-forth motion in the cross-web direction XWD. The drive wheel 1010 is coupled to a motor 1014 to effect rotation of the drive wheel 1010. A position sensor 1016 senses the position of a brush position marker 1018, which is coupled to the drive wheel 1010. Accordingly, the position sensor 1016 may measure the phase (e.g., angular position) and rotations per time of the drive wheel 1010. In one embodiment, the drive wheel 1010 is controlled to be within a range of 0 to 300 rotations per minute ("rpm") (e.g., 0 to 300 strokes per minute of brush 1000), such as 0 rpm, 25 rpm, 50 rpm, 75 rpm, 100 rpm, 125 rpm, 150 rpm, 175 rpm, 200 rpm, 225 rpm, 250 rpm, 275 rpm and 300 rpm. In other embodiments, the rpm of drive wheel 1010 may be greater than 300 rpm. It is noted that a constant rpm of drive wheel 1010 will cause a sinusoidal speed variation of brush 1000, due to the crank arm 1006 connection to drive wheel 1010.

In one suitable embodiment, a second brush (not shown) is located in a position to contact the opposing surface of the web of base material 104. In this embodiment, the second brush, which may be substantially the same as the first brush 1000 is configured to travel in a direction opposite to the first brush, and suitably 180 degrees out of phase with the first brush. The phase of the first brush and the second brush may be determined via the position sensor 1016, and an equivalent position sensor of the second brush. In this embodiment, the contact pressure of the bristles 1002 of the first brush 1000 and the second brush, together, must be low enough that it does not break, rupture or otherwise cause defects in the individual electrode patterns 800, and maintains the individual electrode patterns 800 as attached to the web of base material 104.

In one embodiment, the brush 1000 has a brush width 1022 that is wider in the cross-web direction XWD than the width of web of base material 104 in the cross-web direction XWD. For example, in one embodiment, the brush width 1022 is of sufficient width that as the brush 1000 oscillates in the cross-web direction XWD, the bristles 1002 remain in contact with the full width of the surface of the web of base material 104 throughout the entire range of motion of the brush 1000. The rate of oscillation of the brush 1000 and the pressure exerted by the bristles 1002 against the surface of the web of base material 104 may be controlled by the user using the user interface 116.

The brushing station 124 may be equipped with a vacuum system configured to create a vacuum through brush station orifices 1020 to evacuate debris that has been brushed from one or more surfaces of the web of base material 104. In this embodiment, the debris may be brushed from the web of base material 104 and fall, or be suctioned through the brush station orifices 1020. The brush station orifices 1020 are illustrated as being round, but may be any shape that allows brushing station 124 to function as described herein. Further, the upper edges of the brush station orifices 1020 may be chamfered, and/or staggered in position to allow the web of base material 104 to more easily pass over them without having an edge of the web of base material 104 get snagged thereon. In one embodiment, the vacuum level may be controlled to be from 0 to 140 inches H2O, such as 0 in $H_2O$, 10 in $H_2O$, 20 in $H_2O$, 30 in $H_2O$, 40 in $H_2O$, 50 in $H_2O$, 60 in $H_2O$, 70 in $H_2O$, 80 in $H_2O$, 90 in $H_2O$, 100 in $H_2O$, 110 in $H_2O$, 120 in $H_2O$, 130 in $H_2O$, and 140 in $H_2O$. In some embodiments, the flow rate of the vacuum is controlled to be from about 0 to 425 cubic feet per minute ("cfm"), such as 0 cfm, 25 cfm, 50 cfm, 75 cfm, 100 cfm, 125 cfm, 150 cfm, 175 cfm, 200 cfm, 225 cfm, 250 cfm, 275 cfm, 300 cfm, 325 cfm, 350 cfm, 375 cfm, 400 cfm and 425 cfm. In other embodiments, the vacuum level and flow rate may be greater than 140 in $H_2O$ and 425 cfm, respectively. The vacuum level and flow rate are controlled to be within a range such that debris is pulled away from the web of base material 104 without creating unnecessary friction between the web of base material 104 and the conveying system components. Such vacuum levels and flow rates are, in some embodiments, applicable to all other components of the system using a vacuum.

In another suitable embodiment, one or more of the first brush and the second brush may include a load sensor that measures or monitors the pressure the brush is exerting upon the web of electrode material 802. As shown in FIG. 8, the web of electrode material 802 refers to the web after having been processed as described herein, such that a population of individual electrode patterns 800 have been formed therein. In this embodiment, the first brush and the second brush may be controlled, via user interface 116, to maintain a uniform brushing pressure on the web of electrode material 802 based upon variations in brush bristle wear or electrode thickness or surface roughness.

In another suitable embodiment, one or more of the first brush and the second brush are configured to move at least partially in the down-web direction WD at a rate of speed substantially equivalent to the rate of speed of the web of electrode material 802, thus maintaining a substantially zero speed differential between the brush 1000 and the web of electrode material 802 in the down-web direction WD.

In yet another suitable embodiment, the brushing station 124 may be equipped with a position sensor 1016 to determine the phase of the first brush and the second brush. In one such embodiment, the position sensor 1016 may measure the location of a brush position marker 1018 of the first brush and the second brush. In this embodiment, the position sensor 1016 determines whether the first and second brushes are within a range of predetermined phase difference, such as 180 degrees out of phase, 90 degrees out of phase or zero degrees out of phase or any other suitable phase difference that allows the production system 100 to function as described herein. As used herein, the "phase" of a brush refers to an angular position of a brush, such that the bristles of two separate brushes would be aligned when "in phase."

In still another embodiment, an ultrasonic transducer (not shown) may be configured to impart ultrasonic vibrations to one or more of the first and second brushes to facilitate debris removal from the web of electrode material 802.

With further reference to FIG. 2, in one suitable embodiment, the web of base material 104 is conveyed through an air knife 126. As used herein, the term air knife refers to a device that uses high pressure air that is blown at the web of base material 104. The high pressure air contacts the surface of the web of base material 104 and removes debris therefrom. The air knife 126 is controlled to supply air at a pressure/velocity such that it does not break, rupture or otherwise cause defects in the individual electrode patterns 800, and maintains the individual electrode patterns 800 as attached to the web of base material 104. In another embodiment, a second air knife (not shown), similar to air knife 126 is configured to blow air at an opposing surface of the web of base material 104 and remove debris therefrom. In this embodiment, the second air knife may blow air in the same direction as the first air knife 126, or in a direction opposite the first air knife 126, or any other direction that allows the air knife 126 to function as described herein. In one embodiment, the air knife 126 station is equipped with a vacuum that facilitates removal of the debris that has been removed by the air knife 126.

With reference to FIG. 8, after having been processed by the laser systems 120a-c and cleaned by the brushing station 124 and the air knife 126, the web of base material 104 exits the cleaning stations as a web containing a plurality of individual electrode patterns 800 within web of base material 104, collectively a web of electrode material 802.

Figure 12:
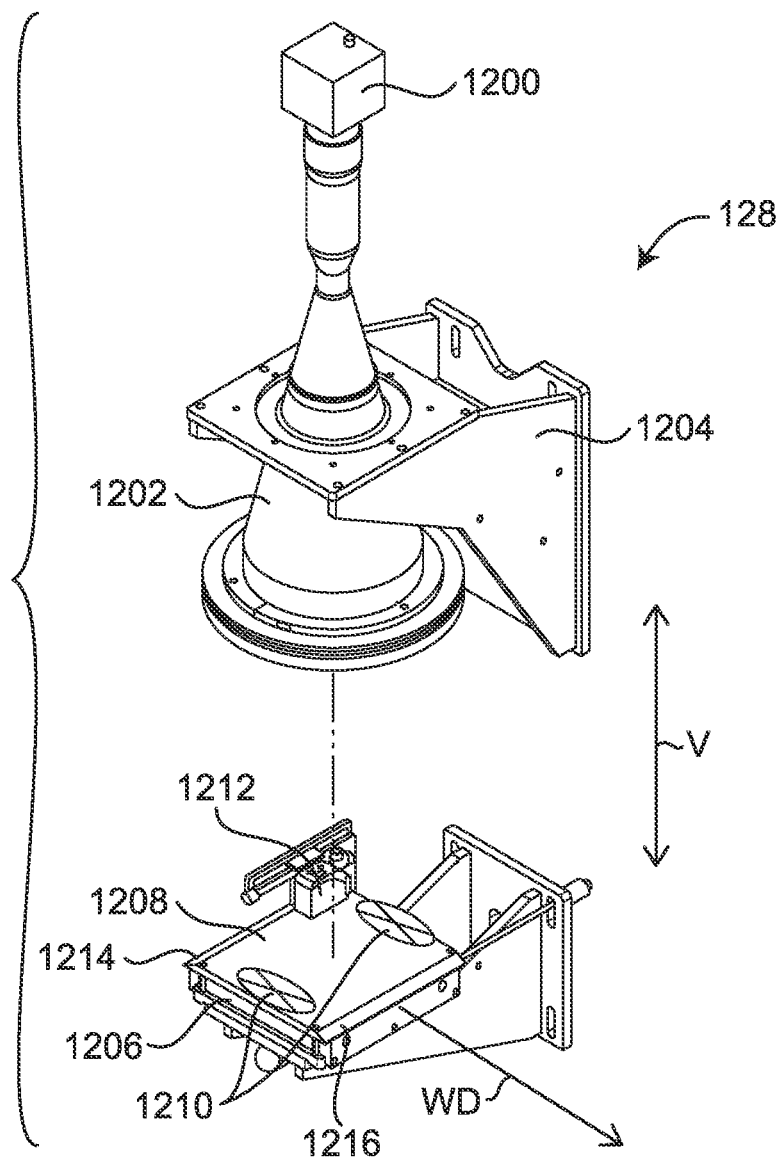
FIG. 12 is an isometric view of one suitable embodiment of an inspection station according to the current disclosure.

With further reference to FIGS. 2, 8 and 12, in one embodiment, web of electrode material 802 passes through inspection station 128. The inspection station 128 is a device configured to analyze the web of electrode material 802 and identify defects thereon. For example, in one embodiment, the inspection station 128 is a visual inspection device including a camera 1200, which may be a digital camera such as a digital 3-D camera configured to analyze the individual electrode patterns 800 on the web of electrode material 802. In one embodiment, the camera 1200 is a digital light camera including a CMOS having a 48 megapixel sensitivity. The camera 1200 is optically coupled to a lens 1202, which may be a wide field of view lens. In one embodiment, the lens 1202 is a telecentric lens. The lens 1202 is held in place by a lens mount 1204, which in one embodiment may be adjustable in a vertical direction V to control a focus of the lens 1202. The lens 1202 is aimed to focus on the web of electrode material 802 as it passes over inspection plate 1206. In one embodiment, the inspection plate 1206 includes a transparent or semi-transparent top 1208 that allows light from a light source (not shown) housed within the inspection plate 1206 to shine therethrough to generate a backlight. In one suitable embodiment, the intensity and/or color of the light may be controlled via the user interface 116. In one embodiment, one or more additional lighting sources, such as an upstream light and a downstream light illuminate the web of electrode material 802 while within the inspection station 128. In some embodiments, each of the lighting sources are independently controllable for intensity and color. In one embodiment, the backlight includes a diffuse low angle ring light. The web of electrode material 802 may be secured and conveyed over the inspection plate 1206 by gear wheels 1210 that are configured to engage the tractor holes 612 of the web of electrode material 802. In doing so, the web of electrode material 802 is held taught against inspection plate 1206, to substantially eliminate curling of the web of electrode material 802. Each of the inspection plate leading edge 1214 and the inspection plate trailing edge 1216 may be chamfered (e.g., at angles similar to angle α) to allow the web of electrode material 802 to pass smoothly thereover without snagging.

With continued reference to FIG. 12, in one embodiment, the inspection station 128 includes a trigger sensor 1212 that detects a predetermined feature of the web of electrode material 802, such as a fiducial feature 602, lengthwise edge cut 600 or any other feature that allows inspection station 128 to function as described herein. Upon detection of the predetermined feature, the trigger sensor 1212 sends a signal directly to camera 1200 or indirectly through the user interface 116, to trigger the camera 1200 to image an electrode of the web of electrode material 802. Upon imaging the electrode, camera 1200 may be configured to detect one or more metrics such as a height of the electrode, a size or shape of a feature that has been cut by one of the laser systems 120a-120c (FIG. 2), the pitch (distance) between electrodes or any other feature that allows the inspection station 128 to function as described herein. For example, in one suitable embodiment, the inspection station 128 detects whether the ablations 404 (FIG. 4), lengthwise edge cuts 600, fiducial features 602, tractor holes 612, pitch between individual electrode patterns 800, offset in the cross-web and web direction of tractor holes 612, and first and second perforations 608, 610 (FIG. 6) are within a predefined tolerance of size, shape, placement and orientation. In one suitable embodiment, a user may control which feature to inspect using the user interface 116.

In one embodiment, the web of electrode material 802 is held substantially flat during analysis by the inspection station 128, such as by use of application of balanced vacuum or fluid (e.g., air) flow over the opposing sides of the web of electrode material 802. In this embodiment, by having the web of electrode material 802 be flat during inspection, more precise imaging and analysis may be conducted on the web of electrode material 802, and thus higher quality error and defect detection is enabled.

In one embodiment, the inspection station 128 may be configured to provide in-line metrology of the web of base material 104 and/or web of electrode material 802. For example, the inspection station 128 may be configured to measure metrics such as web thickness, sizes and shapes of the individual electrode patterns 800, and the like while the web is being conveyed in the down-web direction WD. These metrics may be transmitted to the user interface 116 for viewing or memory storage, or otherwise used to adjust production parameters of the production system 100.

In one embodiment, in the event the inspection station 128 determines a defect is present on the web of electrode material 802 (FIG. 8), the defect marking system 130 (FIG. 2) will mark the web of electrode material 802 to identify such defect. The defect marking system 130 may be a laser etching device, printer, stamper or any other marking device capable of placing a mark indicating a defect is present on a web of electrode material 802. In another suitable embodiment, the defect marking system 130 is controllable to mark the web of electrode material 802 with one or more of an identification number (ID) and known good electrodes (KGEs), allowing for the possibility to further mark the web of electrode material 802 with a grade, such as grade A, grade B, grade C or the like, indicating a quality measurement (such as number or type of defects) of a particular electrode within the web of electrode material 802.

Figure 8A:
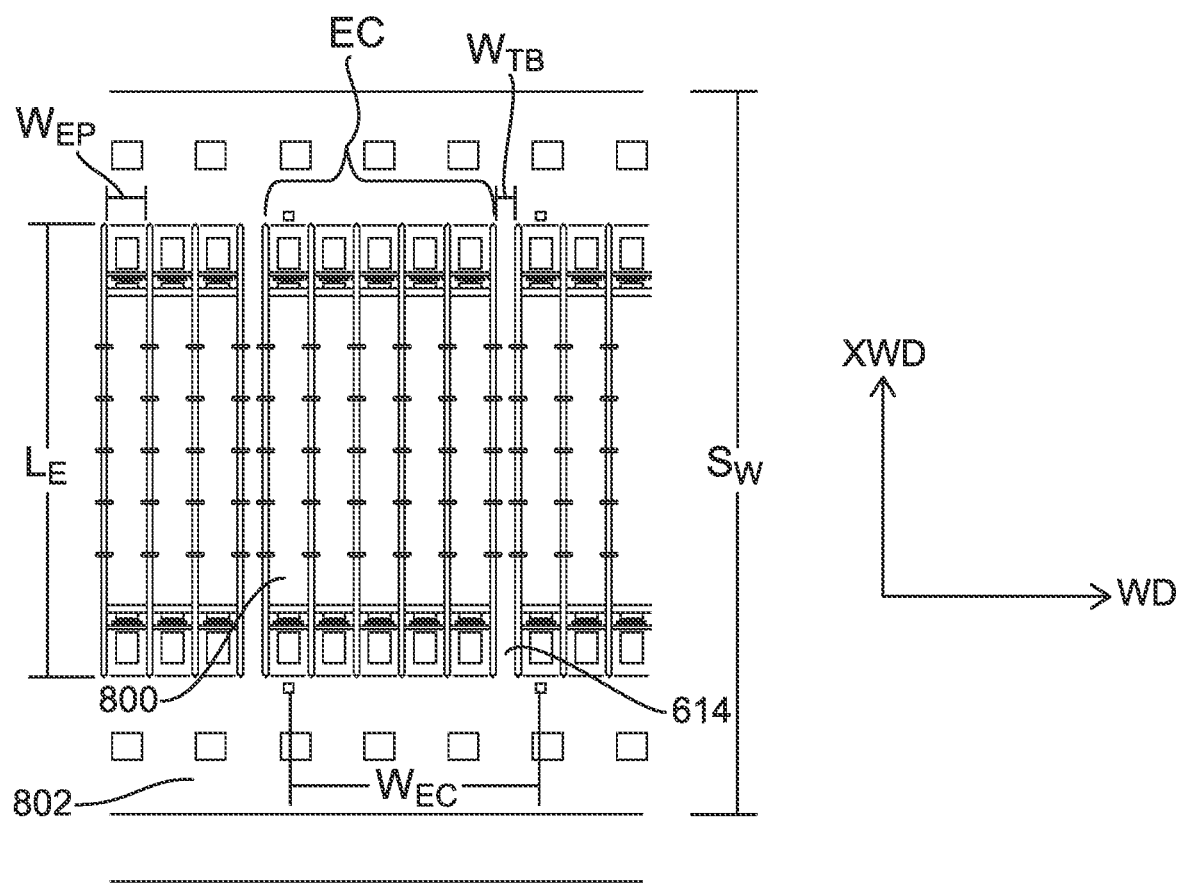
FIG. 8A is a top view of a portion of the web of electrode material of FIG. 8.

Upon the processing (also referred to as machining) of the web of base material 104 into the web of electrode material 802, the web of electrode material 802 has a web strength reduction in the down-web direction WD of from 25 percent to 90 percent as compared to the unprocessed (also referred to as unmachined) web of base material 104. With reference to FIG. 8A, a portion of the web of electrode material 802 is shown. In this embodiment, the web of electrode material 802 includes electrode clusters EC comprising five individual electrode patterns 800 separated by a tie bar 614. However, it should be understood that in other embodiments, the electrode cluster EC may include any number of individual electrode patterns 800 including one or more, such as for example, 2, 3, 4, 5, 6, 7, 8, 9, 10, 11, 12, 13, 14, 15, 16, 17, 18, 19, 20 or any other number of individual electrode patterns 800 between tie bars 614. A distance of electrode cluster width $W_{EC}$ is defined as a distance in the down-web direction WD between a center-point of a first individual electrode pattern 800 of an electrode cluster EC to a center-point of a first individual electrode pattern 800 in a second electrode cluster EC.

In an exemplary embodiment, the cross-web span of the web $S_W$ is 3X mm in the cross-web direction and a width $W_{EP}$ of each individual electrode pattern 800 in the down-web direction WD is X mm. In this embodiment, the reduction in web strength of the web of electrode material 802 in the down-web direction WD is 33 percent as compared to the unprocessed web of base material 104. The reduction in web strength is calculated as the width $W_{EP}$ divided by the cross-web span $S_W$ (i.e., X mm/3X mm=0.33).

In another exemplary embodiment, the cross-web span of the web $S_W$ is 1.5X mm in the cross-web direction and a width $W_{EP}$ of each individual electrode pattern 800 in the down-web direction WD is 1.3X mm. In this embodiment, the reduction in web strength of the web of electrode material 802 in the down-web direction WD is 87 percent as compared to the unprocessed web of base material 104. The reduction in web strength is calculated as $W_{EP}/S_W$ (i.e., 1.3X/1.5X=0.87). Web strength of the web of electrode material 802 in the down-web direction WD is verified and measured as a breaking strength of the web of electrode material 802 using an electromechanical or hydraulic material tester with at least force feedback, and may include displacement feedback, such as an Instron brand testing machine.

In another exemplary embodiment, there is a strength reduction in the cross-web direction XWD of the web of electrode material 802 as compared to the web of base material 104. In a first exemplary embodiment, the electrode cluster width $W_{EC}$ is 6X mm in the down-web direction WD, the width $W_{TB}$ of the tie bar 614 is X mm in the down-web direction WD and the width $W_{EP}$ of the individual electrode pattern 800 is X mm in the down-web direction WD and the length $L_E$ of the individual electrode pattern 800 is 1.7X mm in the cross-web direction XWD. In this embodiment, the reduction in strength of the web of electrode material 802 in the cross-web direction XWD is about 77 percent as compared to the unprocessed web of base material 104. In another exemplary embodiment, the electrode cluster width $W_{EC}$ is lox mm, the width $W_{TB}$ of the tie bar 614 is 0X mm (i.e., no tie bar 614) and the width $W_{EP}$ of the individual electrode patterns 800 is 2X mm and the length $L_E$ of the individual electrode pattern 800 is 1.7X mm. In this embodiment, the reduction in strength of the web of electrode material 802 in the cross-web direction XWD is about 92 percent as compared to the unprocessed web of base material 104. Web strength in the cross-web direction XWD is verified and measured as a breaking strength of the web of electrode material 802 using an electromechanical or hydraulic material tester with at least force feedback, and may include displacement feedback, such as an Instron brand testing machine.

Figure 9:
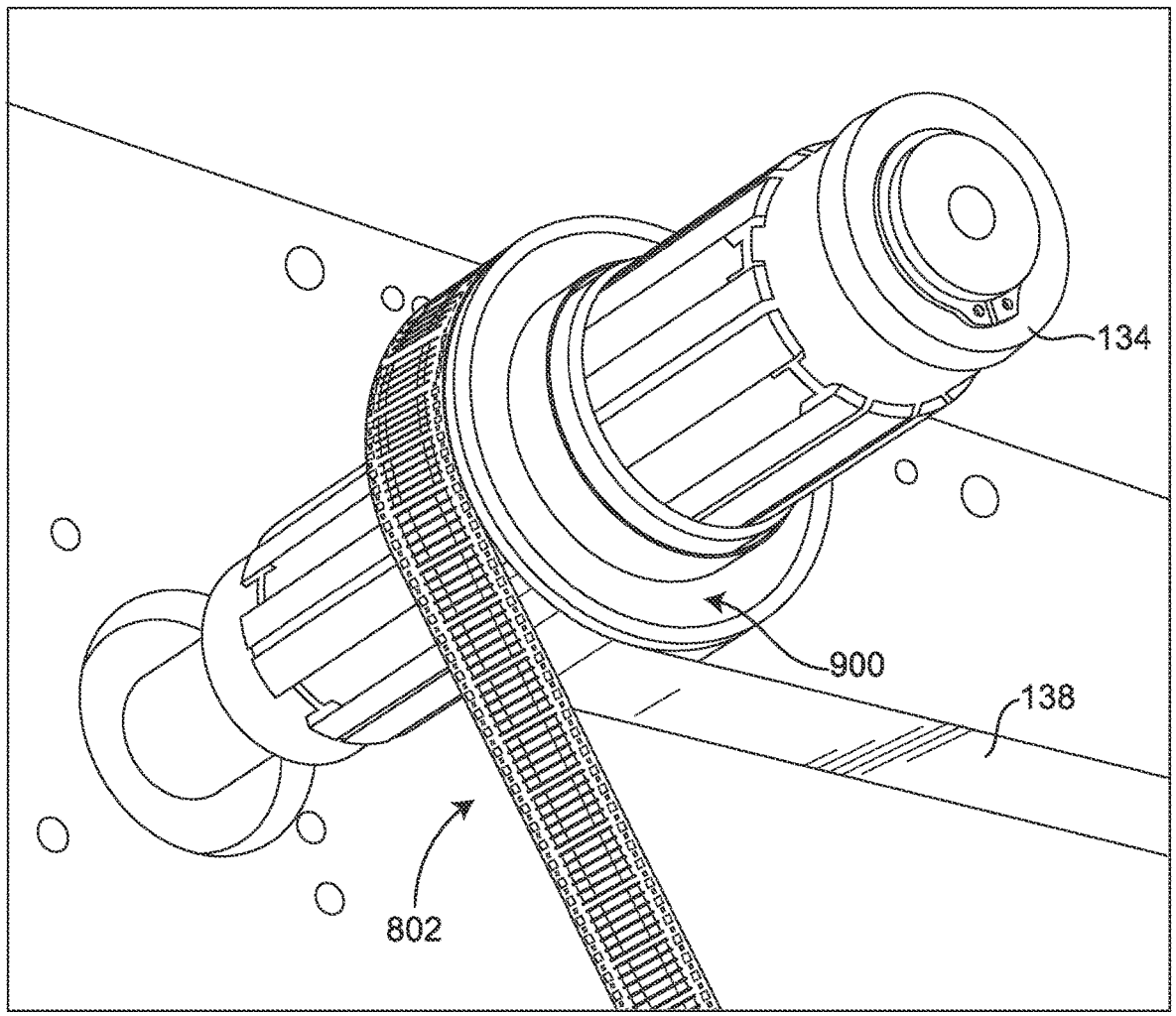
FIG. 9 is an isometric view of one suitable embodiment of a rewind roller of the electrode manufacturing system of the current disclosure.

With further reference to FIG. 9, the web of electrode material 802 is then conveyed to the rewind roller 134, where it is wound together with a web of interleaf material 138 to create a spool 900 having alternating layers of web of electrode material 802 and web of interleaf material 138.

In one suitable embodiment, the user interface 116 may include a processor and memory configured to store and execute instructions causing the production system 100 to function as described herein. The user interface 116 may further include a display device, such as a LCD or LED display and a set of controls, or virtual controls, that allow a user to control and adjust parameters of the production system 100, as well as view metrics such as web conveyance speed, tension, number of defects, and any other parameters that allow production system 100 to function as described herein.

In use, with reference to FIG. 2, the base unwind roller 102 of production system 100 is loaded with a web of base material 104. The web of base material 104 is passed across an edge guide 106, to facilitate unwinding of the web of base material 104. In this embodiment, the web of base material 104 is then passed around the idler 108a and into the splicing station 110. The idler 108a is used to facilitate maintaining proper positioning and tension of the web of base material 104, as well as to change the direction of the web of base material 104. The idler 108a receives the web of base material 104 in the vertical direction, and the web of base material 104 is partially wrapped around the idler 108a such that the web of base material 104 leaves the idler 108a in an output direction substantially ninety degrees from the input direction. However, it should be appreciated that the input and output directions may vary without departing from the scope of this disclosure. In some embodiments, the production system 100 may use multiple idlers 108a-108x to change the direction of the web of base material 104 one or more times as it is conveyed through the production system 100. In this embodiment, the user unwinds the web of base material 104 through the idlers 108a-108x, for example as shown in FIG. 2.

In one embodiment, the splicing station 110 is used to splice two separate webs together. In this embodiment, a first web of base material 104 is unwound, such that a trailing edge (not shown) of the first web of base material 104 is stopped within the splicing station 110, and a leading edge (not shown) of a second web of base material 104 is unwound into the splicing station 110 such that the trailing edge of the first web and the leading edge of the second web are adjacent one another. The user then applies an adhesive, such as an adhesive tape, glue, or other suitable adhesive to join the leading edge of the second web to the trailing edge of the first web to form a seam between the two webs and create a continuous web of base material 104. Such process may be repeated for numerous webs of base material 104, as dictated by a user.

In one suitable embodiment, upon exiting the splicing station 110, the web of base material 104 is conveyed in the down-web direction WD to the nip roller 112. The nip roller 112 is controlled via user interface 116 to adjust/maintain the speed at which the web of base material 104 is conveyed through the production system 100. The web of base material 104 is pressed against each of the two adjacent rollers 114 of nip roller 112, with enough pressure to allow friction of the rollers to move the web of base material 104, but a low enough pressure to avoid any significant deformation or damage to the web of base material 104.

In one embodiment, during use, the speed of the web of base material 104 is controlled by controlling the rate of rotation of the high friction roller of nip roller 112 via user interface 116. In other embodiments, the production system 100 may include one or more additional nip rollers 122, 132 to facilitate control of the speed of the web of base material 104, and the web of base material 104 is conveyed therethrough. In this embodiment, the speed of the additional nip rollers 122, 132 may be controlled via user interface 116. In use, when multiple nip rollers 112, 122, 132 are used, each of the speed of each of the nip rollers 112, 122, 132 may be set via user interface 116 to the same speed, or different speeds as required, such that the web of base material 104 is conveyed smoothly through production system 100.

In use, in one embodiment, the web of base material 104 is unwound through the dancer 118. In this embodiment, the pair of rollers of the dancer 118 rotates about the central axis thereof, to passively adjust the tension on the web of base material 104.

With further reference to FIG. 2, in use the web of base material 104 is conveyed through one or more laser systems 120a, 120b, 120c. The embodiment shown in FIG. 2 includes three laser systems 120a-c, but it should be appreciated that any number of laser systems 120 may be used to allow the production system 100 to function as described herein.

Use of the production system 100 is further described with additional reference to FIG. 2-6. The web of base material 104 is conveyed through the laser systems 120a-c in the down-web direction WD. In one embodiment, the web of base material 104 is conveyed into laser system 120a in the first condition 400, having not yet been ablated or cut. The web of base material 104 is conveyed over chuck 306, and thus over the plurality of vacuum holes 406. The vacuum holes 406 are in fluid connection with vacuum 308, and vacuum 308 is controlled via user interface 116 to draw a vacuum pressure on the web of base material 104 passing over the vacuum holes 406. The vacuum pressure is controlled to maintain the web of base material 104 in a substantially flat/planar state as it is conveyed across chuck 306. In one embodiment of use, the vacuum pressure through vacuum holes 406 is monitored and adjusted in real time, via user interface 116, to ensure that the web of base material 104 remains substantially flat across chuck 306 and does not lift or buckle while being processed.

With reference to FIG. 4, the web of base material 104 is conveyed over the opening 410 of chuck 306, and further over the chamfer 416 on the downstream edge 414. In this embodiment, the chamfer 416 facilitates the web of base material 104 passing over downstream edge 414 without having the web of base material 104 catch or snag on the downstream edge 414.

With further reference to FIGS. 3-5, in one embodiment of use, the web of base material 104 is ablated by laser beam 302 (FIG. 3) to create the ablations 404 (FIG. 4) in the web of base material 104. In one embodiment, the web of base material 104 is anode material 502, and the ablations 404 remove the anodically active material layer 508 to expose anode current collector layer 506 (FIG. 5). In another embodiment, the web of base material 104 is cathode material 504, and the ablations 404 remove the cathodically active material layer 512 to expose cathode current collector layer 510.

During use, when using the laser system 120a to make the ablations 404 in the web of base material 104, the power of the laser beam 302 is controlled via user interface 116 to a level that is capable of substantially completely, or completely, removing the coating layer, but will not damage or cut through the current collector layer. In use, the laser beam 302 is controlled, for example via user interface 116, to create the ablations 404 while the web of base material 104 is in motion and being conveyed in down-web direction WD. The laser beam 302 is controlled such that ablations 404 are created on each lateral side of the web of base material 104, as best shown in FIG. 5. In one embodiment of use, after making the ablations 404, the laser system 120a is controlled to cut fiducial features 602 in the web of base material 104, as described further herein. In some embodiments, multiple lasers are used to each ablate a portion of the web of base material 104 to each create one or more ablations 404 to increase the throughput of the production system 100.

With further reference to FIGS. 2, 3 and 4, in another stage of use of the production system 100, the web of base material 104 is conveyed in the down-web direction WD toward the cutting area 408 of the laser system 120a. In this embodiment the opening 410 is in fluid communication with the vacuum 308, and vacuum 308 is controlled to draw a vacuum pressure on the web of base material 104 as it passes over the opening 410. In another embodiment, a second vacuum is controlled to equalize the pressure on the web of base material 104 opposite the chuck 306. In this embodiment, the equalization in pressure is monitored and controlled to maintain the web of base material 104 in a substantially flat/planar state and at a consistent height as it passes over the opening 410, to facilitate focus of laser beam 302 on the web of base material 104.

In one embodiment of use, the laser system 120a is controlled to cut one or more patterns in the web of base material 104 while the web of base material 104 is over the opening 410. With reference to FIG. 6, the laser system 120 is controlled to cut one or more lengthwise edge cuts 600 to define lengthwise edges of an electrode in the cross-web direction XWD. The lengthwise edge cuts 600 are cut using laser beam 302 by cutting the web of base material 104 in the cross-web direction XWD while the web of base material 104 is conveyed in the down-web direction WD. For example, in one embodiment, the path motion of laser beam 302 is controlled and/or synchronized with the motion of the web of base material 104 in the down-web direction WD. Accordingly, the path of the laser beam 302 travels at an angle with respect to the down-web direction WD, to account for the movement of the web of base material 104 in the down-web direction WD. In this embodiment, a compensation factor is applied to the path of the laser beam 302 to allow cuts to be made in the cross-web direction XWD while the web of base material 104 is continuously traveling in the down-web direction WD. In this embodiment, as the web of base material 104 moves in the down-web direction WD, the laser beam 302 is projected onto the web of base material 104 at an initial cut location 604, and then is controlled to travel in both the cross-web direction XWD and the down-web direction WD until reaching end cut location 606 to create the lengthwise edge cuts 600. It should be appreciated that the angle at which the laser beam 302 is controlled to travel varies based upon the speed of the web of base material 104 in the down-web direction WD. In another embodiment, the web of base material 104 is temporarily stopped during the laser processing operation, and as such, the path of the laser beam 302 does not need to account for the motion of travel of the web of base material 104. Such embodiment may be referred to as a step process, or step and repeat process. During laser processing, one or more of the laser systems 120a-c use a repeating alignment feature, such as fiducial features 602 to adjust and/or align the laser beam 302 during the laser processing operations, for example to compensate for possible variations in positioning of the web of base material 104.

With further reference to FIG. 6, in one embodiment of use, the laser system 120a is controlled to cut one or more of the repeating alignment features such as a plurality of fiducial features 602 in the web of base material 104. The fiducial features 602 are cut at a predetermined/known location on the web of base material 104. In one embodiment of use, the fiducial features 602 are tracked by one or more of the visual inspection devices 310, 312 to measure the location and speed of travel of the web of base material 104. The measurement of the fiducial features 602 is then used to accurately maintain front to back alignment of the patterns on the web of base material 104 in both the down-web direction WD and cross-web direction XWD. In some embodiments of use, the laser system 120a cuts the plurality of tractor holes 612 and/or fiducial features 602. In other embodiments, the fiducial features 602 have been pre-formed into the web of base material 104 such that one or more of laser systems 120a-c uses them for positioning/alignment as described above.

With reference to FIGS. 2 and 6, in one suitable embodiment of use, the laser system 120a is controlled to cut a first perforation 608 and a second perforation 610 in the web of base material 104 as part of the individual electrode pattern 800 as the web of base material 104 is in motion in the down-web direction WD. First perforation 608 is formed by laser cutting using laser beam 302, while the web of base material 104 is positioned over the opening 410 in chuck 306. The first perforation 608 is formed as a linear slit (e.g., through-cut) in a direction aligned with the down-web direction WD. Importantly, the first perforation 608 is cut such that it does not extend across the entirety of the width of the electrode $W_E$. Instead, the laser system 120a is controlled to cut the patterns such that outer tear strips 700 remain on both the upstream and downstream edges of the first perforation 608, to ensure the individual electrode pattern 800 remains connected to the web of base material 104.

With further reference to FIGS. 6 and 7, in use, the second perforations 610 are cut inboard (in the cross-web direction XWD) from the first perforations 608. In this embodiment of use, second perforations 610 are cut as a line of slits in the down-web direction WD separated by inner tear strips 702. In the embodiment shown, the second perforations 610 are cut to intersect through holes 704. In the illustrated embodiment, the inner tear strips 702 are cut to be at least two times the length of outer tear strips 700, but may be cut at different lengths as to allow the production system 100 to function as described herein.

In use, with reference to FIGS. 3, 4 and 6, debris from the laser cuts for the lengthwise edge cuts 600, the fiducial features 602, and the first and second perforations 608, 610 over the opening 410 of the chuck 306, is allowed to fall through the opening 410 and the vacuum 308 is controlled to collect debris formed during the laser cutting process.

In one suitable embodiment of use, the laser system 120a is configured as a first ablation station. In this embodiment, the laser system 120a is controlled to form the ablations 404, as described above on a first surface of the web of base material 104. Upon exiting laser system 120a, the web of base material 104 is conveyed over idler 108d to flip the web of base material 104 in a manner such that a second surface (opposing the first surface) of the web of base material 104 is positioned for processing by the laser system 120b. In this embodiment, laser system 120b is configured as a second ablation station and uses the fiducial features 602 to ensure alignment of the ablations 404 in the down-web direction WD and cross-web direction XWD. Accordingly, the laser system 120b is controlled to perform a second ablation process on the opposing surface of the web of base material 104, such that ablations 404 on each surface of the web of base material 104 are aligned in the down-web direction WD and the cross-web direction XWD.

In one embodiment of use, the laser system 120c shown in FIG. 2 is configured as a laser cutting station. In this embodiment, the laser system 120c is controlled to perform the laser cuts for lengthwise edge cuts 600, and the first and second perforations 608 and 610.

With further reference to FIGS. 2, 10 and 11, in one embodiment of use, the web of base material 104 is then conveyed through one or more cleaning stations, such as brushing station 124 and air knife 126 upon having exited one or more of laser systems 120a-c. In one suitable embodiment of use, the web of base material 104 is conveyed through brushing station 124, and bristles 1002 are controlled to delicately contact a surface of the web of base material 104 and remove or dislodge any debris therefrom. The contact pressure of the bristles 1002 on the surface of the web of base material 104 is controlled to be low enough that it does not break, rupture or otherwise cause defects in the individual electrode patterns 800, and maintains the individual electrode patterns 800 as attached to the web of base material 104.

With further reference to FIGS. 10 and 11, in one suitable embodiment of use, brush 1000 is controlled to move in the cross-web direction XWD by controlling the motor 1014 to effect rotation of the drive wheel 1010. A position sensor 1016 is controlled to sense the position of the brush position marker 1018 to measure the phase (e.g., angular position) and rotations per time of the drive wheel 1010.

In one suitable embodiment of use, a second brush (not shown) is controlled to contact the opposing surface of the web of base material 104. In this embodiment, the second brush, which may be substantially the same as the first brush 1000 is controlled to travel in a direction opposite to the first brush 1000, and suitably 180 degrees out of phase with the first brush 1000. The phase of the first brush 1000 and the second brush may be monitored via the position sensor 1016, and an equivalent position sensor of the second brush. In this embodiment, the contact pressure of the bristles 1002 of the first brush 1000 and the second brush, together, is controlled to be low enough that it does not break, rupture or otherwise cause defects in the individual electrode patterns 800, and maintains the individual electrode patterns 800 as attached to the web of base material 104.

In use, the rate of oscillation of the brush 1000 and the pressure exerted by the bristles 1002 against the surface of the web of base material 104 may be controlled by the user using the user interface 116.

In one embodiment of use, the brushing station 124 is equipped with a vacuum system and controlled to create a vacuum through brush station orifices 1020 to evacuate debris that has been brushed from one or more surfaces of the web of base material 104. In this embodiment, the debris is brushed from the web of base material 104 and falls, or is suctioned through the brush station orifices 1020.

In another suitable embodiment of use, one or more of the first brush 1000 and the second brush include a load sensor that is measured or monitored to determine the pressure the brush 1000 is exerting upon the web of electrode material 802. In this embodiment, the first brush 1000 and the second brush are controlled, via the user interface 116, to maintain a substantially uniform brushing pressure on the web of electrode material 802 based upon variations in brush bristle wear or electrode thickness or surface roughness.

In another suitable embodiment of use, one or more of the first brush 1000 and the second brush are controlled to move at least partially in the down-web direction WD at a rate of speed substantially equivalent to the rate of speed of the web of electrode material 802, to maintain a substantially zero speed differential between the brush 1000 and the web of electrode material 802 in the down-web direction WD.

In yet another suitable embodiment of use, the brushing station 124 is equipped with a position sensor 1016 that determines the phase of the first brush 1000 and the second brush. In this embodiment, the position sensor 1016 measures the location of the brush position marker 1018 of the first brush 1000 and the second brush. In this embodiment, the position sensor 1016 determines whether the first and second brushes are within a range of predetermined phase difference, such as 180 degrees out of phase, 90 degrees out of phase or zero degrees out of phase or any other suitable phase difference that allows the production system 100 to function as described herein, and allows for correction thereof or provides an alert to the user via user interface 116 or other alert device that the brushes are not properly phased.

In still another embodiment of use, an ultrasonic transducer (not shown) is activated to impart ultrasonic vibrations to one or more of the first and second brushes to facilitate debris removal from the web of electrode material 802.

With further reference to FIG. 2, in one suitable embodiment of use, the web of base material 104 is conveyed through an air knife 126. In this embodiment, high pressure air is controlled to contact the surface of the web of base material 104 to remove debris therefrom. The air knife 126 is controlled, for example via user interface 116, to supply air at a pressure/velocity such that it does not break, rupture or otherwise cause defects in the individual electrode patterns 800, and maintains the individual electrode patterns 800 as attached to the web of base material 104. In another embodiment, a second air knife is controlled to blow air at an opposing surface of the web of base material 104 to remove debris therefrom. In this embodiment, the second air knife is controlled to blow air in the same direction as the first air knife 126, or in a direction opposite the first air knife, or any other direction that allows the air knife 126 to function as described herein. In another embodiment, the air knife 126 is equipped with a vacuum that is controlled to facilitate removal of the debris that has been removed by the air knife 126.

With reference to FIG. 8, after having been processed by the laser systems 120*a-c* and cleaned by the brushing station 124 and the air knife 126, the web of base material 104 exits the cleaning stations as a web containing a plurality of individual electrode patterns 800 within web of base material 104, collectively the web of electrode material 802.

With further reference to FIGS. 2, 8 and 12, in one embodiment of use, the web of electrode material 802 is conveyed through inspection station 128. The inspection station 128 is controlled to analyze the web of electrode material 802 and identify defects thereon. For example, in one embodiment, the inspection station 128 is a visual inspection device including the camera 1200. The lens 1202 is aimed to focus on the web of electrode material 802 as it passes over inspection plate 1206. In one embodiment of use, the inspection plate 1206 includes the transparent or semi-transparent top 1208 that allows light from a light source (not shown) housed within the inspection plate 1206 to shine therethrough. In one suitable embodiment, the intensity and/or color of the light is controlled via the user interface 116. In one embodiment of use, the web of electrode material 802 is conveyed over the inspection plate 1206 by gear wheels 1210 that engage the tractor holes 612 of the web of electrode material 802. In doing so, the web of electrode material 802 is held taught against inspection plate 1206, to substantially eliminate curling of the web of electrode material 802.

With additional reference to FIG. 12, in one embodiment of use, the inspection station 128 includes a trigger sensor 1212 that is controlled to detect a predetermined feature of the web of electrode material 802, such as a fiducial feature 602, lengthwise edge cut 600 or any other feature that allows inspection station 128 to function as described herein. Upon detection of the predetermined feature, the trigger sensor 1212 sends a signal directly to camera 1200 or indirectly through the user interface 116, to trigger the camera 1200 to image an electrode of the web of electrode material 802. Upon imaging the electrode, camera 1200 is controlled to detect one or more metrics such as a height of the electrode, a size or shape of a feature that has been cut by one of the laser systems 120*a*-120*c* (FIG. 2), the pitch (distance) between electrodes or any other feature that allows the inspection station 128 to function as described herein. For example, in one suitable embodiment, the inspection station 128 is controlled to detect whether the ablations 404 (FIG. 4), lengthwise edge cuts 600, fiducial features 602, and first and second perforations 608, 610 (FIG. 6), individual electrode structure cross-web direction XWD dimensions, individual electrode structure down-web direction WD dimensions, individual electrode active area offset, and any other ablation or cut of web of electrode material 802 are within a predefined tolerance of size, shape, placement, cross-machine direction pitch, machine direction pitch, and orientation, and presents this information to the user via user interface 116. In one suitable embodiment, a user may control which feature to inspect using the user interface 116. In yet another embodiment, inspection station 128 may detect a cluster identification code for one or more electrode structures of the web of electrode material 802.

In one embodiment of use, the inspection station 128 is used to provide in-line metrology of the web of base material 104 and/or web of electrode material 802. In this embodiment, the inspection station 128 is controlled to measure metrics such as web thickness, sizes and shapes of the individual electrode patterns 800, and the like while the web is being conveyed in the down-web direction WD. These metrics are transmitted to the user interface 116 for viewing or memory storage, or otherwise used to adjust production parameters of the production system 100.

In one embodiment of use, if the inspection station 128 determines a defect is present on the web of electrode material 802 (FIG. 8), the defect marking system 130 (FIG. 2) is controlled to mark the web of electrode material 802 to identify such defect using a laser etching device, printer, stamper or any other marking device capable of placing a mark indicating a defect is present on a web of electrode material 802. In another suitable embodiment of use, the defect marking system 130 is controlled to mark the web of electrode material 802 with one or more of an identification number (ID) and known good electrodes (KGEs), allowing for the possibility to further mark the web of electrode material 802 with a grade, such as grade A, grade B, grade C or the like, indicating a quality measurement (such as number or type of defects) of a particular individual electrode pattern 800 within the web of electrode material 802.

With further reference to FIG. 9, the web of electrode material 802 is then conveyed to the rewind roller 134, where it is wound together with web of interleaf material 138 to create a spool 900 having alternating layers of web of electrode material 802 and web of interleaf material 138.

In one suitable embodiment of use, the web of electrode material 802 is rewound via a rewind roller 134 together with a web of interleaf material 138, which is unwound via interleaf roller 136 to create a roll of electrodes 140 with layers of webs of electrode material 802 separated by webs of interleaf material 138. In some embodiments, the web of electrode material 802 is rewound via the rewind roller 134 without the web of interleaf material 138.

In one embodiment of use, web of base material 104 has an adhesive tape layer (not shown) adhered to one or both surfaces of the anodically active material layer 508, or cathodically active material layer 512, respectively. In this embodiment, in use, the adhesive layer is removed subsequent to the ablation and cutting (described above) to remove unwanted material or debris.

In one embodiment of use, one or more of the rollers of the conveyor system is not perfectly round, such that the roller has an eccentricity. In such embodiment, the eccentric roller(s) are mapped to determine the radius versus radial position. The laser system 120*a*-*c* is then controlled to adjust the laser beam 302 position to account for the eccentricity based upon the mapping of the roller(s).

Figure 14:
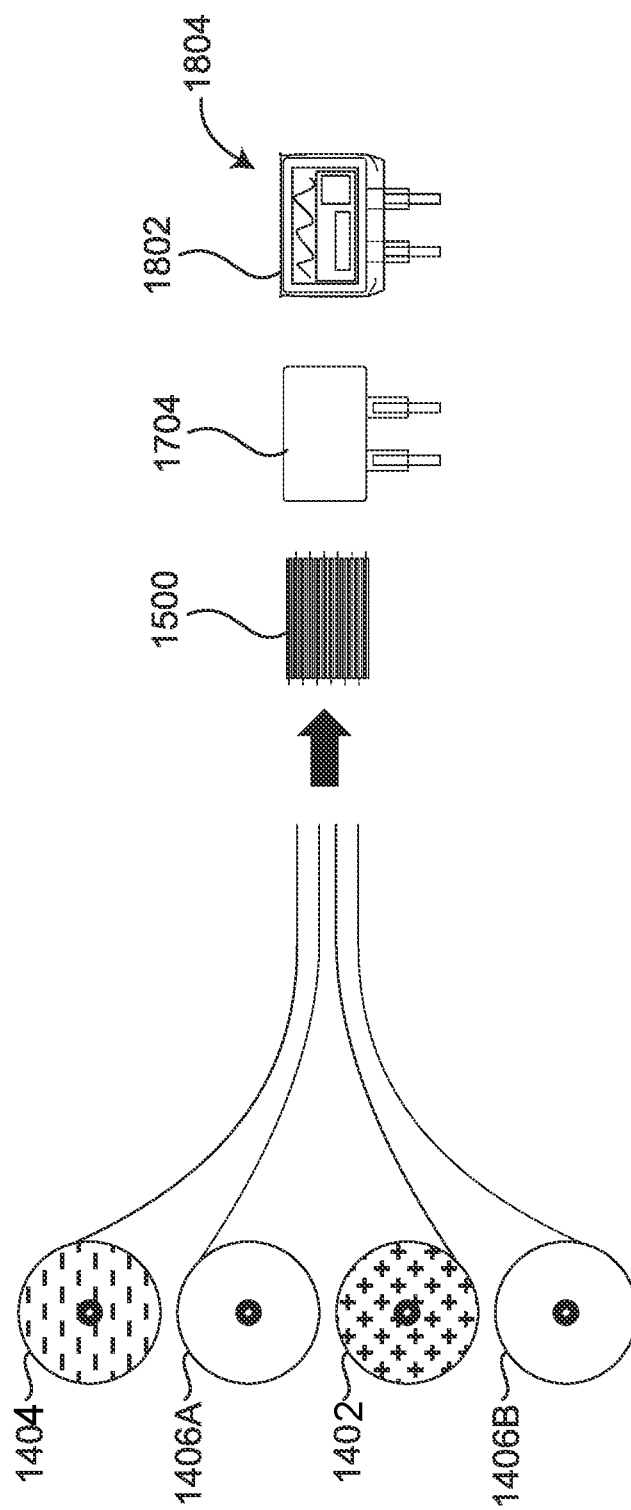
FIG. 14 is a schematic view of a stacking arrangement according to the current disclosure.
Figure 15:
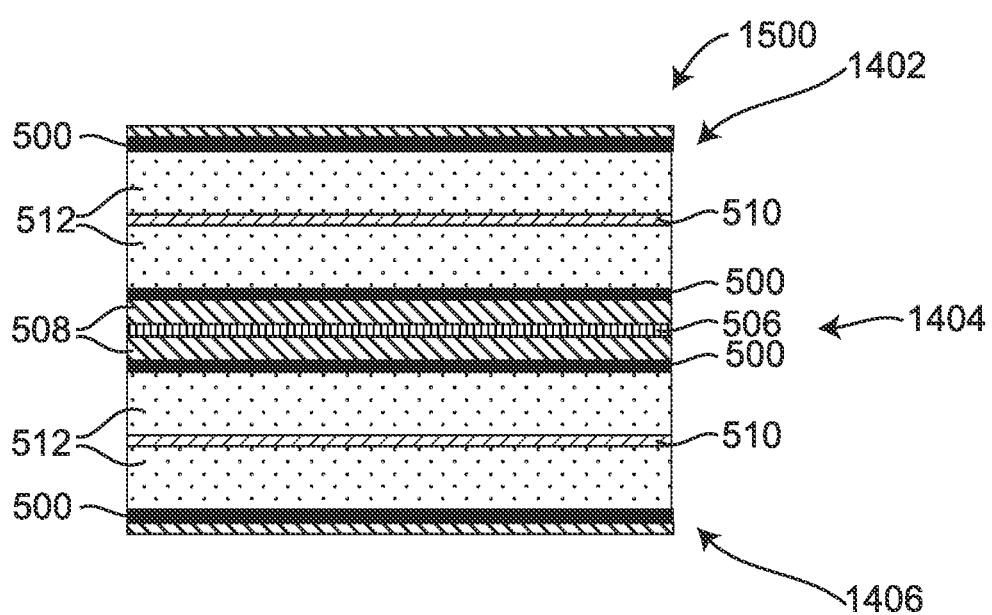
FIG. 15 is a cross section of a multi-layer stack of electrodes according to the current disclosure.
Figure 16A:
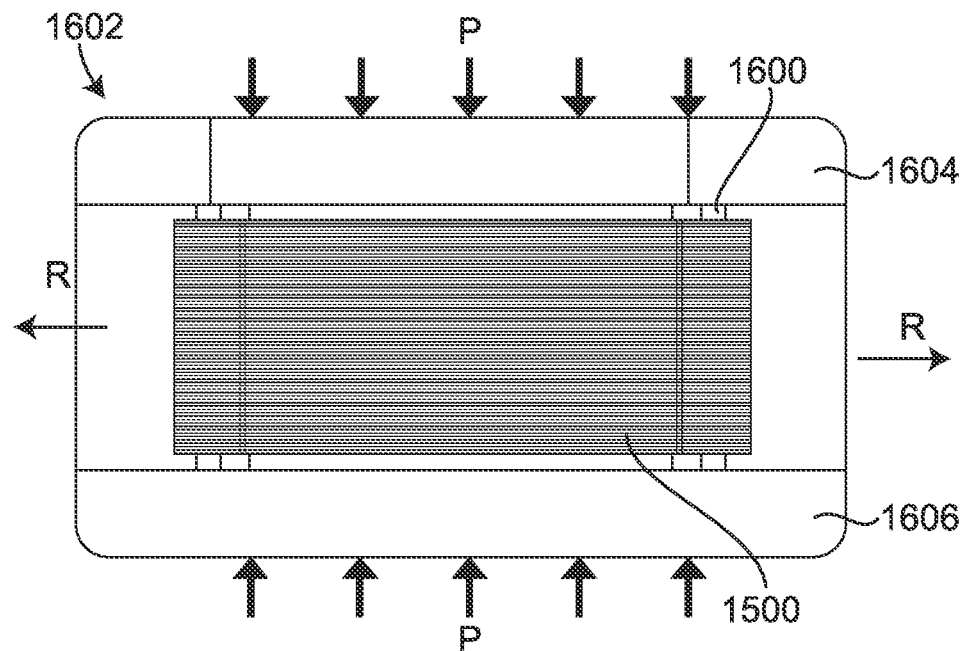
FIG. 16A is a side view of a multi-layer stack of electrodes according to the current disclosure.
Figure 16B:
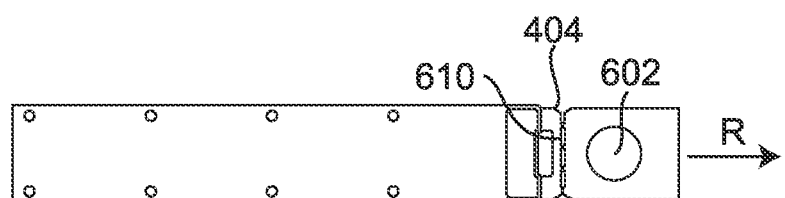
FIG. 16B is a partial top view of the multi-layer stack of electrodes of FIG. 16A.

With reference to FIGS. 14-16, the web of electrode material 802 is used to produce a battery. In this embodiment, individual spools of electrode material 1402, 1404, and 1406A and 1406B are unwound and stacked in an alternating configuration including at least one layer of cathode 1402 and anode 1404 separated by separator material 1406. It should be appreciated that the spools of electrode material 1402, 1404, and 1406A and 1406B have been produced as webs of electrode material 802 as described herein. In one suitable embodiment, the spools of electrode material 1402, 1404, 1406A, and 1406B are merged into a multi-layer stack 1500. In this embodiment, the multi-layer stack 1500 includes anode current collector layer 506 in the center, anodically active material layer 508, electrically insulating separator material 500, cathodically active material layer 512 and cathode current conductor layer 510 in a stacked formation. Additional stacked layers may be merged, by alternating layers of spools of anode 1404, separator 1406, and cathode 1402 to form the desired number of layers for multi-layer stack 1500. The layers of multi-layer stack 1500 are aligned using alignment pins 1600 that are driven through fiducial features 602 (FIG. 16B).

In another embodiment, for example for a solid state secondary battery, components of the solid state battery may be stacked (after processing as described herein) in a manner including, in order, a positive electrode current collector, an electrode layer comprising an positive active electrode material, ionic conductor, binder and electronic conductor), a solid state electrolyte and a negative electrode current collector, such as that described in U.S. Pat. No. 9,553,332, referenced above.

Figure 16C:
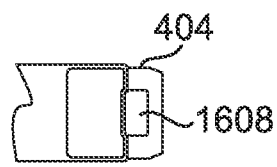
FIG. 16C is a partial top view of the multi-layer stack of FIG. 16A after rupture of a second perforation.
Figure 17:
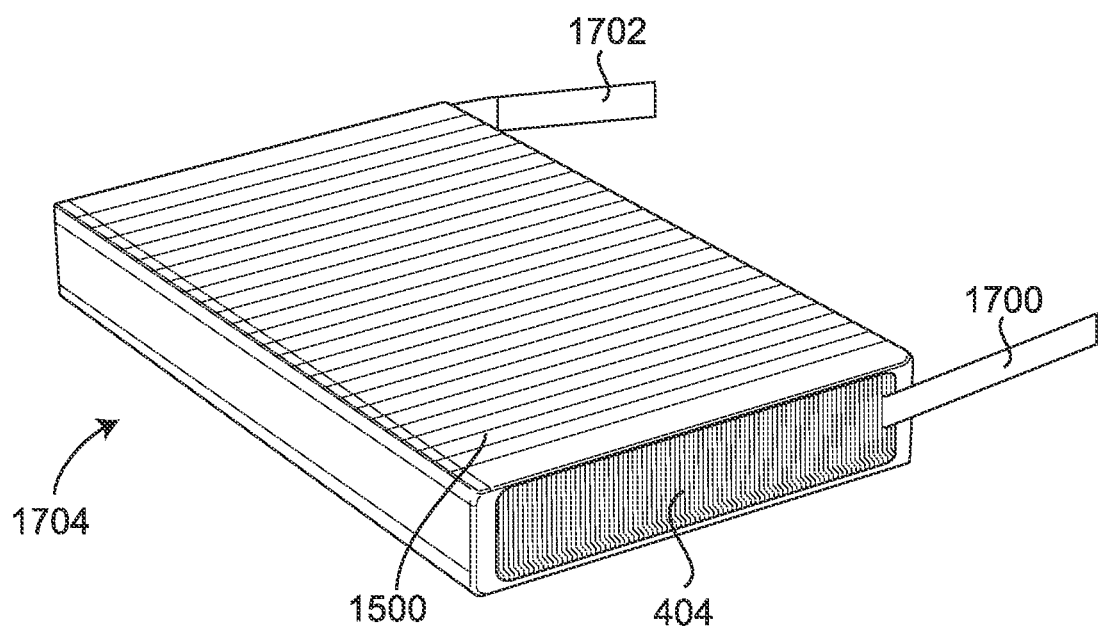
FIG. 17 is an isometric view of a stacked cell according to the current disclosure.
Figure 18A:
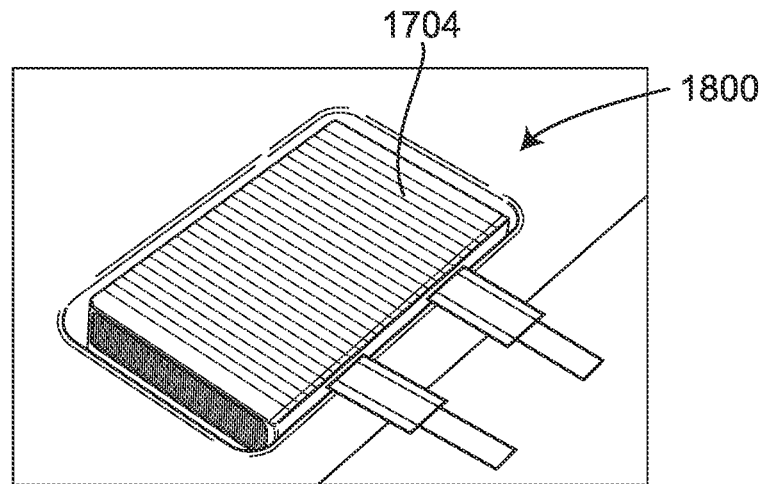
FIGS. 18A and 18B are sequential isometric views of a stacked cell having a battery package placed thereon.
Figure 18B:
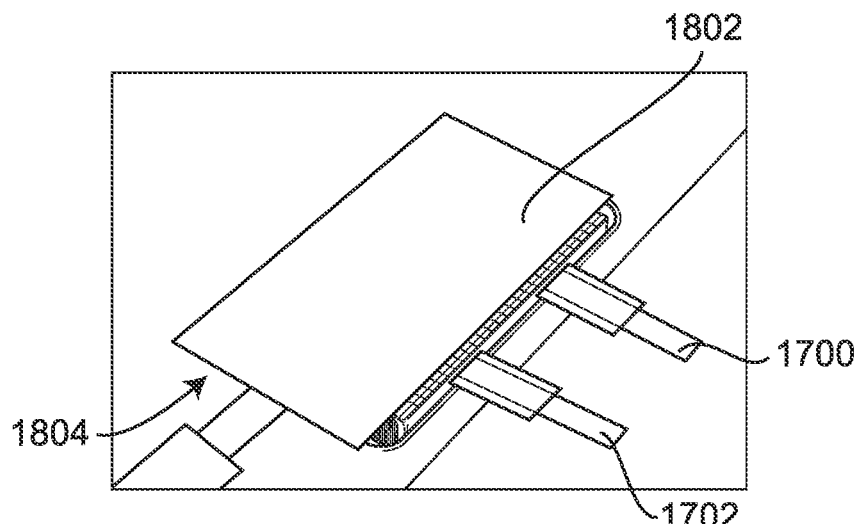

In one embodiment, the multi-layer stack 1500 is then placed in a pressurized constraint 1602 having pressure plates 1604, 1606 which apply pressure to the multi-layer stack 1500 in the directions shown by pressure arrows P. The pressure applied to the multi-layer stack 1500 may be adjustable using the user interface 116 to control the pressure P applied by the pressure plates 1604, 1606 to the multi-layer stack 1500. Once a sufficient pressure P has been applied to the multi-layer stack 1500, alignment pins 1600 may be moved in a removal direction R, which causes second perforation 610 to rupture along its length, such that the ablations 404 (electrode tabs) become the outer edges of multi-layer stack 1500, as shown in FIG. 16C.

After the second perforations 610 have ruptured, the multi-layer stack 1500 proceeds to a tab welding station to weld bus bars 1700 and 1702 to the ablations 404 to form stacked cell 1704. Prior to welding, the bus bars 1700, 1702 are placed through the bus bar openings 1608 of the respective electrode. In one embodiment, once the bus bars 1700, 1702 have been placed through the bus bar openings 1608, the ablations 404 are folded down toward bus bars 1700, 1702 respectively, prior to welding. In this embodiment, bus bar 1700 is a copper bus bar and is welded to the ablations 404 (anode tabs) of the anode current collector layer 506, and bus bar 1702 is an aluminum bus bar and is welded to the ablations 404 (cathode tabs) of the cathode current collector layer 510. However, in other embodiments, the bus bars 1700 and 1702 may be any suitable conductive material to allow battery 1804 to function as described herein. The welds may be made using a laser welder, friction welding, ultrasonic welding or any suitable welding method for welding bus bars 1700, 1702 to the ablations 404. In one embodiment, each of the bus bars 1700 and 1702 are in electrical contact with all of the ablations 404 for the anode and cathode, respectively.

Upon formation of the stacked cell 1704, the stacked cell 1704 proceeds to a packaging station 1800. At the packaging station 1800, the stacked cell 1704 is coated with an insulating packaging material, such as a multi-layer aluminum polymer material, plastic, or the like, to form a battery package 1802. In one embodiment, the battery package 1802 is evacuated using a vacuum and filled through an opening (not shown) with an electrolyte material. The insulating packaging material may be sealed around stacked cell 1704 using a heat seal, laser weld, adhesive or any suitable sealing method. The bus bars 1700 and 1702 remain exposed, and are not covered by battery package 1802 to allow a user to connect the bus bars 1700 and 1702 to a device to be powered, or to a battery charger. Once the battery package 1802 is placed on stacked cell 1704, it defines a completed battery 1804. In this embodiment, the completed battery 1804 is a 3-D lithium ion type battery. In other embodiments, the completed battery 1804 may be any battery type suitable for production using the devices and methods described herein.

Figure 6A:
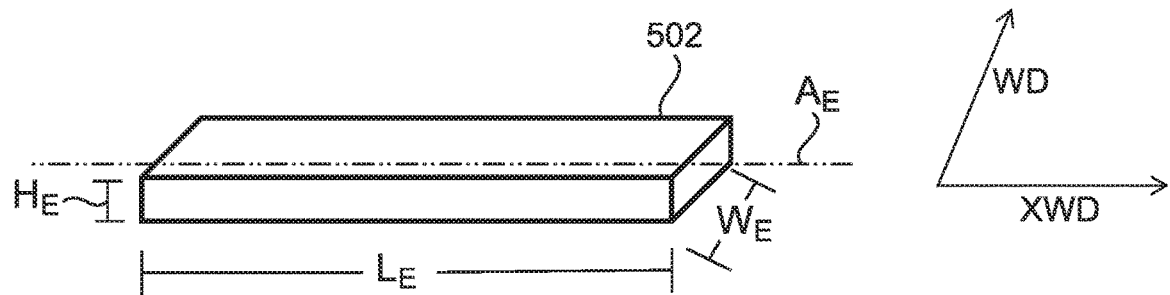
FIG. 6A is a perspective view of a portion of the web of base material as an exemplary negative electrode.

In one embodiment, each member of the anode population has a bottom, a top, and a longitudinal axis $A_E$ (FIG. 7). In one embodiment, the longitudinal axis $A_E$ extends in the cross-web direction XWD from the bottom to the top thereof. In an alternative embodiment, the longitudinal axis $A_E$ extends in the down-web direction WD from the bottom to the top thereof. In one embodiment, a member of the anode population is formed from the web of base material 104 being anode material 502. Additionally, each member of the anode population has a length ($L_E$) (FIG. 6A) measured along the longitudinal axis ($A_E$) of the electrode, a width ($W_E$) measured in a direction that is orthogonal to the longitudinal axis ($A_E$) (e.g., the down-web direction WD), and a height ($H_E$) (FIG. 6A) measured in a direction that is orthogonal to each of the directions of measurement of the length ($L_E$) and the width ($W_E$).

The length ($L_E$) of the members of the anode population members will vary depending upon the energy storage device and its intended use. In general, however, the members of the anode populations will typically have a length ($L_E$) in the range of about 5 mm to about 500 mm. For example, in one such embodiment, the members of the anode population have a length ($L_E$) of about 10 mm to about 250 mm. By way of further example, in one such embodiment the members of the anode population have a length ($L_E$) of about 25 mm to about 100 mm.

The width ($W_E$) of the members of the anode population will also vary depending upon the energy storage device and its intended use. In general, however, each member of the anode population will typically have a width ($W_E$) within the range of about 0.01 mm to 2.5 mm. For example, in one embodiment, the width ($W_E$) of each member of the anode population will be in the range of about 0.025 mm to about 2 mm. By way of further example, in one embodiment, the width ($W_E$) of each member of the anode population will be in the range of about 0.05 mm to about 1 mm.

The height ($H_E$) of the members of the anode population will also vary depending upon the energy storage device and its intended use. In general, however, members of the anode population will typically have a height ($H_E$) within the range of about 0.05 mm to about 10 mm. For example, in one embodiment, the height ($H_E$) of each member of the anode population will be in the range of about 0.05 mm to about 5 mm. By way of further example, in one embodiment, the height ($H_E$) of each member of the anode population will be in the range of about 0.1 mm to about 1 mm. According to one embodiment, the members of the anode population include one or more first electrode members having a first height, and one or more second electrode members having a second height that is other than the first. In yet another embodiment, the different heights for the one or more first electrode members and one or more second electrode members may be selected to accommodate a predetermined shape for an electrode assembly (e.g., multi-layer stack 1500 (FIG. 15)), such as an electrode assembly shape having a different heights along one or more of the longitudinal and/or transverse axis, and/or to provide predetermined performance characteristics for the secondary battery.

In general, members of the anode population have a length ($L_E$) that is substantially greater than each of its width ($W_E$) and its height ($H_E$). For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each member of the anode population. By way of further example, in one embodiment the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each member of the anode population.

In one embodiment, the ratio of the height ($H_E$) to the width ($W_E$) of the members of the anode population is at least 0.4:1, respectively. For example, in one embodiment, the ratio of $H_E$ to $W_E$ will be at least 2:1, respectively, for each member of the anode population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each member of the anode population.

Figure 6B:
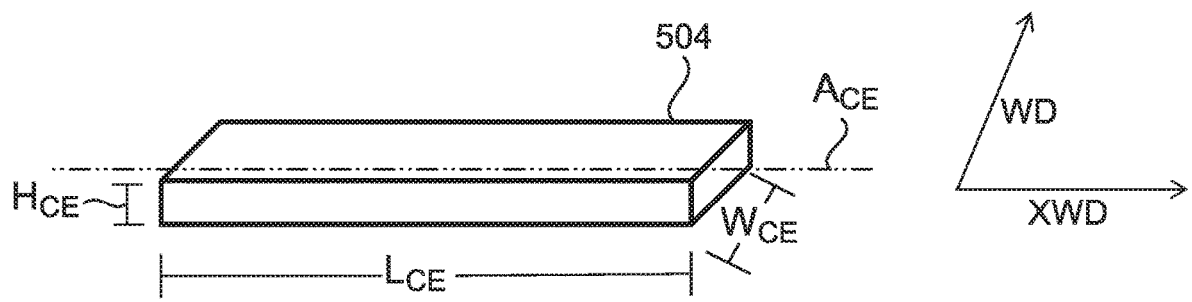
FIG. 6B is a perspective view of a portion of the web of base material as an exemplary positive electrode.

In one embodiment, a member of the cathode population is formed from the web of base material 104 being cathode material 504. Referring now to FIG. 6B, each member of the cathode population has a bottom, a top, and a longitudinal axis ($A_{CE}$) extending from the bottom to the top thereof in the cross-web direction XWD and in a direction generally perpendicular to the direction in which the alternating sequence of negative electrode structures and positive electrode structures progresses. Additionally, each member of the cathode population has a length ($L_{CE}$) measured along the longitudinal axis ($A_{CE}$) which is parallel to the cross-web direction XWD, a width ($W_{CE}$) measured in the down-web direction WD in which the alternating sequence of negative electrode structures and positive electrode structures progresses, and a height ($H_{CE}$) measured in a direction that is perpendicular to each of the directions of measurement of the length ($L_{CE}$) and the width ($W_{CE}$).

The length ($L_{CE}$) of the members of the cathode population will vary depending upon the energy storage device and its intended use. In general, however, each member of the cathode population will typically have a length ($L_{CE}$) in the range of about 5 mm to about 500 mm. For example, in one such embodiment, each member of the cathode population has a length ($L_{CE}$) of about 10 mm to about 250 mm. By way of further example, in one such embodiment each member of the cathode population has a length ($L_{CE}$) of about 25 mm to about 100 mm.

The width ($W_{CE}$) of the members of the cathode population will also vary depending upon the energy storage device and its intended use. In general, however, members of the cathode population will typically have a width ($W_{CE}$) within the range of about 0.01 mm to 2.5 mm. For example, in one embodiment, the width ($W_{CE}$) of each member of the cathode population will be in the range of about 0.025 mm to about 2 mm. By way of further example, in one embodiment, the width ($W_{CE}$) of each member of the cathode population will be in the range of about 0.05 mm to about 1 mm.

The height ($H_{CE}$) of the members of the cathode population will also vary depending upon the energy storage device and its intended use. In general, however, members of the cathode population will typically have a height ($H_{CE}$) within the range of about 0.05 mm to about 10 mm. For example, in one embodiment, the height ($H_{CE}$) of each member of the cathode population will be in the range of about 0.05 mm to about 5 mm. By way of further example, in one embodiment, the height ($H_{CE}$) of each member of the cathode population will be in the range of about 0.1 mm to about 1 mm. According to one embodiment, the members of the cathode population include one or more first cathode members having a first height, and one or more second cathode members having a second height that is other than the first. In yet another embodiment, the different heights for the one or more first cathode members and one or more second cathode members may be selected to accommodate a predetermined shape for an electrode assembly, such as an electrode assembly shape having a different heights along one or more of the longitudinal and/or transverse axis, and/or to provide predetermined performance characteristics for the secondary battery.

In general, each member of the cathode population has a length ($L_{CE}$) that is substantially greater than width ($W_{CE}$) and substantially greater than its height ($H_{CE}$). For example, in one embodiment, the ratio of $L_{CE}$ to each of $W_{CE}$ and $H_{CE}$ is at least 5:1, respectively (that is, the ratio of $L_{CE}$ to $W_{CE}$ is at least 5:1, respectively and the ratio of $L_{CE}$ to $H_{CE}$ is at least 5:1, respectively), for each member of the cathode population. By way of further example, in one embodiment the ratio of $L_{CE}$ to each of $W_{CE}$ and $H_{CE}$ is at least 10:1 for each member of the cathode population. By way of further example, in one embodiment, the ratio of $L_{CE}$ to each of $W_{CE}$ and $H_{CE}$ is at least 15:1 for each member of the cathode population. By way of further example, in one embodiment, the ratio of $L_{CE}$ to each of $W_{CE}$ and $H_{CE}$ is at least 20:1 for each member of the cathode population.

In one embodiment, the ratio of the height ($H_{CE}$) to the width ($W_{CE}$) of the members of the cathode population is at least 0.4:1, respectively. For example, in one embodiment, the ratio of $H_{CE}$ to $W_{CE}$ will be at least 2:1, respectively, for each member of the cathode population. By way of further example, in one embodiment the ratio of $H_{CE}$ to $W_{CE}$ will be at least 10:1, respectively, for each member of the cathode population. By way of further example, in one embodiment the ratio of $H_{CE}$ to $W_{CE}$ will be at least 20:1, respectively, for each member of the cathode population. Typically, however, the ratio of $H_{CE}$ to $W_{CE}$ will generally be less than 1,000:1, respectively, for each member of the anode population. For example, in one embodiment the ratio of $H_{CE}$ to $W_{CE}$ will be less than 500:1, respectively, for each member of the cathode population. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each member of the cathode population.

In one embodiment, anode current collector layer 506 also has an electrical conductance that is substantially greater than the electrical conductance of the anodically active material layer 508. For example, in one embodiment the ratio of the electrical conductance of anode current collector layer 506 to the electrical conductance of the anodically active material layer 508 is at least 100:1 when there is an applied current to store energy in the device or an applied load to discharge the device. By way of further example, in some embodiments the ratio of the electrical conductance of anode current collector layer 506 to the electrical conductance of the anodically active material layer 508 is at least 500:1 when there is an applied current to store energy in the device or an applied load to discharge the device. By way of further example, in some embodiments the ratio of the electrical conductance of anode current collector layer 506 to the electrical conductance of the anodically active material layer 508 is at least 1000:1 when there is an applied current to store energy in the device or an applied load to discharge the device. By way of further example, in some embodiments the ratio of the electrical conductance of anode current collector layer 506 to the electrical conductance of the anodically active material layer 508 is at least 5000:1 when there is an applied current to store energy in the device or an applied load to discharge the device. By way of further example, in some embodiments the ratio of the electrical conductance of anode current collector layer 506 to the electrical conductance of the anodically active material layer 508 is at least 10,000:1 when there is an applied current to store energy in the device or an applied load to discharge the device.

In general, the cathode current collector layer 510 may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, cathode current collector layer 510 comprises gold or an alloy thereof such as gold silicide. By way of further example, in one embodiment, cathode current collector layer 510 comprises nickel or an alloy thereof such as nickel silicide.

The following embodiments are provided to illustrate aspects of the disclosure, although the embodiments are not intended to be limiting and other aspects and/or embodiments may also be provided.

Embodiment 1. A process for delineating a population of electrode structures in a web, the web comprising an electrically conductive layer having opposing front and back surfaces and an electrochemically active material layer on the front surface, the back surface, or on both of the front and back surfaces, the web having a down-web direction and a cross-web direction, the down-web and cross-web directions being orthogonal to each other, the process comprising: controlling a tension of the web in the down-web direction while forming a series of weakened tear patterns in the web in the down-web direction, the cross-web direction, or each of the cross-web and down-web directions that delineate members of the electrode structure population without releasing the delineated members from the web, wherein the delineated members are individually bounded, at least in part, by a member of the series of weakened tear patterns that is adapted to facilitate separation of delineated members, individually, from the web by an application of a force, and forming a series of alignment features in the web that are disposed in the cross-web or down-web direction relative to the delineated members, the alignment features being adapted for locating delineated members of the electrode structure population, individually, in the web.

Embodiment 2. A process for delineating a population of electrode structures in a web, the web comprising an electrically conductive layer having opposing front and back surfaces and an electrochemically active material layer on the front surface, the back surface, or on both of the front and back surfaces, the web having a down-web direction and a cross-web direction, the down-web and cross-web directions being orthogonal to each other, the process comprising: supporting a portion of the web on a support surface, the support surface defining an opening; forming a series of weakened tear patterns in the web in the down-web direction, the cross-web direction, or each of the cross-web and down-web directions that delineate members of the electrode structure population without releasing the delineated members from the web, wherein the delineated members are individually bounded, at least in part, by a member of the series of weakened tear patterns that is adapted to facilitate separation of delineated members, individually, from the web by an application of a force, and forming a series of alignment features in the web that are disposed in the cross-web or down-web direction relative to the delineated members, the alignment features being adapted for locating delineated members of the electrode structure population, individually, in the web, wherein at least one of the forming the weakened tear patterns and the forming the series of alignment features is performed on the portion of the web located over an opening of a support surface for supporting the web.

Embodiment 3. A process for delineating a population of electrode structures or electrode separator structures in a web, the web comprising a down-web direction, a cross-web direction orthogonal to the down-web direction, and an electrically insulating layer, the process comprising: controlling a portion of the web to be laser machined to be within about +/−100 microns of a laser focal point of a laser beam, laser machining the portion of the web in at least one of the cross-web direction and the down web direction to delineate members of the electrode structure or electrode separator structure population in the web without releasing the delineated members from the web; and forming an alignment feature in the web that is adapted for locating each delineated member of the electrode structure or electrode separator structure population in the web.

Embodiment 4. A process for delineating a population of electrode structures in a web, the web comprising a down-web direction and a cross-web direction orthogonal to the down-web direction, the process comprising: machining the web in the cross-web and down-web directions to form a discontinuous weakened portion to delineate members of the electrode structure population in the web without releasing the delineated members from the web, the machined web having a strength of 10% to 75% of the strength of unmachined web in the web direction.

Embodiment 5. A process for delineating a population of electrode structures in a web, the web comprising a down-web direction, a cross-web direction orthogonal to the down-web direction, an electrochemically active layer, and an electrically conductive layer, the process comprising: laser machining the web in at least the cross-web direction to delineate members of the electrode structure population in the web without releasing the delineated members from the web; and forming an alignment feature in the web that is adapted for locating each delineated member of the electrode structure population in the web.

Embodiment 6. A process for delineating a population of electrode separator structures in a web, the web comprising a down-web direction, a cross-web direction orthogonal to the down-web direction, and an electrically insulating layer, the process comprising: laser machining the web in at least the cross-web direction to delineate members of the electrode separator structure population in the web without releasing the delineated members from the web; and forming an alignment feature in the web that is adapted for locating each delineated member of the electrode structure population in the web.

Embodiment 7. A process for delineating a population of electrode structures in a web, the web comprising a down-web direction, a cross-web direction orthogonal to the down-web direction, an electrochemically active layer, and an electrically conductive layer, the process comprising: feeding the web to a cutting station; cutting the web in at least the cross-web direction at the cutting station to delineate members of the electrode structure population in the web without releasing the delineated members from the web; and cutting alignment features in the web that are adapted for locating each delineated member of the electrode structure population in the web.

Embodiment 8. A process for delineating a population of electrode structures in a web, the web comprising a down-web direction, a cross-web direction orthogonal to the down-web direction, an electrochemically active layer, and an electrically conductive layer, the process comprising: feeding the web to a laser cutting system; cutting alignment features into the web using the laser cutting system; establishing a location of the web using at least one of the alignment features; and performing at least one of a cut action and an ablate action on the web based on the established location.

Embodiment 9. A process for delineating a population of electrode structures in a web, the web comprising a down-web direction, a cross-web direction orthogonal to the down-web direction, an electrochemically active layer, and an electrically conductive layer, the process comprising: laser machining the web in at least the cross-web direction to delineate members of the electrode structure population in the web by forming a discontinuous weakened portion defining an outer boundary of each delineated member, without releasing the delineated members from the web; and forming an alignment feature in the web that is adapted for locating each delineated member of the electrode structure population in the web.

Embodiment 10. A process for delineating a population of electrode structures in a web, the web comprising a down-web direction and a cross-web direction orthogonal to the down-web direction, the process comprising: machining the web in the cross-web and down-web directions to form a discontinuous weakened portion to delineate members of the electrode structure population in the web without releasing the delineated members from the web, the machined web having a strength of 5% to 30% of the strength of the unmachined web in the cross-web direction.

Embodiment 11. A web comprising an electrochemically active layer and an electrically conductive layer, the web having a delineated population of electrode structures, each electrode structure of the delineated population of electrode structures being spaced from an adjacent electrode structure by a discontinuous cut in the web, the web further comprising alignment features adapted for locating each delineated electrode structure of the electrode structure population in the web.

Embodiment 12. A web comprising a delineated population of separator structures, each separator structure of the delineated population of separator structures being spaced from an adjacent separator structure by a discontinuous cut in the web, the web further comprising alignment features adapted for locating each delineated separator structure of the separator structure population in the web.

Embodiment 13. A process for delineating a population of electrode structures in a web, the web comprising a down-web direction, a cross-web direction orthogonal to the down-web direction, and at least one of a solid state electrolyte, a negative electrode current collector, a positive electrode current collector and an positive electrode active material, the process comprising: feeding the web to a laser cutting system; cutting alignment features into the web using the laser cutting system; establishing a location of the web using at least one of the alignment features; and performing at least one of a cut action and an ablate action on the web based on the established location.

Embodiment 14. A web comprising a solid state electrolyte, the web having a delineated population of electrode structures, each electrode structure of the delineated population of electrode structures being spaced from an adjacent electrode structure by a discontinuous cut in the web, the web further comprising alignment features adapted for locating each delineated electrode structure of the electrode structure population in the web.

Embodiment 15. The process or web of any preceding Embodiment wherein the series of weakened tear patterns are formed with a laser.

Embodiment 16. The process or web of any preceding Embodiment, wherein the series of alignment features are formed with a laser.

Embodiment 17. The process or web of any preceding Embodiment, wherein the series of weakened tear patterns, the series of alignment features, or the series of weakened tear patterns and the series of alignment features are formed with a laser.

Embodiment 18. The process or web of any preceding Embodiment, wherein the laser has a laser power within a range of from 10 watts to 5,000 watts, is a fiber laser, is capable of laser pulse width types of one or more of continuous wave (cw), microsecond (μs), nanosecond (ns), picosecond (ps) and femtosecond (fs) pulse types or combinations thereof.

Embodiment 19. The process or web of any preceding Embodiment, wherein the electrochemically active material layer is on only one of the front and back surfaces of the electrically conductive layer.

Embodiment 20. The process or web of any preceding Embodiment, wherein the electrochemically active material layer is on both of the front and back surfaces of the electrically conductive layer.

Embodiment 21. The process or web of any preceding Embodiment, wherein the delineated members of the electrode structure population have a length, $L_E$, and a height, $H_E$, wherein: (i) $L_E$ is measured in the cross-web direction and $H_E$ is measured in the down-web direction or (ii) $L_E$ is measured in the down-web direction and $H_E$ is measured in the cross-web direction.

Embodiment 22. The process or web of any preceding Embodiment, wherein the delineated members of the electrode structure population have a length, $L_E$, and a height, $H_E$, wherein $L_E$ is measured in the cross-web direction and $H_E$ is measured in the down-web direction.

Embodiment 23. The process or web of any preceding Embodiment, wherein the delineated members of the electrode structure population have a length, $L_E$, and a height, $H_E$, wherein $L_E$ is measured in the down-web direction and $H_E$ is measured in the cross-web direction.

Embodiment 24. The process or web of any preceding Embodiment, wherein the delineated members of the electrode structure population have a width, $W_E$, measured in a direction that is orthogonal to the front and back surfaces of the web and to the down-web and cross-web directions.

Embodiment 25. The process or web of any preceding Embodiment, wherein a ratio of $L_E$ to each of $W_E$ and $H_E$ is at least 5:1 (that is, the ratio of $L_E$ to $W_E$ is at least 5:1, respectively and the ratio of $L_E$ to $H_E$ is at least 5:1, respectively).

Embodiment 26. The process or web of any preceding Embodiment, wherein the ratio of $L_E$ to each of $W_E$ and $H_E$ is at least 10:1 (that is, the ratio of $L_E$ to $W_E$ is at least 10:1, respectively and the ratio of $L_E$ to $H_E$ is at least 10:1, respectively).

Embodiment 27. The process or web of any preceding Embodiment, wherein the ratio of $L_E$ to each of $W_E$ and $H_E$ is at least 15:1 (that is, the ratio of $L_E$ to $W_E$ is at least 15:1, respectively and the ratio of $L_E$ to $H_E$ is at least 15:1, respectively).

Embodiment 28. The process or web of any preceding Embodiment, wherein the ratio of $L_E$ to each of $W_E$ and $H_E$ is at least 20:1 (that is, the ratio of $L_E$ to $W_E$ is at least 20:1, respectively and the ratio of $L_E$ to $H_E$ is at least 20:1, respectively).

Embodiment 29. The process or web of any preceding Embodiment, wherein the ratio of $H_E$ to $W_E$ is at least 0.4:1, respectively.

Embodiment 30. The process or web of any preceding Embodiment, wherein the ratio of $H_E$ to $W_E$ is at least 2:1, respectively.

Embodiment 31. The process or web of any preceding Embodiment, wherein the ratio of $H_E$ to $W_E$ is at least 10:1, respectively.

Embodiment 32. The process or web of any preceding Embodiment, wherein the ratio of $H_E$ to $W_E$ is at least 20:1, respectively.

Embodiment 33. The process or web of any preceding Embodiment, wherein the ratio of $H_E$ to $W_E$ is less than 1,000:1, respectively.

Embodiment 34. The process or web of any preceding Embodiment, wherein the ratio of $H_E$ to $W_E$ is less than 500:1, respectively.

Embodiment 35. The process or web of any preceding Embodiment, wherein the ratio of $H_E$ to $W_E$ is less than 100:1, respectively.

Embodiment 36. The process or web of any preceding Embodiment, wherein the ratio of $H_E$ to $W_E$ is less than 10:1, respectively.

Embodiment 37. The process or web of any preceding Embodiment, wherein the ratio of $H_E$ to $W_E$ is within a range of about 2:1 to about 100:1, respectively.

Embodiment 38. The process or web of any preceding Embodiment, wherein $L_E$ is within a range of about 5 mm to about 500 mm.

Embodiment 39. The process or web of any preceding Embodiment, wherein $L_E$ is within a range of about 10 mm to about 250 mm.

Embodiment 40. The process or web of any preceding Embodiment, wherein $L_E$ is within a range of about 25 mm to about 100 mm.

Embodiment 41. The process or web of any preceding Embodiment, wherein $W_E$ is within a range of about 0.01 mm to 2.5 mm.

Embodiment 42. The process or web of any preceding Embodiment, wherein $W_E$ is within a range of about 0.025 mm to about 2 mm.

Embodiment 43. The process or web of any preceding Embodiment, wherein $W_E$ is within a range of about 0.05 mm to about 1 mm.

Embodiment 44. The process or web of any preceding Embodiment, wherein $H_E$ is within a range of about 0.05 mm to about 10 mm.

Embodiment 45. The process or web of any preceding Embodiment, wherein $H_E$ is within a range of about 0.05 mm to about 5 mm.

Embodiment 46. The process or web of any preceding Embodiment, wherein $H_E$ is within a range of about 0.1 mm to about 1 mm.

Embodiment 47. The process or web of any preceding Embodiment, wherein the electrically conductive layer has an electrical conductivity of at least $10^3$ Siemens/cm.

Embodiment 48. The process or web of any preceding Embodiment, wherein the electrically conductive layer has an electrical conductivity of at least about $10^4$ Siemens/cm.

Embodiment 49. The process or web of any preceding Embodiment, wherein the electrically conductive layer has an electrical conductivity of at least about $10^5$ Siemens/cm.

Embodiment 50. The process or web of any preceding Embodiment, wherein the electrically conductive layer comprises a material suitable for use as a positive electrode current collector layer.

Embodiment 51. The process or web of any preceding Embodiment, wherein the electrically conductive layer comprises aluminum, carbon, chromium, gold, nickel, nickel phosphorous (NiP), palladium, platinum, rhodium, ruthenium, titanium, an alloy of silicon and nickel (NiSi), or a combination thereof.

Embodiment 52. The process or web of any preceding Embodiment, wherein the electrochemically active material layer comprises a cathodically active material.

Embodiment 53. The process or web of any preceding Embodiment, wherein the electrochemically active material layer(s) comprise a transition metal oxide, a transition metal sulfide, a transition metal nitride, a lithium-transition metal oxide, a lithium-transition metal sulfide, or a lithium-transition metal nitride.

Embodiment 54. The process or web of any preceding Embodiment, wherein the electrochemically active material layer(s) comprise a transition metal oxide, a transition metal sulfide, or a transition metal nitride wherein the transition metal has a d-shell or f-shell.

Embodiment 55. The process or web of any preceding Embodiment, wherein the electrochemically active material layer(s) comprise Sc, Y, a lanthanoid, an actinoid, Ti, Zr, Hf, V, Nb, Ta, Cr, Mo, W, Mn, Tc, Re, Fe, Ru, Os, Co, Rh, Ir, Ni, Pb, Pt, Cu, Ag, or Au.

Embodiment 56. The process or web of any preceding Embodiment, wherein the electrochemically active material layer(s) comprise $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, and combinations thereof.

Embodiment 57. The process or web of any preceding Embodiment, wherein the electrically conductive layer comprises a material suitable for use as a negative electrode current collector layer.

Embodiment 58. The process or web of any preceding Embodiment, wherein the electrically conductive layer comprises copper, nickel, cobalt, titanium, or tungsten, or an alloy thereof.

Embodiment 59. The process or web of any of preceding Embodiment wherein the electrochemically active material layer(s) comprise an anodically active material.

Embodiment 60. The process or web of any of preceding Embodiment wherein the electrochemically active material layer(s) comprise graphite, a soft or hard carbon, or graphene.

Embodiment 61. The process or web of any preceding Embodiment wherein the electrochemically active material layer(s) comprise single-walled or multi-walled carbon nanotubes.

Embodiment 62. The process or web of any preceding Embodiment wherein the electrochemically active material layer(s) comprise single-walled carbon nanotubes.

Embodiment 63. The process or web of any preceding Embodiment wherein the electrochemically active material layer(s) comprise a metal, a semi-metal, an alloy, or an oxide or nitride thereof capable of forming an alloy with lithium.

Embodiment 64. The process or web of any preceding Embodiment wherein the electrochemically active material layer(s) comprise graphite, tin, lead, magnesium, aluminum, boron, gallium, silicon, a Si/C composite, a Si/graphite blend, silicon oxide ($SiO_x$), porous Si, intermetallic Si alloys, indium, zirconium, germanium, bismuth, cadmium, antimony, silver, zinc, arsenic, hafnium, yttrium, lithium, sodium, lithium titanate, palladium, or a combination thereof.

Embodiment 65. The process or web of any preceding Embodiment wherein the electrochemically active material layer(s) comprise aluminum, tin, or silicon, or an oxide thereof, a nitride thereof, a fluoride thereof, or alloy thereof.

Embodiment 66. The process or web of any preceding Embodiment wherein the electrochemically active material layer(s) comprise silicon or an alloy or oxide thereof.

Embodiment 67. The process or web of any preceding Embodiment wherein the electrically conductive layer comprises a material suitable for use as a negative electrode current collector layer, the electrochemically active material layer(s) comprises an anodically active material and the electrically conductive layer has an electrical conductance that is substantially greater than the electrical conductance of the anodically active material layer.

Embodiment 68. The process or web of any preceding Embodiment wherein a ratio of the electrical conductance of the electrically conductive layer to the electrical conductance of the anodically active material layer is at least 100:1.

Embodiment 69. The process or web of any preceding Embodiment wherein a ratio of the electrical conductance of the electrically conductive layer to the electrical conductance of the anodically active material layer is at least 500:1.

Embodiment 70. The process or web of any preceding Embodiment wherein a ratio of the electrical conductance of the electrically conductive layer to the electrical conductance of the anodically active material layer is at least 1,000:1.

Embodiment 71. The process or web of any preceding Embodiment wherein a ratio of the electrical conductance of the electrically conductive layer to the electrical conductance of the anodically active material layer is at least 5,000:1.

Embodiment 72. The process or web of any preceding Embodiment wherein a ratio of the electrical conductance of the electrically conductive layer to the electrical conductance of the anodically active material layer is at least 10,000:1.

Embodiment 73. The process or web of any preceding Embodiment, wherein the web is a laminate comprising an electrochemically active layer and an electrically conductive layer.

Embodiment 74. The process or web of any preceding Embodiment, wherein the electrochemically active layer comprises an anodically active material.

Embodiment 75. The process or web of any preceding Embodiment, wherein the electrochemically active layer comprises a cathodically active material.

Embodiment 76. The process or web of any preceding Embodiment, wherein the laser machining comprises forming a plurality of cuts and perforations through the web.

Embodiment 77. The process or web of any preceding Embodiment, wherein the machined web has a strength of 10% to 75% of a strength of unmachined web in the web direction.

Embodiment 78. The process or web of any preceding Embodiment, wherein the machined web has a strength of 5% to 30% of the strength of an unmachined web in the cross-web direction.

Embodiment 79. The process or web of any preceding Embodiment, wherein the alignment feature comprises a through-hole extending through the web.

Embodiment 80. The process or web of any preceding Embodiment, wherein the laser machining comprises forming a series of outer perforations and a series of inner perforations, the outer perforations having a lower rupture strength than the inner perforations.

Embodiment 81. The process or web of any preceding Embodiment, wherein the laser machining comprises ablating an electrode tab area from each delineated electrode.

Embodiment 82. The process or web of any preceding Embodiment, further comprising laser machining the web in the down-web direction.

Embodiment 83. The process or web of any preceding Embodiment, further comprising using information related to the alignment feature to position a laser beam during the laser machining of the web.

Embodiment 84. The process or web of any preceding Embodiment, wherein the laser machining comprises controlling a first laser device to laser machine the web in the cross-web direction and controlling a second laser device to laser machine the web in the down-web direction.

Embodiment 85. The process or web of any preceding Embodiment, further comprising applying a vacuum to the web during the laser machining of the web.

Embodiment 86. The process or web of any preceding Embodiment, further comprising using a sensor to detect defects in the delineated members.

Embodiment 87. The process or web of any preceding Embodiment, further comprising using a marking device to mark the web in a manner to indicate a detected defect in the delineated member.

Embodiment 88. The process or web of any preceding Embodiment, further comprising laser machining a tie bar between groupings of the delineated members.

Embodiment 89. The process or web of any preceding Embodiment, wherein the tie bar is defined by laser machined cuts in the cross-web direction.

Embodiment 90. The process or web of any preceding Embodiment, further comprising applying a tension to the web in the cross-web direction prior to the laser machining.

Embodiment 91. The process or web of any preceding Embodiment, wherein the alignment features are formed at a location distal to the delineated members in the cross-web direction.

Embodiment 92. The process or web of any preceding Embodiment, further comprising leaving an unmachined portion of the web between the alignment features and an outermost edge of the web in the cross-web direction.

Embodiment 93. The process or web of any preceding Embodiment, wherein the unmachined portion extends across an entire length of the web in the web direction.

Embodiment 94. The process or web of any preceding Embodiment, further comprising contacting a rotating brush against the web after the laser machining.

Embodiment 95. The process or web of any preceding Embodiment, wherein the laser machining process occurs while the web moves in the down-web direction.

Embodiment 96. The process or web of any preceding Embodiment, wherein a laser beam is controlled to account for a speed of travel of the web in the down-web direction during the laser machining.

Embodiment 97. The process or web of any preceding Embodiment, further comprising controlling the tension of the web in the down-web direction during the laser machining.

Embodiment 98. The process or web of any preceding Embodiment, further comprising winding the laser machined web with an interleaf layer.

Embodiment 99. The process or web of any preceding Embodiment, further comprising conveying the web in the down-web direction after the laser machining without releasing the delineated members from the web.

Embodiment 100. The process or web of any preceding Embodiment, wherein there is a one to one ratio of alignment features to delineated members.

Embodiment 101. The process or web of any preceding Embodiment, wherein the weakened portion comprises a series of through cuts or perforations.

Embodiment 102. The process of any preceding Embodiment, further comprising pressure-balancing the web during the forming of the discontinuous weakened portion.

Embodiment 103. The process or web of any preceding Embodiment, wherein the pressure-balancing involves application of a fluid flow across the web.

Embodiment 104. The process or web of any preceding Embodiment, wherein the pressure-balancing comprises applying a fluid flow across opposing sides of the web.

Embodiment 105. The process or web of any preceding Embodiment, wherein the alignment feature is formed prior to the laser machining.

Embodiment 106. The process or web of any preceding Embodiment, wherein the alignment feature is used to aid in the forming of the discontinuous weakened portions.

Embodiment 107. The process or web of any preceding Embodiment, wherein the support surface comprises aluminum and the support surface dissipates thermal energy from the laser machining process.

Embodiment 108. The process of web of any preceding Embodiment, wherein the laser machining is performed on a portion of the web located over an opening of a support surface.

Embodiment 109. The process or web of any preceding Embodiment, wherein the controlling a portion of the web comprises controlling the web in a vertical axis direction substantially parallel to the laser beam.

Embodiment 110. The process or web of any preceding Embodiment, wherein the support surface comprises a plurality of openings, and the forming the weakened tear patterns and the forming the series of alignment features is performed on respective portions of the web located over different ones of the plurality of openings.

Embodiment 111. The process or web of any preceding Embodiment, wherein controlling the tension of the web comprises maintaining a tension on the web of 500 gram force or less.

What is claimed is:

1. A process for delineating a population of electrode structures in a web, the web comprising an electrically conductive layer having opposing front and back surfaces and an electrochemically active material layer on the front surface, the back surface, or on both of the front and back surfaces, the web having a down-web direction and a cross-web direction, the down-web and cross-web directions being orthogonal to each other, the process comprising:

controlling a tension of the web in the down-web direction while forming a series of weakened tear patterns in the web in the down-web direction, the cross-web direction, or each of the cross-web and down-web directions that delineate members of the electrode structure population without releasing the delineated members from the web, wherein the delineated members are individually bounded, at least in part, by a member of the series of weakened tear patterns that is adapted to facilitate separation of the delineated members, individually, from the web by an application of a force;

forming a population of tie bars between at least some of the delineated members of the electrode structure population, each of the tie bars being sized to provide additional structural stiffness to the web, the web with the delineated members and the population of tie bars having a strength of 10% to 75% of a strength of an unmachined web in the down-web direction and a strength of 5% to 30% of a strength of the unmachined web in the cross-web direction; and forming a series of alignment features in the web that are disposed in the cross-web or down-web direction relative to the delineated members, the alignment features being adapted for locating delineated members of the electrode structure population, individually, in the web.

2. The process of claim 1, wherein the series of weakened tear patterns, the series of alignment features, or the series of weakened tear patterns and the series of alignment features are formed with a laser.

3. The process of claim 1, wherein the controlling the tension of the web is performed using one or more rollers.

4. The process of claim 1, wherein the electrochemically active material layer is on only one of the front and back surfaces of the electrically conductive layer.

5. The process of claim 1, wherein the electrochemically active material layer is on both of the front and back surfaces of the electrically conductive layer.

6. The process of claim 1, wherein the delineated members of the electrode structure population have a length, $L_E$, a width $W_E$, and a height, $H_E$, wherein $W_E$ is measured in a direction that is orthogonal to the front and back surfaces of the web and to the down-web and cross-web directions and: (i) $L_E$ is measured in the cross-web direction and $H_E$ is measured in the down-web direction or (ii) $L_E$ is measured in the down-web direction and $H_E$ is measured in the cross-web direction and wherein a ratio of $L_E$ to each of $W_E$ and $H_E$ is at least 5:1 (that is, the ratio of $L_E$ to $W_E$ is at least 5:1, respectively, and the ratio of $L_E$ to $H_E$ is at least 5:1, respectively).

7. The process of claim 6, wherein a ratio of $H_E$ to $W_E$ is at least 0.4:1, respectively.

8. The process of claim 1, wherein the electrically conductive layer comprises a material suitable for use as a positive electrode current collector layer or a negative electrode current collector layer.

9. The process of claim 1, wherein the electroactive material layer comprises a cathodically active material.

10. The process of claim 1, wherein controlling the tension of the web comprises maintaining a tension on the web of 500 gram force or less.

11. The process of claim 1 wherein the electrochemically active material layer(s) comprise an anodically active material.

12. The process of claim 1 further comprising
supporting a portion of the web on a support surface, the support surface defining an opening;
wherein at least one of the forming the weakened tear patterns and the forming the series of alignment features is performed on the portion of the web located over the opening defined in the support surface.

13. The process of claim 12, wherein the at least one of the forming the weakened tear patterns and the forming the series of alignment features comprises forming a plurality of cuts and perforations through the web.

14. The process of claim 12, further comprising applying a vacuum to the web during the forming the weakened tear patterns and the forming the series of alignment features.

15. The process of claim 12, wherein the forming the weakened tear patterns and the forming the series of alignment features comprises laser machining.

16. The process of claim 15, wherein the laser machining comprises forming a series of outer perforations and a series of inner perforations, the outer perforations having a lower rupture strength than the inner perforations.

17. The process of claim 15, further comprising leaving an unmachined portion of the web between the alignment features and an outermost edge of the web in the cross-web direction.

18. The process of claim 15, further comprising contacting a rotating brush against the web after the laser machining.

19. The process of claim 1 further comprising controlling a portion of the web to be laser machined to be within about +/−100 microns of a laser focal point of a laser beam, and laser machining the portion of the web in at least one of the cross-web direction and the down-web direction to form at least one of the weakened tear patterns and the series of alignment features.

20. The process of claim 19, wherein the controlling a portion of the web comprises controlling the web in a vertical axis direction substantially parallel to the laser beam.

21. The process of claim 19, wherein the laser machining is performed with a laser having a laser power within a range of from 10 watts to 5,000 watts, wherein the laser is a fiber laser, and wherein the laser is capable of laser pulse width types of one or more of continuous wave (cw), microsecond (µs), nanosecond (ns), picosecond (ps) and femtosecond (fs) pulse types or combinations thereof.

22. The process of claim 19, wherein the alignment features are used to aid in the forming the weakened tear patterns.

23. The process of claim 19, wherein controlling the tension of the web comprises maintaining the tension on the web of 500 gram force or less.

24. A process for delineating a population of electrode structures in a web, the web comprising an electrically conductive layer having opposing front and back surfaces and an electrochemically active material layer on the front surface, the back surface, or on both of the front and back surfaces, the web having a down-web direction and a cross-web direction, the down-web and cross-web directions being orthogonal to each other, the process comprising:
controlling a tension of the web in the down-web direction while forming a series of weakened tear patterns in the web in both the cross-web direction and down-web direction that delineate members of the electrode structure population without releasing the delineated members from the web, wherein the delineated members are individually bounded, at least in part, by a member of the series of weakened tear patterns that is adapted to facilitate separation of the delineated members, individually, from the web by an application of a force;
forming a population of tie bars between at least some of the delineated members of the electrode structure population, each of the tie bars being sized to provide additional structural stiffness to the web, the web with the delineated members and the population of tie bars having a strength of 10% to 75% of a strength of an unmachined web in the down-web direction and a strength of 5% to 30% of a strength of the unmachined web in the cross-web direction; and
cutting a series of alignment features in the web that are disposed in the cross-web or down-web direction relative to the delineated members, the alignment features being adapted for locating delineated members of the electrode structure population, individually, in the web, each of the alignment features being defined by a through-hole.

25. The process of claim 24 wherein the series of alignment features are a plurality of fiducial features.

26. The process of claim 24 further comprising tracking the alignment features with one or more visual inspection devices to measure at least one of a location and a speed of travel of the alignment features.

27. The process of claim 24 wherein the series of alignment features are a plurality of tractor holes adapted for engagement with a gear wheel.

* * * * *